US006768559B1

(12) United States Patent
Kuwata et al.

(10) Patent No.: US 6,768,559 B1
(45) Date of Patent: Jul. 27, 2004

(54) MEDIUM ON WHICH PRINTING CONTROL PROGRAM IS RECORDED, PRINTING CONTROLLER, AND PRINTING CONTROLLING METHOD

(75) Inventors: Naoki Kuwata, Nagano-ken (JP); Yoshihiro Nakami, Nagano-ken (JP); Takashi Nitta, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/424,619

(22) PCT Filed: Apr. 5, 1999

(86) PCT No.: PCT/JP99/01835

§ 371 (c)(1),
(2), (4) Date: Mar. 20, 2000

(87) PCT Pub. No.: WO99/55073

PCT Pub. Date: Oct. 28, 1999

(30) Foreign Application Priority Data

Apr. 20, 1998 (JP) .......................................... 10-109899
Nov. 11, 1998 (JP) .......................................... 10-319674

(51) Int. Cl.$^7$ ................................................. H04N 1/40
(52) U.S. Cl. ...................... 358/1.9; 358/3.23; 358/3.24; 382/300
(58) Field of Search ............................... 358/1.9, 3.23, 358/3.24, 443, 448; 382/167, 298, 299, 300

(56) References Cited

U.S. PATENT DOCUMENTS

| | | | | |
|---|---|---|---|---|
| 4,833,531 A | | 5/1989 | Abe et al. ................... | 382/300 |
| 5,125,042 A | * | 6/1992 | Kerr et al. .................. | 382/300 |
| 5,719,594 A | | 2/1998 | Potu .......................... | 345/667 |
| 5,774,601 A | * | 6/1998 | Mahmoodi ................. | 382/298 |
| 5,930,388 A | * | 7/1999 | Murakami et al. .......... | 382/167 |

FOREIGN PATENT DOCUMENTS

| | | | | |
|---|---|---|---|---|
| GB | 2297216 A | * | 7/1996 | |
| JP | 58-27146 | | 2/1983 | ............. G03F/1/00 |
| JP | 62-1664 | | 1/1987 | ............. H04N/1/04 |
| JP | 63-311865 | | 12/1988 | ........... H04N/1/387 |
| JP | 2-9268 | | 1/1990 | ........... H04N/1/387 |
| JP | 2-188071 | | 7/1990 | |
| JP | 4-81981 | | 3/1992 | ........... G06F/15/66 |
| JP | 4-81982 | | 3/1992 | ........... G06F/15/66 |
| JP | 5-35857 | | 2/1993 | ........... G06F/15/64 |
| JP | 5-225323 | | 9/1993 | ........... G06F/15/66 |
| JP | 6-245087 | | 9/1994 | ............. H04N/1/46 |
| JP | 7-107273 | | 4/1995 | ........... H04N/1/393 |
| JP | 8-163385 | | 6/1996 | ............. H04N/1/60 |
| JP | 10-98666 | | 4/1998 | ............. H04N/5/76 |
| JP | 10-126612 | | 5/1998 | ........... H04N/1/393 |
| JP | 10-187395 | | 7/1998 | ............. G06F/3/12 |
| WO | WO 96/16380 A1 | | 5/1996 | |

OTHER PUBLICATIONS

Communication from a Foreign Patent Office (along with an English Translation).
International Search Report.

* cited by examiner

*Primary Examiner*—Thomas D. Lee
(74) *Attorney, Agent, or Firm*—Sughrue Mion, PLLC

(57) ABSTRACT

The user needs the skill to select a pixel interpolating process and a gradation converting process and it is difficult to select an optimum process adapted to desired printing quality. In a printing system using a computer system (10), by allowing a factor such as printing paper which exerts an influence on printing quality to be selected (step 400), the printing quality is estimated from the selected printing paper, a proper printing control which is preliminarily made correspond is selected (step 410), and a process is branched so as to execute the selected printing control (steps 420 to 450, steps 460 to 480), thereby enabling an optimum printing control to be performed.

15 Claims, 62 Drawing Sheets

Fig. 3
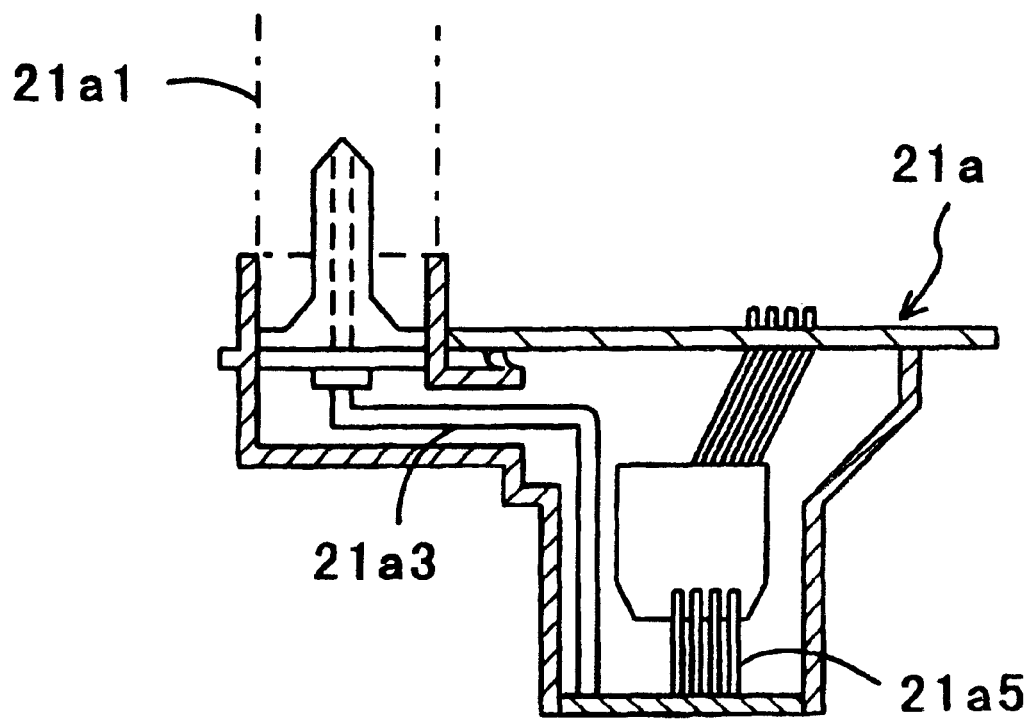
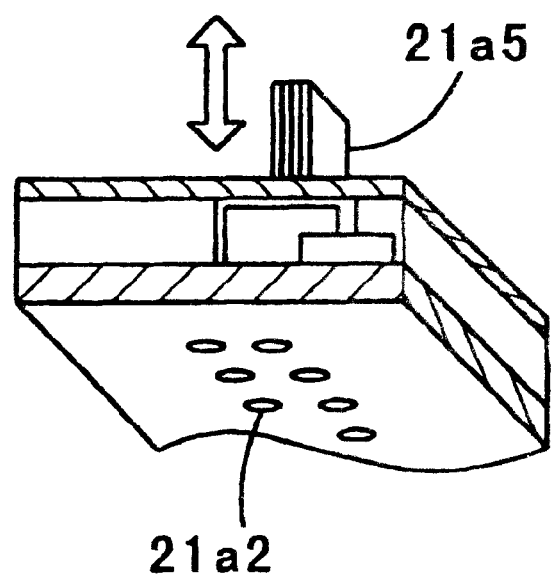

Color ink particle

◯ Existing pixels

Fig. 19

| | Pixel | Original | x1 | x2 | x3 | x4 | f1 | f2 | f3 | f4 | Cubic |
|---|---|---|---|---|---|---|---|---|---|---|---|
| 64 | P0 | 64 | | | | | | | | | |
| 64 | | | | | | | | | | | |
| 64 | | | | | | | | | | | |
| 64 | | | | | | | | | | | |
| 64 | P1 | 64 | 1 | 0 | 1 | 2 | 0 | 1 | 0 | 0 | 64 |
| 64 | P11 | | 1.25 | 0.25 | 0.75 | 1.75 | -0.14063 | 0.890625 | 0.296875 | -0.04688 | 64 |
| 64 | P12 | | 1.5 | 0.5 | 0.5 | 1.5 | -0.125 | 0.625 | 0.625 | -0.125 | 64 |
| 64 | P13 | | 1.75 | 0.75 | 0.25 | 1.25 | -0.04688 | 0.296875 | 0.890625 | -0.14063 | 64 |
| 64 | P2 | 64 | 1 | 0 | 1 | 2 | 0 | 1 | 0 | 0 | 64 |
| 64 | P21 | | 1.25 | 0.25 | 0.75 | 1.75 | -0.14063 | 0.890625 | 0.296875 | -0.04688 | 61 |
| 64 | P22 | | 1.5 | 0.5 | 0.5 | 1.5 | -0.125 | 0.625 | 0.625 | -0.125 | 56 |
| 64 | P23 | | 1.75 | 0.75 | 0.25 | 1.25 | -0.04688 | 0.296875 | 0.890625 | -0.14063 | 55 |
| 64 | P3 | 64 | 1 | 0 | 1 | 2 | 0 | 1 | 0 | 0 | 64 |
| 80 | P31 | | 1.25 | 0.25 | 0.75 | 1.75 | -0.14063 | 0.890625 | 0.296875 | -0.04688 | 77 |
| 96 | P32 | | 1.5 | 0.5 | 0.5 | 1.5 | -0.125 | 0.625 | 0.625 | -0.125 | 88 |
| 112 | P33 | | 1.75 | 0.75 | 0.25 | 1.25 | -0.04688 | 0.296875 | 0.890625 | -0.14063 | 103 |
| 128 | P4 | 128 | 1 | 0 | 1 | 2 | 0 | 1 | 0 | 0 | 128 |
| 144 | P41 | | 1.25 | 0.25 | 0.75 | 1.75 | -0.14063 | 0.890625 | 0.296875 | -0.04688 | 153 |
| 160 | P42 | | 1.5 | 0.5 | 0.5 | 1.5 | -0.125 | 0.625 | 0.625 | -0.125 | 168 |
| 176 | P43 | | 1.75 | 0.75 | 0.25 | 1.25 | -0.04688 | 0.296875 | 0.890625 | -0.14063 | 179 |
| 192 | P5 | 192 | 1 | 0 | 1 | 2 | 0 | 1 | 0 | 0 | 192 |
| 192 | P51 | | 1.25 | 0.25 | 0.75 | 1.75 | -0.14063 | 0.890625 | 0.296875 | -0.04688 | 201 |
| 192 | P52 | | 1.5 | 0.5 | 0.5 | 1.5 | -0.125 | 0.625 | 0.625 | -0.125 | 200 |
| 192 | P53 | | 1.75 | 0.75 | 0.25 | 1.25 | -0.04688 | 0.296875 | 0.890625 | -0.14063 | 195 |
| 192 | P6 | 192 | 1 | 0 | 1 | 2 | 0 | 1 | 0 | 0 | 192 |
| 192 | P61 | | 1.25 | 0.25 | 0.75 | 1.75 | -0.14063 | 0.890625 | 0.296875 | -0.04688 | 192 |
| 192 | P62 | | 1.5 | 0.5 | 0.5 | 1.5 | -0.125 | 0.625 | 0.625 | -0.125 | 192 |
| 192 | P63 | | 1.75 | 0.75 | 0.25 | 1.25 | -0.04688 | 0.296875 | 0.890625 | -0.14063 | 192 |
| 192 | P7 | 192 | 1 | 0 | 1 | 2 | 0 | 1 | 0 | 0 | 192 |
| 192 | P71 | | 1.25 | 0.25 | 0.75 | 1.75 | -0.14063 | 0.890625 | 0.296875 | -0.04688 | 192 |
| 192 | P72 | | 1.5 | 0.5 | 0.5 | 1.5 | -0.125 | 0.625 | 0.625 | -0.125 | 192 |
| 192 | P73 | | 1.75 | 0.75 | 0.25 | 1.25 | -0.04688 | 0.296875 | 0.890625 | -0.14063 | 192 |
| 192 | P8 | 192 | 1 | 0 | 1 | 2 | 0 | 1 | 0 | 0 | 192 |
| 192 | P81 | | 1.25 | 0.25 | 0.75 | 1.75 | -0.14063 | 0.890625 | 0.296875 | -0.04688 | 192 |
| 192 | P82 | | 1.5 | 0.5 | 0.5 | 1.5 | -0.125 | 0.625 | 0.625 | -0.125 | 192 |
| 192 | P83 | | 1.75 | 0.75 | 0.25 | 1.25 | -0.04688 | 0.296875 | 0.890625 | -0.14063 | 192 |
| 192 | P9 | 192 | 1 | 0 | 1 | 2 | 0 | 1 | 0 | 0 | 192 |

Fig. 20

| | Pixel | Original | x1 | x2 | x3 | x4 | f1 | f2 | f3 | f4 | Hybrid bicubic |
|---|---|---|---|---|---|---|---|---|---|---|---|
| 64 | P0 | 64 | | | | | | | | | |
| 64 | | | | | | | | | | | |
| 64 | | | | | | | | | | | |
| 64 | | | | | | | | | | | |
| 64 | P1 | 64 | 1 | 0 | 1 | 2 | 0.00 | 1.00 | 0.00 | 0.00 | 64 |
| 64 | P11 | | 1.25 | 0.25 | 0.75 | 1.75 | -0.20 | 0.95 | 0.36 | -0.11 | 64 |
| 64 | P12 | | 1.5 | 0.5 | 0.5 | 1.5 | -0.21 | 0.71 | 0.71 | -0.21 | 64 |
| 64 | P13 | | 1.75 | 0.75 | 0.25 | 1.25 | -0.11 | 0.36 | 0.95 | -0.20 | 64 |
| 64 | P2 | 64 | 1 | 0 | 1 | 2 | 0.00 | 1.00 | 0.00 | 0.00 | 64 |
| 64 | P21 | | 1.25 | 0.25 | 0.75 | 1.75 | -0.20 | 0.95 | 0.36 | -0.11 | 57 |
| 64 | P22 | | 1.5 | 0.5 | 0.5 | 1.5 | -0.21 | 0.71 | 0.71 | -0.21 | 50 |
| 64 | P23 | | 1.75 | 0.75 | 0.25 | 1.25 | -0.11 | 0.36 | 0.95 | -0.20 | 51 |
| 64 | P3 | 64 | 1 | 0 | 1 | 2 | 0.00 | 1.00 | 0.00 | 0.00 | 64 |
| 80 | P31 | | 1.25 | 0.25 | 0.75 | 1.75 | -0.20 | 0.95 | 0.36 | -0.11 | 73 |
| 96 | P32 | | 1.5 | 0.5 | 0.5 | 1.5 | -0.21 | 0.71 | 0.71 | -0.21 | 82 |
| 112 | P33 | | 1.75 | 0.75 | 0.25 | 1.25 | -0.11 | 0.36 | 0.95 | -0.20 | 99 |
| 128 | P4 | 128 | 1 | 0 | 1 | 2 | 0.00 | 1.00 | 0.00 | 0.00 | 128 |
| 144 | P41 | | 1.25 | 0.25 | 0.75 | 1.75 | -0.20 | 0.95 | 0.36 | -0.11 | 157 |
| 160 | P42 | | 1.5 | 0.5 | 0.5 | 1.5 | -0.21 | 0.71 | 0.71 | -0.21 | 174 |
| 176 | P43 | | 1.75 | 0.75 | 0.25 | 1.25 | -0.11 | 0.36 | 0.95 | -0.20 | 183 |
| 192 | P5 | 192 | 1 | 0 | 1 | 2 | 0.00 | 1.00 | 0.00 | 0.00 | 192 |
| 192 | P51 | | 1.25 | 0.25 | 0.75 | 1.75 | -0.20 | 0.95 | 0.36 | -0.11 | 205 |
| 192 | P52 | | 1.5 | 0.5 | 0.5 | 1.5 | -0.21 | 0.71 | 0.71 | -0.21 | 206 |
| 192 | P53 | | 1.75 | 0.75 | 0.25 | 1.25 | -0.11 | 0.36 | 0.95 | -0.20 | 199 |
| 192 | P6 | 192 | 1 | 0 | 1 | 2 | 0.00 | 1.00 | 0.00 | 0.00 | 192 |
| 192 | P61 | | 1.25 | 0.25 | 0.75 | 1.75 | -0.20 | 0.95 | 0.36 | -0.11 | 192 |
| 192 | P62 | | 1.5 | 0.5 | 0.5 | 1.5 | -0.21 | 0.71 | 0.71 | -0.21 | 192 |
| 192 | P63 | | 1.75 | 0.75 | 0.25 | 1.25 | -0.11 | 0.36 | 0.95 | -0.20 | 192 |
| 192 | P7 | 192 | 1 | 0 | 1 | 2 | 0.00 | 1.00 | 0.00 | 0.00 | 192 |
| 192 | P71 | | 1.25 | 0.25 | 0.75 | 1.75 | -0.20 | 0.95 | 0.36 | -0.11 | 192 |
| 192 | P72 | | 1.5 | 0.5 | 0.5 | 1.5 | -0.21 | 0.71 | 0.71 | -0.21 | 192 |
| 192 | P73 | | 1.75 | 0.75 | 0.25 | 1.25 | -0.11 | 0.36 | 0.95 | -0.20 | 192 |
| 192 | P8 | 192 | 1 | 0 | 1 | 2 | 0.00 | 1.00 | 0.00 | 0.00 | 192 |
| 192 | P81 | | 1.25 | 0.25 | 0.75 | 1.75 | -0.20 | 0.95 | 0.36 | -0.11 | 192 |
| 192 | P82 | | 1.5 | 0.5 | 0.5 | 1.5 | -0.21 | 0.71 | 0.71 | -0.21 | 192 |
| 192 | P83 | | 1.75 | 0.75 | 0.25 | 1.25 | -0.11 | 0.36 | 0.95 | -0.20 | 192 |
| 192 | P9 | 192 | 1 | 0 | 1 | 2 | 0.00 | 1.00 | 0.00 | 0.00 | |

| 0, 0 | 1, 0 | 2, 0 | |
|---|---|---|---|
| 0, 1 | 1, 1 | 2, 1 | |
| | | | |

⇓

| (0, 0)↓<br>0, 0 | 1, 0 | (1, 0)↓<br>2, 0 | 3, 0 | (2, 0)↓<br>4, 0 |
|---|---|---|---|---|
| 0, 1 | 1, 1 | 2, 1 | 3, 1 | 4, 1 |
| (0, 1)↓<br>0, 2 | 1, 2 | (1, 1)↓<br>2, 2 | 3, 2 | (2, 1)↓<br>4, 2 |
| | | | | |

Fig. 36

| | Pixel interpolating process | Gradation converting process | |
|---|---|---|---|
| Combination for highest speed | Nearest method | CG | Dithering A |
| | | Photograph | Dithering B |
| Intermediate combination | Bilinear method | CG | Dithering A |
| | | Photograph | Dithering B |
| | | Error diffusion method | |
| Combination for high picture quality | M cubic method | Error diffusion method | |

Fig. 38

| 25 | 19 | 10 | 14 | 22 |
|----|----|----|----|----|
| 17 | 8  | 2  | 6  | 20 |
| 12 | 4  | 1  | 5  | 13 |
| 21 | 7  | 3  | 9  | 16 |
| 23 | 15 | 11 | 18 | 24 |

Fig. 39

| 22 | 4  | 21 | 7  | 11 |
|----|----|----|----|----|
| 9  | 17 | 16 | 2  | 10 |
| 23 | 1  | 8  | 19 | 24 |
| 5  | 14 | 3  | 20 | 6  |
| 18 | 12 | 25 | 13 | 15 |

Fig. 40
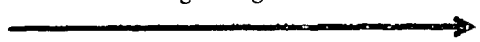
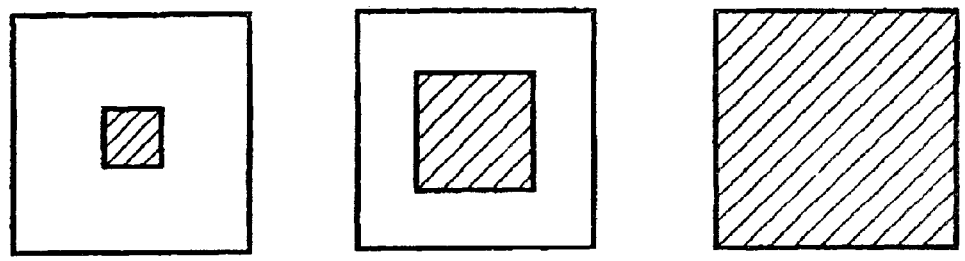

Fig. 45

|  | Ink color | Ink particle diameter | Pixel interpolating process | Gradation converting process |
|---|---|---|---|---|
| Combination for high picture quality | Dark color | Large | Nearest method | Dithering method |
|  | Light color | Small | M cubic method | Error diffusion method |
| Combination for highest speed | | | Nearest method | Dithering method |

Fig. 46

|  | Ink used | | Pixel interpolating process | Gradation converting process |
|---|---|---|---|---|
| Combination for high picture quality | Dark color | Large | Nearest method | Dithering method |
| | | Small | | |
| | Light color | Large | | |
| | | Small | M cubic method | Error diffusion method |
| Combination for highest speed | | | Nearest method | Dithering method |

Fig. 48

|  | Nearest | Bilinear | M cubic |
|---|---|---|---|
| Dithering A | O | O |  |
| Dithering B | O | O |  |
| Error diffusion |  | O | O |

Fig. 51

| Printing paper | Pixel interpolating process | Gradation converting process |
|---|---|---|
| Super fine | M cubic | Error diffusion method |
| Fine | Bilinear | Error diffusion method |
| Ordinary paper | Nearest | Dithering B |

| Printing quality (related to overlapping) |
|---|
| • Higher definition<br><br>• High definition<br><br>• Ordinary |

Fig. 56

| Printing resolution |
|---|
| ⊙ 360dpi |
| • 720dpi |

Fig. 61

| Quality of finished picture |
|---|
| ⊙ Best |
| ▪ Good |
| ▪ Ordinary |

MEDIUM ON WHICH PRINTING CONTROL PROGRAM IS RECORDED, PRINTING CONTROLLER, AND PRINTING CONTROLLING METHOD

TECHNICAL FIELD

The present invention relates to a medium on which a printing control program for allowing a printing apparatus to execute printing on the basis of image data of pixels in a dot matrix state is recorded, a printing control method, and a printing control apparatus. More particularly, the invention relates to a medium on which a printing control program for executing an optimum process in accordance with printing quality is recorded, a printing control method, and a printing control apparatus.

BACKGROUND ART

When a computer or the like deals with an image, the image is expressed by pixels in a dot matrix state and each pixel is expressed by a gradation value. For example, a photograph or computer graphic is often displayed by pixels of 640 dots in the horizontal direction and 480 dots in the vertical direction on the screen of a computer.

On the other hand, the performance of a color printer has been remarkably improved. The color printer has dot density of 720 dpi (dots/inch) and has extremely high definition. In the case of printing an image of 640×480 dots on a dot unit basis, the image becomes very small. In this case, since the gradation values are different and the meaning itself of resolution differs, the image has to be converted to data for printing by interpolating the dots. That is, when the printed image becomes small in a one-to-one corresponding manner, a process of increasing the number of pixels of the image data (this is called a resolution increasing process or magnifying process) is performed. In the opposite case, a process of decreasing the number of pixels of the image data (this is called a resolution decreasing process or reducing process) is performed.

As a conventional method of interpolating dots in such a case, methods such as a nearest neighboring interpolation (hereinbelow, called a nearest method) and cubic convolution interpolation (hereinbelow, called a cubic method) are known. Japanese Unexamined Patent Application No. 6-225140 discloses a technique of smoothing an edge in the event of interpolating dots by preparing a dot pattern by which an image is enlarged in a shape having a smooth edge.

Although the gradation display is easy in a computer or for a display, generally, a color printer often can express only two levels, that is, whether a dot of color ink is applied or not. A gradation converting process of converting a multi-level gradation display to a two-level gradation display is therefore performed.

DISCLOSURE OF INVENTION

As described above, in order to perform printing by a printing apparatus on the basis of image data, a pixel interpolating process and a gradation converting process have to be executed.

Although the pixel interpolating process and the gradation converting process can be selected by a user interface on a computer, each of the processes is quite independent and the user separately instructs the processes while considering the picture quality and processing speed. There is, however, a problem that whether a desired result can be obtained or not depends on a combination of the picture quality and the processing speed of the processes and it is troublesome except for a skilled person.

Each of various methods such as nearest method and cubic method in the pixel interpolating process has advantages and disadvantages. It is difficult for the user to select a method. When one of the methods is fixedly used, the quality of an interpolation result of an image at which the method is not good deteriorates. Further, in the invention disclosed in Japanese Unexamined Patent Application No. 6-225140, since a pattern is prepared, an interpolation magnification has to be fixed. On the precondition of a color image, the number of patterns is enormous and it is difficult to even prepare the patterns.

Meanwhile, prior to the invention, the applicant of the invention has invented an interpolating method of interpolating image data by the cubic method and then interpolating the interpolated image data by the nearest method. By the method, high operation processing speed of the nearest method can be utilized while utilizing the high interpolating accuracy of the cubic method. In this case, 180 dpi is set as a threshold value, image data inputted is once interpolated to a value higher than 180 dpi by the cubic method and then the data is interpolated by the nearest method to a required resolution such as 360 dpi or 720 dpi as inherent printing data. That is, since a computing amount increases significantly when an interpolating process to the inherent interpolating magnification is executed only by the cubic method and jaggies are conspicuous when the interpolating process is executed only by the nearest method, in order to avoid the inconveniences, the interpolating process is performed at two stages.

In the case of switching the interpolating processes while using the same threshold value with resolution different from that of final printing, when printing is performed with high resolution, an inconvenience occurs in a case described as follows. For example, when it is assumed that there is original image data of 170 dpi and that of 185 dpi, the former one is subjected to the cubic interpolation to 180 dpi or higher and then subjected to the nearest interpolation to 720 dpi. For convenience of the operating process, the interpolation of integer times is performed by the cubic method, so that the data is interpolated to 340 dpi by the cubic method. On the other hand, the inputted image of 185 dpi is interpolated to 720 dpi by the nearest method without being subjected to the cubic interpolation.

In this case, the former is interpolated to 340 dpi by the cubic method, so that its picture quality is improved. On the other hand, the latter is interpolated only by the nearest method. Consequently, a reverse phenomenon such that although the former original image data is interior to the latter, an output of the former data has higher picture quality occurs.

The invention has been achieved in consideration of the above problems and its object is to provided a medium on which a printing control program which can execute optimum printing in a state where printing quality is instructed directly or indirectly is recorded, a printing control method, and a printing control apparatus.

In order to achieve the object, the invention according to claim 1 relates to a medium on which a printing control program for inputting image data obtained by expressing an image by pixels in a dot matrix state and allowing a computer to execute an interpolating process and a printing control process so that the image data is printed by a printing apparatus is recorded, wherein printing quality at the time of allowing the printing apparatus to print the image data is obtained, an interpolating process which is to correspond to the obtained printing quality is determined, and the computer is allowed to execute the printing control process by the determined interpolating process.

In the invention according to claim 1 having the configuration as mentioned above, by executing the process of the printing control by the computer, the image data obtained by expressing an image by pixels in the dot matrix state is inputted and is allowed to be printed by the printing apparatus.

The printing quality in the printing apparatus is not uniform. First, the printing quality at the time of performing printing by the printing apparatus by using the image data is obtained. When the printing quality is obtained, an interpolating process corresponding to the printing quality at the time of performing the printing by the printing apparatus is determined. The interpolating process is various. By preliminarily associating the printing quality and the kind of the interpolating process, the interpolating process can be determined from the printing quality. While executing the determined interpolating process, the printing control process is executed.

The recording medium can be, of course, a magnetic recording medium or a magneto-optic recording medium. Any recording media which will be developed in future can be similarly considered. The stages of duplication such as primary duplicate or secondary duplicate are regarded as the same without any doubt. The invention is also applied to the case where a communication line is used as a supplying method.

Further, the case where a part is realized by software and a part is realized by hardware is also included in the idea of the invention. A form in which a part is recorded on a recording medium and properly read as necessary may be also used.

In the case of carrying out the invention by software, the invention is realized as a medium on which a program is recorded. Moreover, it is natural that the invention is realized as a program itself. The program itself is also included in the invention.

As mentioned above, the method of preliminarily associating the printing quality and the printing control element and determining the printing control element from the printing quality is realized by a substantial computer. It can be easily understood that the invention can be applied as a substantial apparatus including such a computer in this sense. The invention according to claim 8 relates to a printing control apparatus for receiving image data obtained by expressing an image by pixels in a dot matrix state and printing the image data by a printing apparatus, characterized by comprising: a printing quality obtaining unit for obtaining printing quality when the printing apparatus is allowed to perform printing by using the image data; an interpolating process determining unit for determining an interpolating process which is to correspond to the obtained printing quality; and a printing control unit for executing the determined interpolating process and executing a printing control on the printing apparatus.

That is, it is surely effective as a substantial apparatus controlled by the computer. Such a printing control apparatus may be carried out by itself or may be executed by another method in a state where the apparatus is assembled in certain equipment. The idea of the invention is not limited to the above but includes various modes and can be properly modified.

When the medium on which such a printing control program is recorded is proceeded according to the control, it is natural that the invention basically exists in the procedure. It is easily understood that the invention can be applied as a method. Consequently, the invention according to claim 15 relates to a printing control method of receiving image data obtained by expressing an image by pixels in a dot matrix state and printing the image data by a printing apparatus, characterized by comprising: a step of obtaining printing quality when the printing apparatus is allowed to perform printing by using the image data; a step of determining an interpolating process which is to correspond to the obtained printing quality; and a step of executing the determined interpolating process and executing a printing control on the printing apparatus.

That is, the invention is not always limited to a substantial medium but is surely effective as a method.

BRIEF DESCRIPTION OF DRAWINGS

FIG. 3 is a schematic explanatory diagram of a printing head unit in the color printer.

FIG. 19 is a diagram showing an example of specifically applying the cubic method.

FIG. 20 is a diagram showing an example of specifically applying an M cubic method.

FIG. 36 is a diagram showing the correspondence between a pixel interpolating process and a gradation converting process which are combined on the basis of the priority order.

FIG. 38 is a diagram showing an example of a center-concentrated type dither matrix.

FIG. 39 is a diagram showing an example of a disperse type dither matrix.

FIG. 40 is a diagram showing states where dots are formed when the center-concentrated type dither matrix is applied to a solid screen.

FIG. 45 is a diagram showing the correspondence between the pixel interpolating process and the gradation converting process when the color ink particles are various.

FIG. 46 is a diagram showing the correspondence between the pixel interpolating process and the gradation converting process when the color ink particles are various.

FIG. 48 is a diagram showing a state where the pixel interpolating process is limited by designating the halftone.

FIG. 51 is a diagram of a table showing the correspondence of the printing paper, pixel interpolating process, and gradation converting process.

Figure 53:
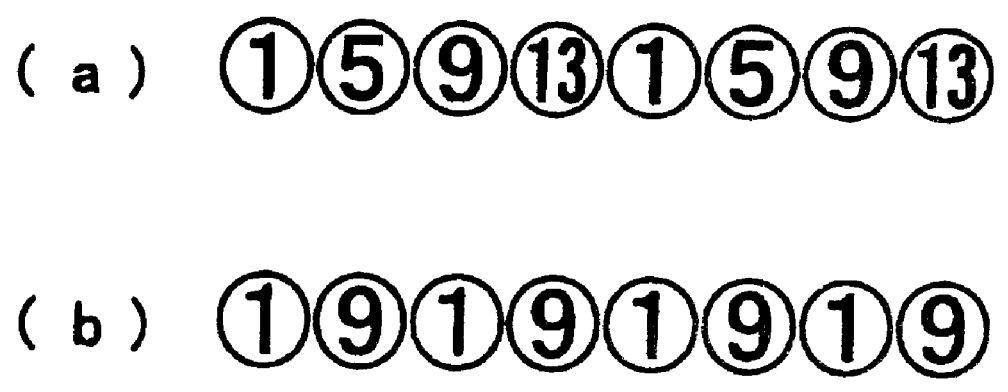

FIG. 53 is a diagram showing a nozzle when a row of dots is printed in the overlapping mode.

FIG. 54 is a diagram showing a setup screen for selecting the printing quality.

FIG. 56 is a diagram showing a setup screen for selecting the printing resolution.

FIG. 61 is a diagram showing a setup screen for selecting the quality of a finished picture.

BEST MODE FOR CARRYING OUT THE INVENTION

Embodiments of the invention will be described hereinbelow with reference to the drawings.

In a digital printing process, an image is expressed by pixels in a dot matrix and image data is formed by collection of data each representing a pixel. The hardware of a printing system for processing such image data will be first described.

In the embodiment, as an example of the hardware which realizes such a printing system, a computer system 10 having a color printer is employed.

Figure 1:
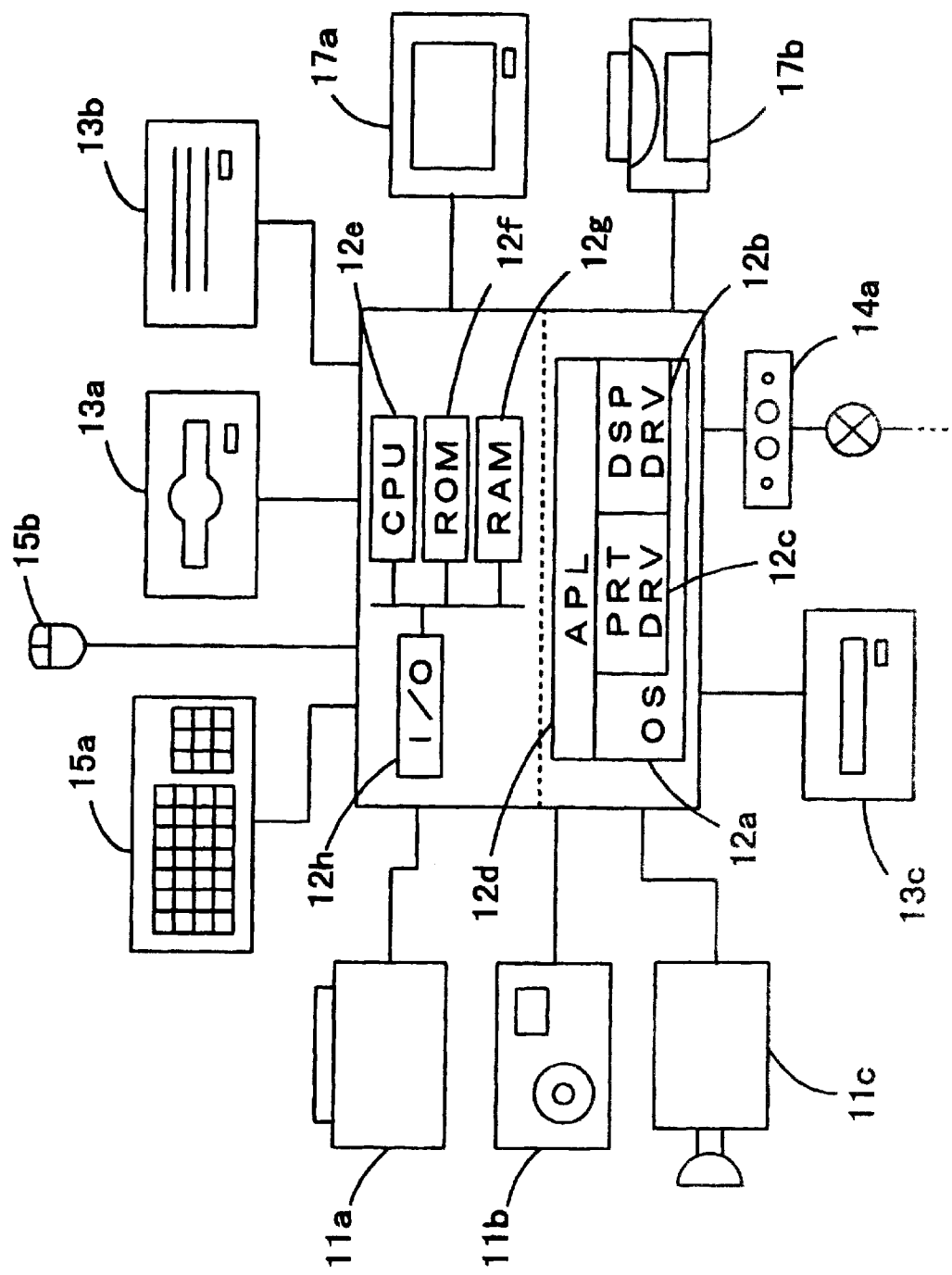
FIG. 1 is a block diagram of a computer system which realizes a printing system according to an embodiment of the invention.

FIG. 1 is a block diagram showing the computer system 10.

The computer system 10 comprises a scanner 11a, a digital still camera 11b, and a video camera 11c as image input devices which are connected to a computer body 12. Each input device creates image data by expressing an image by pixels in a dot matrix and can output the image data to the computer body 12. The image data can express about 16,700,000 colors by displaying 256 levels for each of the three primary colors of R, G, and B.

A floppy disk drive 13a, a hard disk 13b, and a CD-ROM drive 13c as external auxiliary storage devices are connected to the computer body 12. On the hard disk 13b, main programs related to the system are recorded and a necessary program or the like can be properly read from a floppy disk, CD-ROM, and the like.

As a communication device for connecting the computer body 12 to an external network or the like, a modem 14a is connected. The system can be connected to an outside network via a public communication line, so that software or data can be downloaded. Although the system accesses the outside by the modem 14a via the telephone line in the example, it can also access a network through an LAN adapter. A keyboard 15a and a mouse 15b are also connected for operating the computer body 12.

As image output devices, a display 17a and a color printer 17b are also provided. The display 17a has a display area of 800 pixels in the horizontal direction and 600 pixels in the vertical direction and can display 16,700,000 colors per pixel as mentioned above. The resolution is just an example. It can be properly changed to 640×480 pixels, 1024×720 pixels, etc.

The color printer 17b can print an image by applying dots onto a printing paper sheet as a recording medium with color ink of four colors of CMYK as will be described hereinafter. Although high density printing of, for example, the image density of 720×720 dpi (dots/inch) can be realized, the gradation expression is low and two levels of whether the color ink is applied or not.

On the other hand, in order to display or output an image to the image output device while receiving the image by using the image input device, a predetermined program is executed in the computer body 12. In the computer body 12, an operating system (OS) 12a works as a basic program. In the operating system 12a, a display driver (DSP DRV) 12b for displaying an image on the display 17a and a printer driver (PRT DRV) 12c for allowing the color printer 17b to print and output the image are assembled. The drivers 12b and 12c depend on the models of the display 17a and color printer 17b and can be added to the operating system 12a in accordance with each of the models. Depending on the model, an additional function more than the standard process can be also realized. That is, various additional processes within a permissible range can be realized while maintaining a processing system which is common on the standard system, namely, the operating system 12a.

On the precondition of executing such a program, a CPU 12e, a RAM 12f, a ROM 12g, an I/O 12h and the like are provided in the computer body 12. The CPU 12e for executing a computing process properly performs a basic program written on the ROM 12g while using the RAM 12f as a temporary work area, a setup storing area, or a program area, thereby controlling external devices and internal devices connected via the I/O 12h.

An application 12d as a basic program is executed on the operating system 12a. Processes of the application 12d are various. When the operation of the keyboard 15a and mouse 15b as operating devices is monitored and is executed, the application 12d properly controls the various external devices, executes corresponding computing processes and, further, allows the process result to be displayed on the display 17a or outputted to the color printer 17b.

The process resultant of the application 12d is outputted as printing data to the color printer 17b via the printer driver 12c and the color printer 17b discharges dots onto the printing paper with the color ink, thereby printing the corresponding image.

Figure 2:
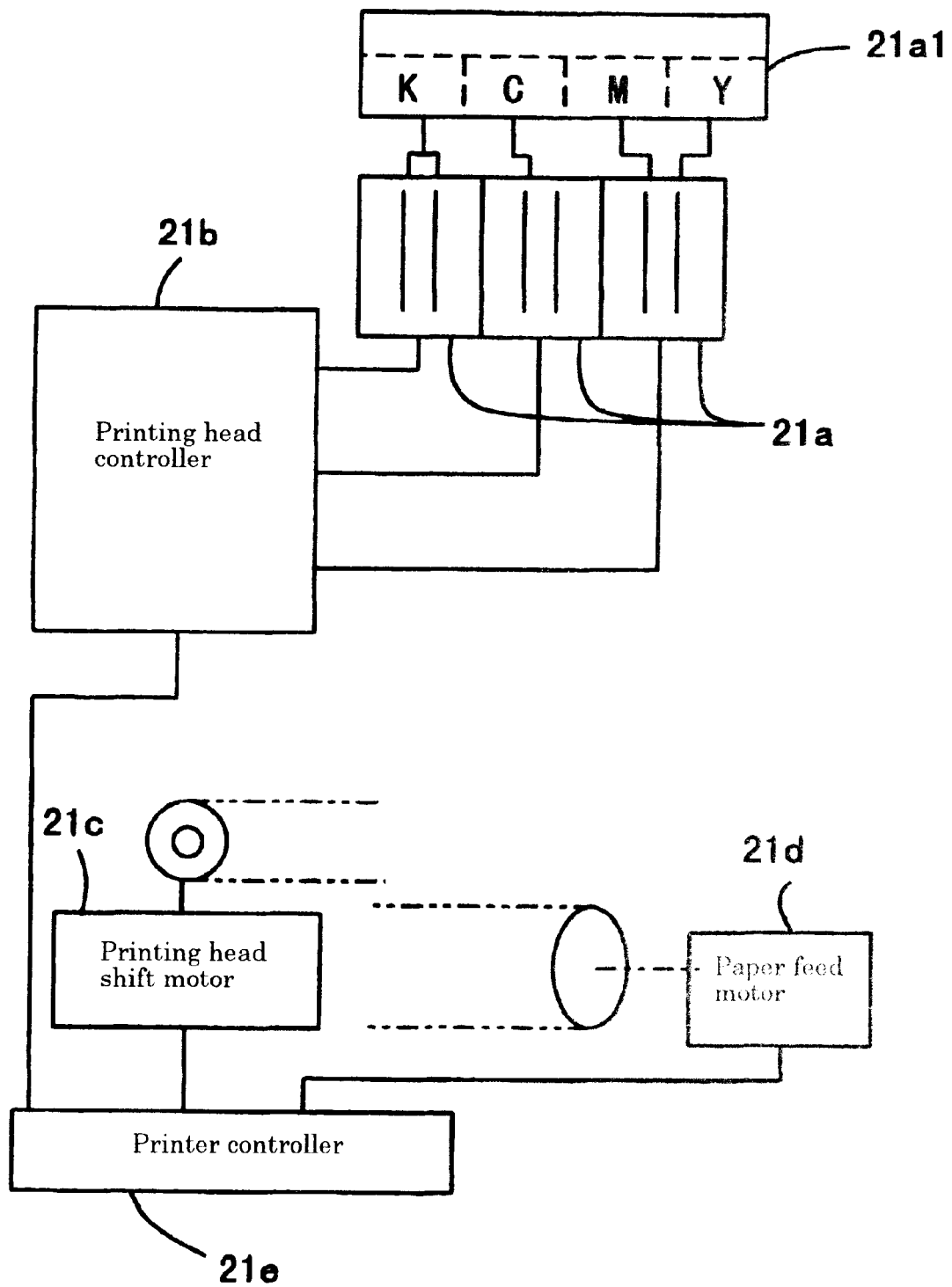
FIG. 2 is a schematic block diagram of an ink jet color printer.
Figure 4:
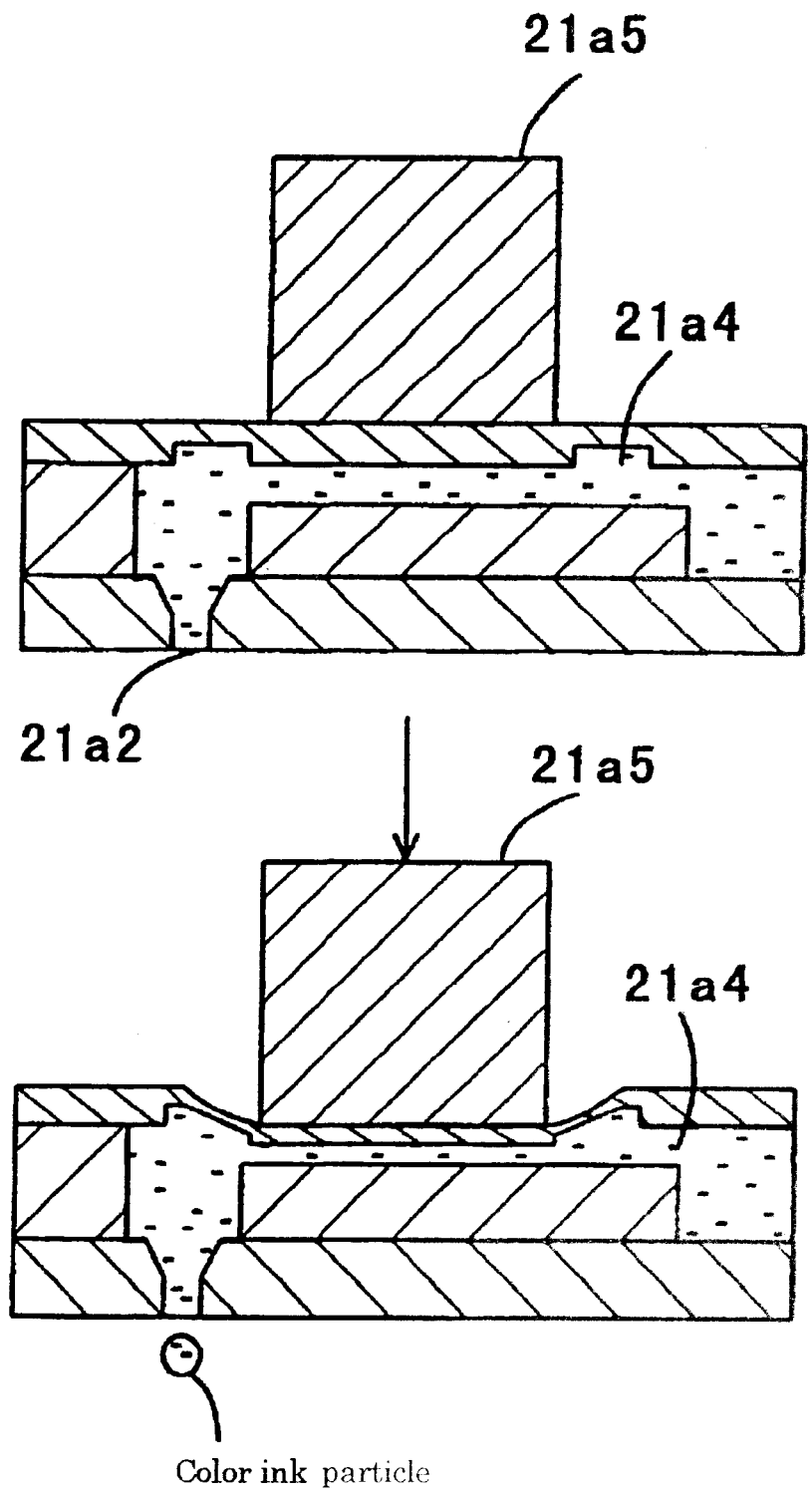
FIG. 4 is a schematic explanatory diagram showing a state where color ink is discharged from the printing head unit.

FIGS. 2 to 4 shows a schematic configuration of a color ink jet printer 21 as an example of the color printer. The color ink jet printer 21 has a dot printing mechanism comprising a printing head 21a having three printing head units, a printing head controller 21b for controlling the printing head 21a, a printing head shift motor 21c for shifting the printing head 21a in the shift direction, a paper feed motor 21d for feeding the printing paper in the row direction, and a printer controller 21e as an interface of the printing head controller 21b, printing head shift motor 21c, and paper feed motor 21d with an external device. The color ink jet printer 21 can print an image while allowing the printing head 21a to scan a printing paper as a recording medium in accordance with the printing data.

FIG. 3 shows a more specific configuration of the printing head 21a. FIG. 4 shows an operation when ink is discharged. In the printing head 21a, a narrow pipeline 21a3 extending from a color ink tank 21a1 to a nozzle 21a2 is formed and an ink chamber 21a4 is formed at the end of the pipeline 21a3. The wall faces of the ink chamber 21a4 are made of a flexible material and a piezoelectric device 21a5 as an electrostrictive device is provided on the wall face. By applying a voltage to the piezoelectric device 21a5, the crystal structure is distorted, thereby performing electromechanical energy conversion at high speed. By the distorting operation of the crystal structure, the wall faces of the ink chamber 21a4 are pressed to reduce the volume of the ink chamber 21a4. Then, a predetermined amount of color ink particles is discharged with force from the nozzles 21a2 which are communicated with the ink chamber 21a4. The pump structure will be called a micropump mechanism.

In one printing head unit, the nozzles 21a2 in two independent rows are formed and color ink is independently supplied to the nozzles 21a2 of each row. Each of the three printing head units has nozzles of two rows, so that the color ink of the maximum six colors can be used. In the example shown in FIG. 2, two rows in the left printing head unit are used for black ink, only one row in the middle printing head unit is used for cyan color ink, and the right and left two rows in the right printing head unit are used for magenta color ink and yellow color ink.

On the other hand, the interval in the vertical direction of the nozzles 21a2 formed in the printing head 21a does not coincide with the printing resolution. Generally, the nozzles 21a2 are formed at intervals larger than the printing resolution. In spite of this, the printing of high resolution can be realized since the paper feed motor 21d is controlled in the paper feed direction. For example, printing is performed while feeding paper at eight stages during the interval of the nozzles 21a2 and operating the printing head 21a in the shift direction every stage, thereby improving the resolution. Obviously, when the color ink is discharged at arbitrary intervals with respect to the shift direction, it denotes the resolution. Consequently, it can be said that the resolution is determined by the timing control. Strictly, the diameter of a dot of color ink can be a factor of the resolution. It is, however, ignored here for easy understanding.

In the embodiment, the hardware system as described above is used as a precondition and printing is executed on the basis of image data obtained by the image input device of the computer system 10. At this time, when there is a difference between the resolution of original image data and the resolution of the color printer 17b, an interpolating process is executed.

Figure 5:
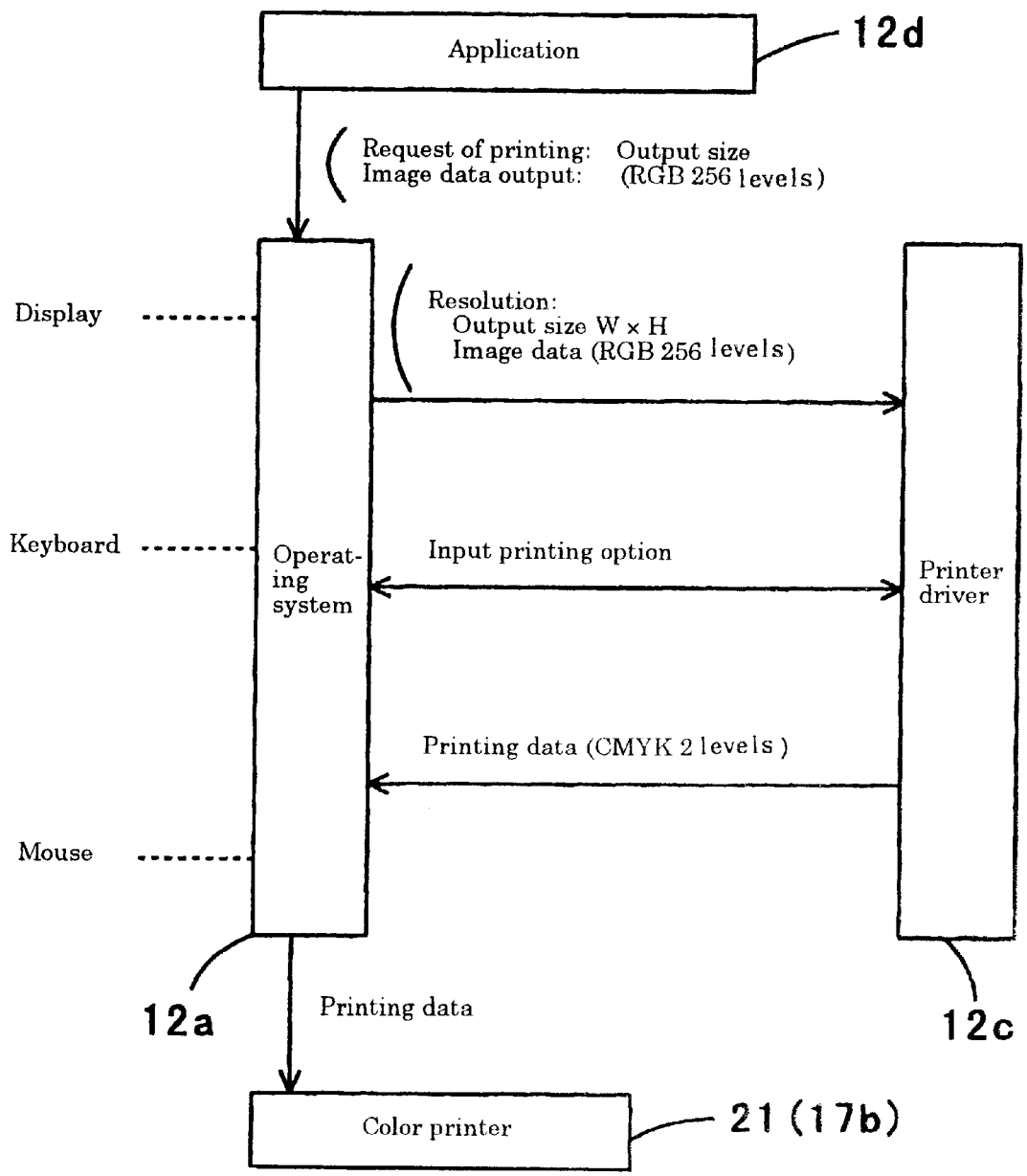
FIG. 5 is a flowchart showing the flow of image data in the printing system.

Change in the resolution and gradation of printing data outputted to the color printer 17b when the application 12d executes the printing process will now be described. FIG. 5 shows the flow of the image data.

The application 12d generates a printing request to the operating system 12 and at this time transfers an output size and image data of RGB 256 levels. The operating system 12a transfers the output size and image data to the printer driver 12c and the printer driver 12c receives and outputs the data from/to the operating system 12a in order to input printing options. The operating system 12a outputs the operation result of the keyboard 15a or mouse 15b to the printer driver 12c while displaying the data on the display 17a via the display driver 12b. The printer driver 12c generates printing data by reflecting the operation result as printing options. The printing data has usually CMYK 2 levels and is outputted from the hardware port to the color printer 17b via the operating system 12a.

In the embodiment as mentioned above, the printing control program is executed by the computer system 10 and the printing data is outputted to the color printer 17b. The printing apparatus as an object is not limited to the above-mentioned ink jet color printer 21.

Figure 6:
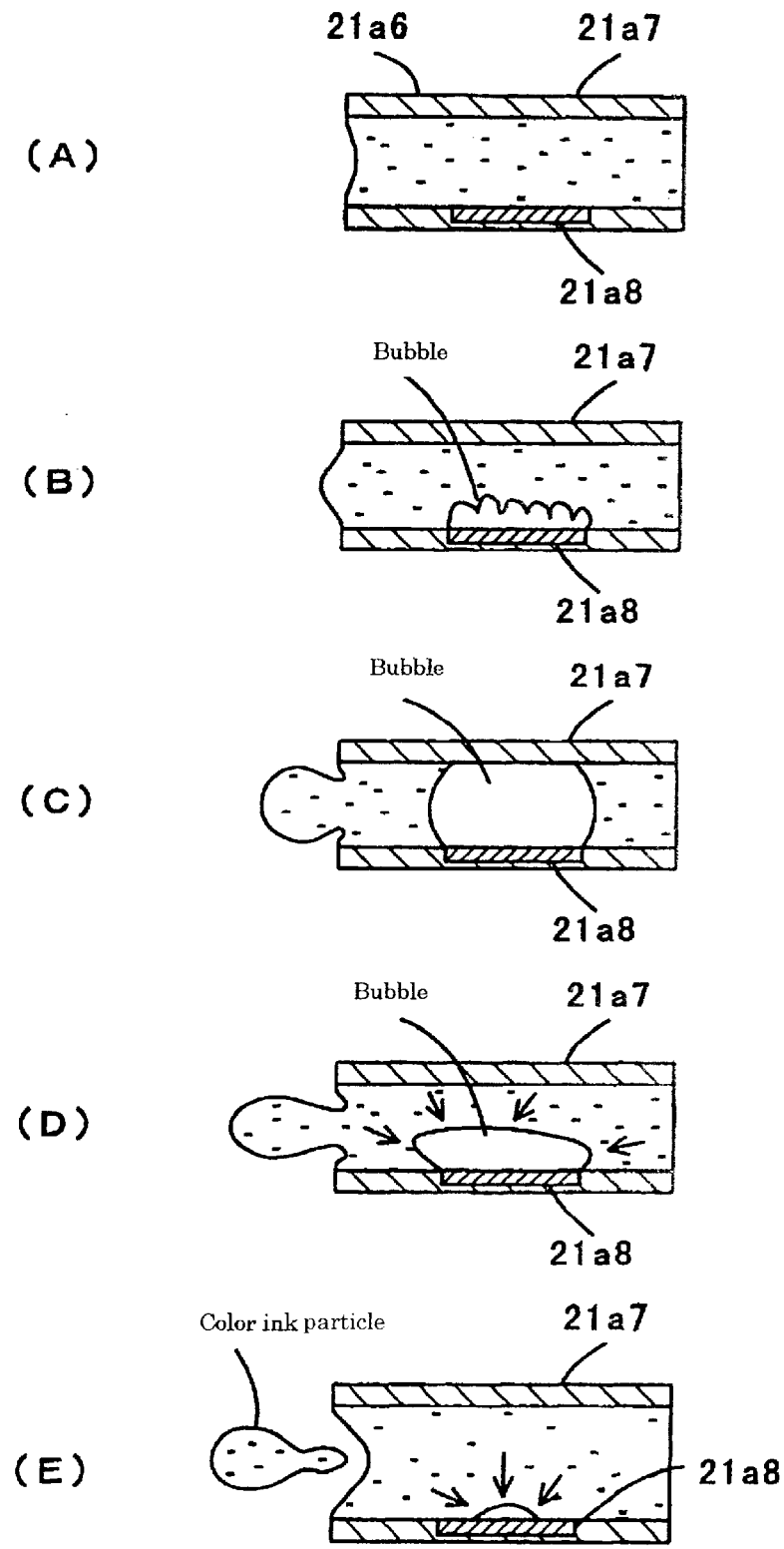
FIG. 6 is a schematic explanatory diagram showing a state where color ink is discharged by a bubble jet printing head.

For example, although the color printer 21 is of the ink jet type using the micropump mechanism, a color printer of a mechanism other than the micropump mechanism can be also employed. As shown in FIG. 6, a bubble jet pump mechanism in which a heater 21a8 is provided on the wall face of a pipeline 21a7 near a nozzle 21a6 and liberates heat to generate bubbles so that the color ink is discharged by the pressure is being practically used.

Figure 7:
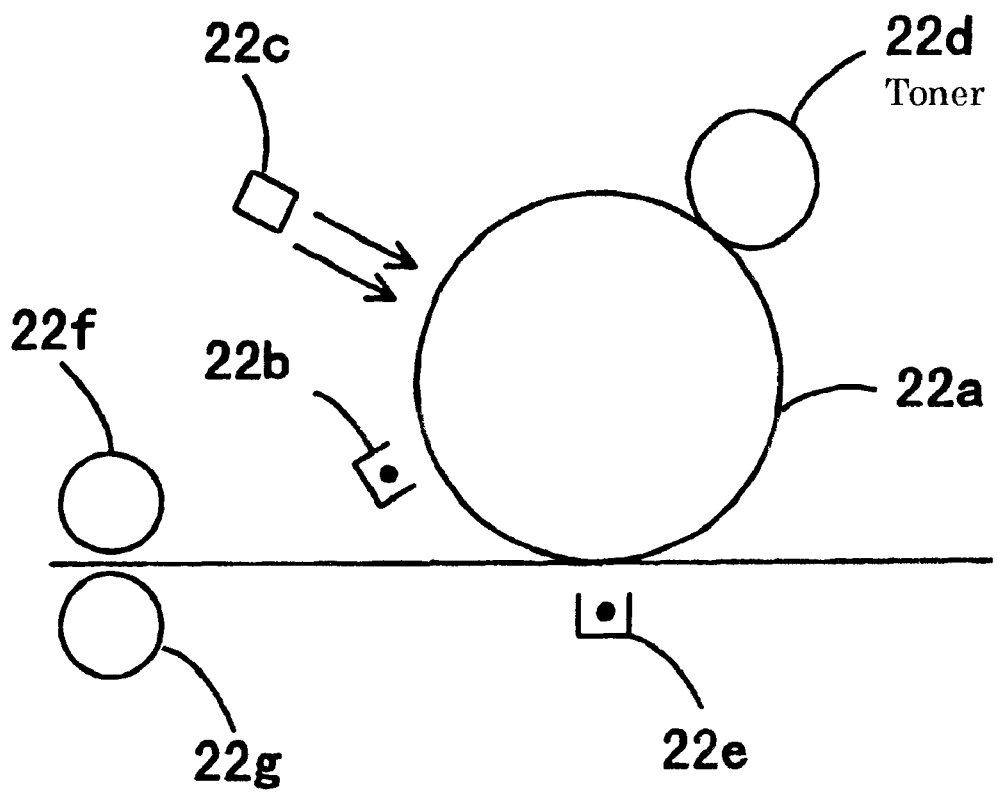
FIG. 7 is a schematic explanatory diagram of an electrophotographic printer.

FIG. 7 shows a schematic configuration of the main part of what is called an electrophotographic color printer 22. A charging device 22b, an exposing device 22c, a developing device 22d, and a transferring device 22e are arranged around a rotating drum 22a as a photosensitive member. The peripheral face of the rotating drum 22a is uniformly charged by the charging device 22b, the charges of an image part are removed by the exposing device 22c, toner is adhered by the developing device 22d to the part which is not charged, and the toner is transferred onto paper as a recording medium by the transferring device 22e. After that, the paper is passed between a heater 22f and a roller 22g and the toner is melted and fixed on the paper. By the devices as a set, printing by using toner of one color is performed. The devices for total four colors are respectively provided.

That is, the invention is not limited to the above specific configuration of the printing apparatus and also the range in which such an individual printing method is applied but the application mode can be variously changed.

According to the above-mentioned embodiment, in order to obtain printing data, in the computer system 10 including the image input device and image output device, the predetermined application 12d and the printer driver 12c generate the printing data. The computer system 10 is, however, not always necessary.

Figure 8:
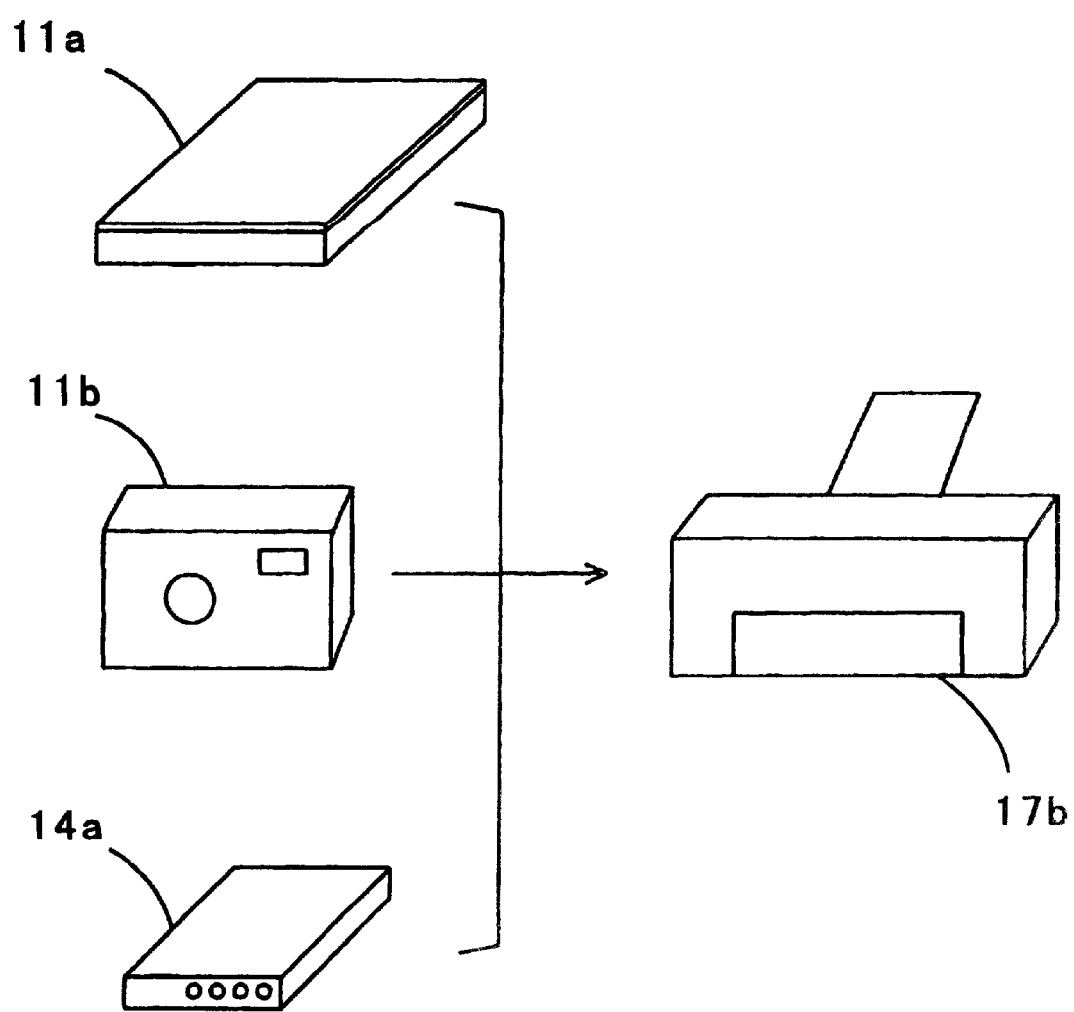
FIG. 8 is a schematic block diagram showing another application example of a printing image data interpolating apparatus of the invention.

For example, as shown in FIG. 8, it is also possible that, in the color printer 17b for receiving and printing image data not via the computer system, image data is directly inputted via the scanner 11a, digital still camera 11b, modem 14a, or the like, a predetermined process which will be described hereinafter is executed in the color printer 17b to convert the image data to printing data, and the printing data is printed.

A process of executing an optimum image process according to the output resolution by using the printing system will now be described.

Figure 9:
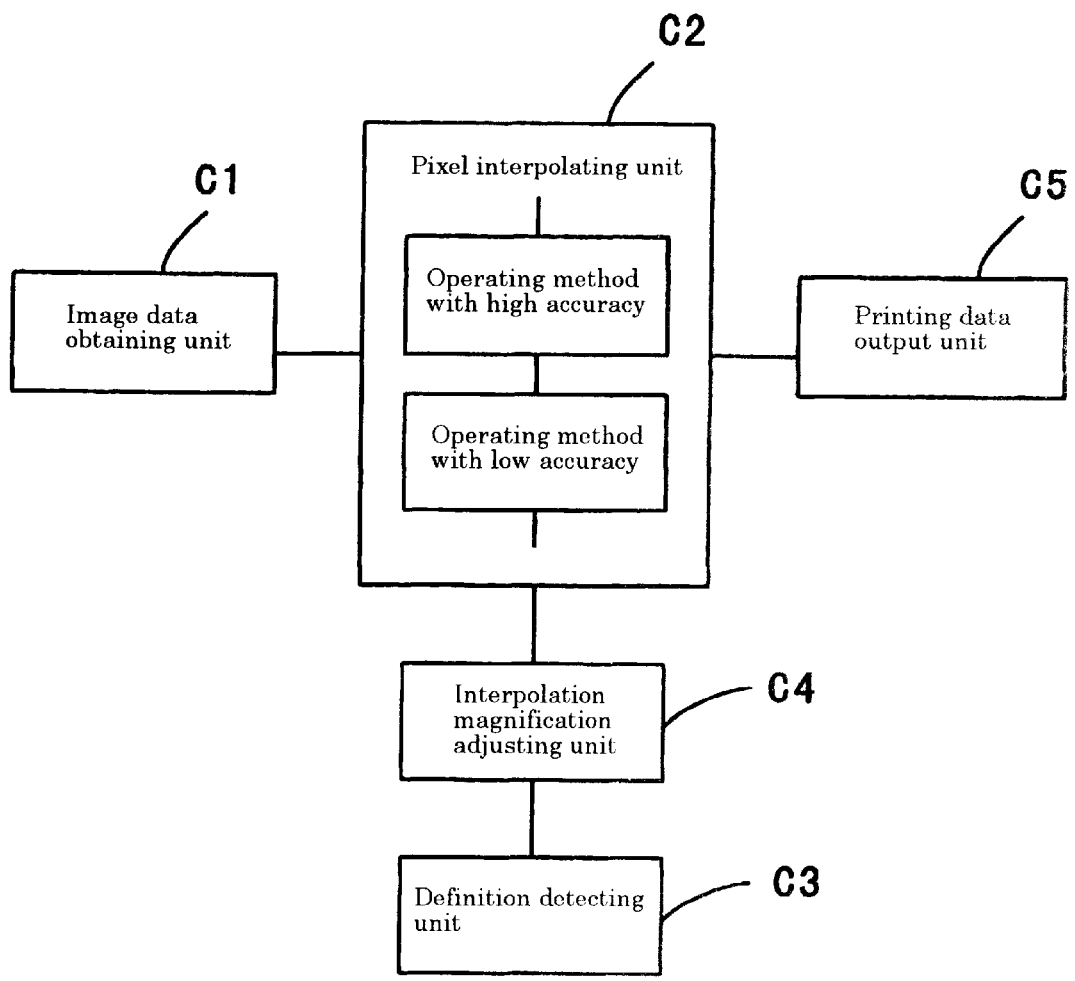
FIG. 9 is a block diagram showing a schematic construction of the printing system.

FIG. 9 shows a schematic configuration of the printing system. In a system of processing data on a pixel unit basis such as a digital printing process, it happens that the recording resolution of the printing apparatus and the resolution of the original image data are different from each other, so that the element pixels are interpolated to make the resolutions coincide with each other. In the printing apparatus, although ink dots of predetermined element colors are applied to paper or the like, the image cannot be always expressed in full colors with high definition unlike an input device such as scanner or display. Although the number of gradations is small, the arrangement of colors is adjusted to improve the reproducibility of the input image data as much as possible. The adjustment cannot be performed by ignoring the visibility of a human and the visibility has a subtle correlation, so that the result according to the theory cannot be always obtained.

In the following, an example of executing an optimum pixel interpolating process in accordance with the printing resolution closely related to the printing quality in the case of interpolating input image data to a resolution by a computing method with high accuracy and interpolating pixels by a computing method with low accuracy so as to compensate the insufficient amount will be described in detail.

In order to perform the process of interpolating the element pixels while considering the visibility of a human having the subtle correlation, when an image data obtaining unit C1 obtains image data which is obtained by expressing an image in multilevel gradations by pixels in a dot matrix, a pixel interpolating unit C2 performs interpolation by the computing method with high accuracy and then performs interpolation by the computing method with low accuracy. When the pixel interpolating unit C2 performs the interpolating process by using the image data as a reference, the definition at the time of printing is detected by a definition detecting unit C3. On the basis of the definition detected by the definition detecting unit C3, an interpolation magnification adjusting unit C4 calculates a shared ratio in the pixel interpolating unit C2. In this case, the interpolation magnification is adjusted so that the higher the definition is, the magnification allocated to the computing method with high accuracy increases. The pixel interpolating unit C2 performs the interpolation by the computing method with high accuracy according to the interpolation magnification adjusted as mentioned above and then performs the interpolation by the computing method with low accuracy. A printing data output unit 5 converts the interpolated image data obtained by the interpolating process to predetermined printing data and outputs the predetermined printing data.

In other words, when the definition detecting unit C3 obtains the printing quality, the interpolation magnification adjusting unit C4 determines the shared ratio allocated to the two interpolating processes in correspondence with the obtained printing quality. Since the quality of the interpolating process changes according to the shared ratio as a whole, the determination of the shared ratio is equal to that the interpolating process is determined. Since the pixel interpolating unit C2 actually switches the pixel interpolation in accordance with the shared ratio, the determined interpolating process is executed. On the basis of the result, the printing data output unit C5 converts the data to predetermined printing data and outputs the printing data. As a whole, it is equivalent to execute the printing control process. Although the interpolating process is determined by deciding the shared ratio in the embodiment, obviously, like an embodiment which will be described hereinafter, a technique of selecting any of plurality of interpolating processes is included.

In the printing system, the printer driver 12c functions as the definition detecting unit C3 and the interpolation magnification adjusting unit C4 together with the image data obtaining unit C1, pixel interpolating unit C2, and printing data output unit C5 in correspondence with the contents of a process which will be described hereinafter. The printer driver 12c is stored in the hard disk 13b, read by the computer body 12 at the time of start and operated. At the time of introduction, the printer driver 12c is recorded on a medium such as a CD-ROM or floppy disk and installed. Consequently, each of the media is the medium on which the printing image data interpolation program is recorded.

In the case of realizing the invention by software, a configuration of using the hardware and the operating system can be employed. It can be also realized without using them. For example, the process for inputting the printing quality can be realized by a method of calling a predetermined function in the operating system, displaying GUI, and performing the inputting process or a method of inputting the printing quality without calling the function. Even when the process is realized by using the operating system in practice, it can be understood that, in a process of recording the program onto a medium and distributing it, the invention can be carried out only by the program.

Figure 10:
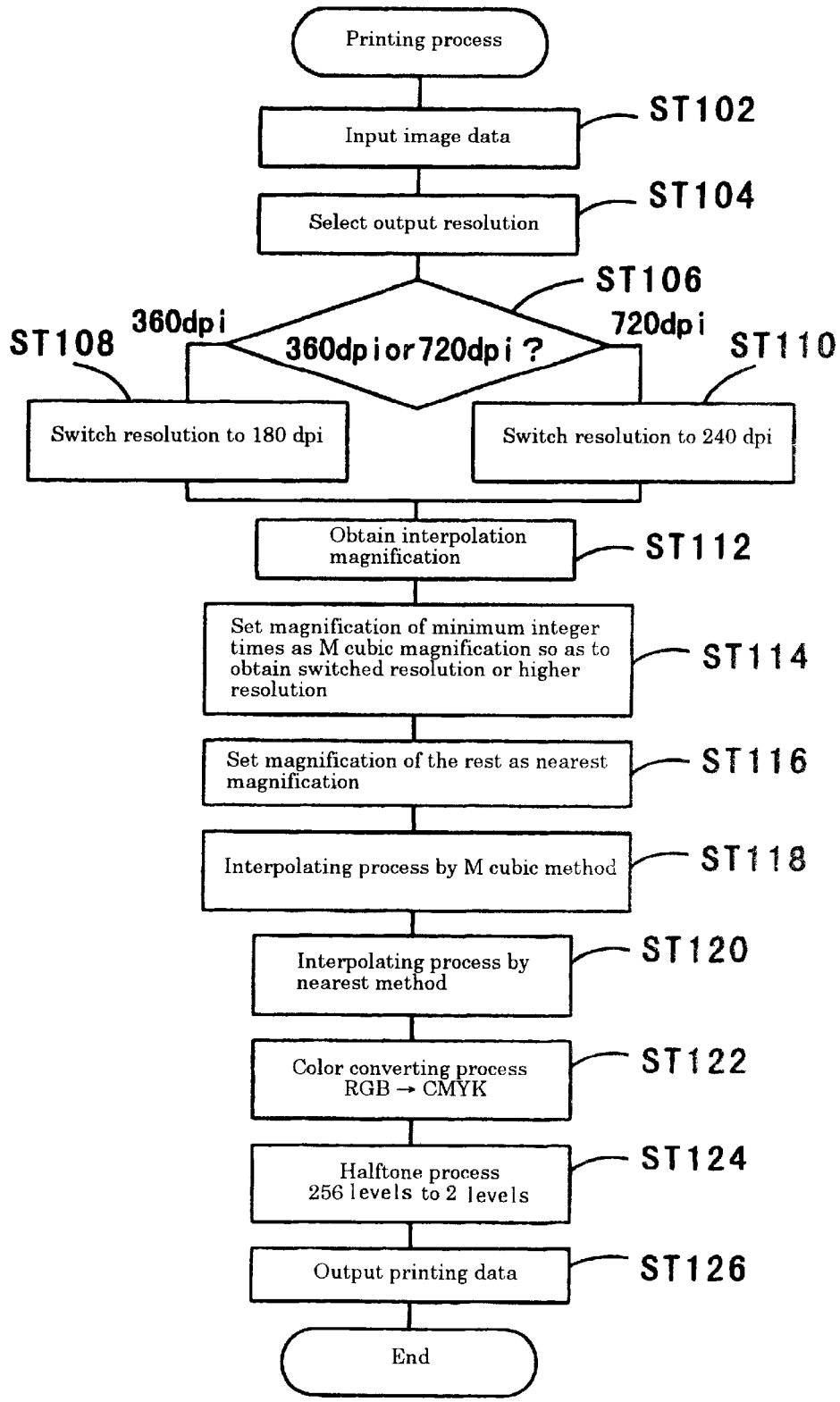
FIG. 10 is a flowchart of a printing process in the printing image data interpolating apparatus of the invention.

A specific process of interpolating the image data by the computer system 10 as described above will now be described. FIG. 10 shows the details of the printing process in the computer system 10.

In step ST102, image data is inputted. For example, when the application 12d reads an image from the scanner 11a, performs a predetermined image process, and performs the printing process, the image data of predetermined resolution is transferred to the printer driver 12c via the operating system 12a. The stage of transfer corresponds to step ST102. Obviously, an image can be read by the scanner 11a.

Figure 11:
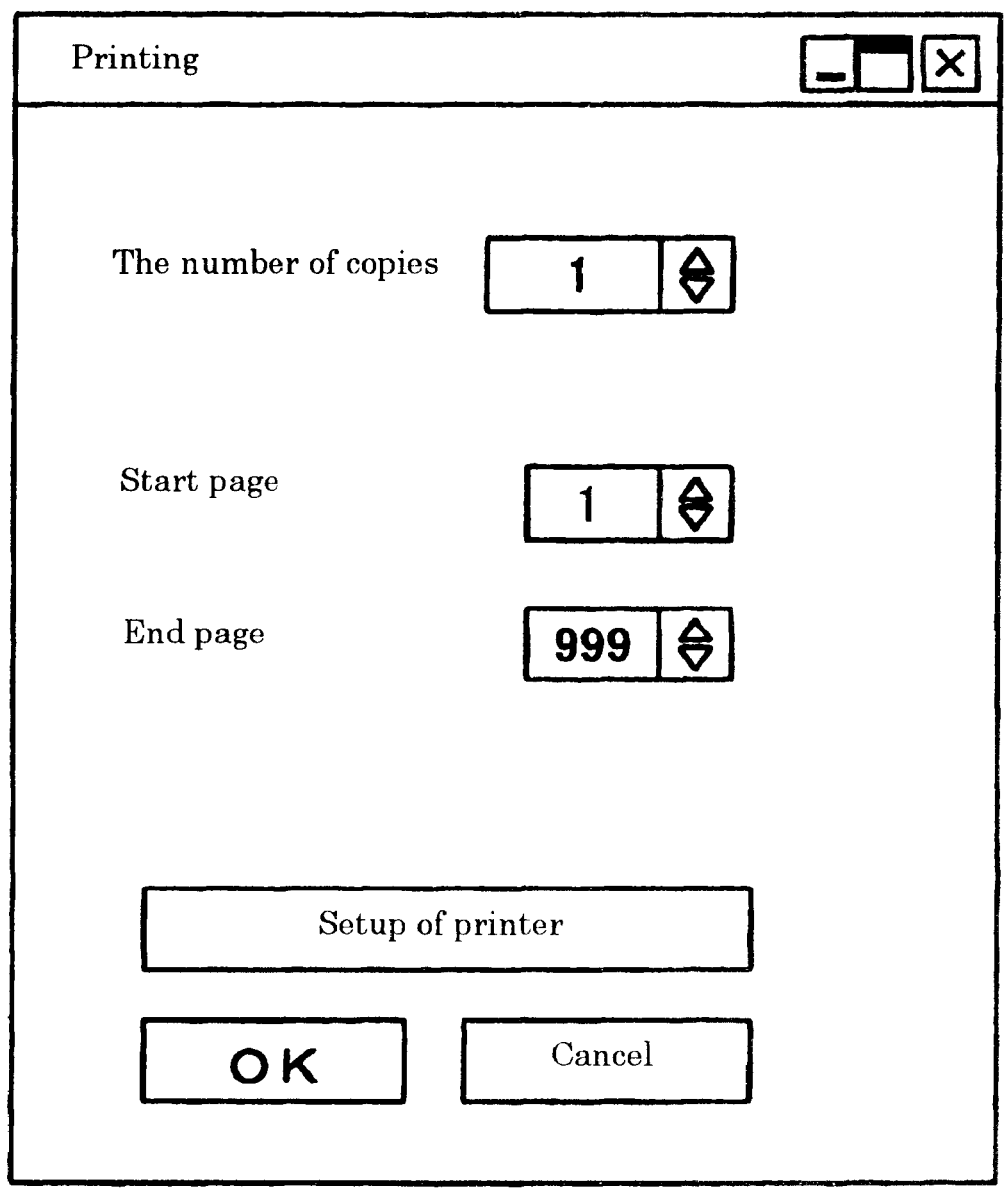
FIG. 11 is a diagram showing an operation window of a printing process.

Step ST102 relates to a process of selecting output resolution in order to obtain definition at the time of printing. Assuming that the operating system 12a provides the GUI environment when the printing process is executed by the application 12d, a window for printing operation is displayed as shown in FIG. 11. Various parameters to be inputted here can be used. As an example, they are "the number of copies (of printing)", "start page", "end page", and the like. As operation instructing buttons, a button of "setup of printer" is prepared as well as "OK" button and "cancel" button.

Figure 12:
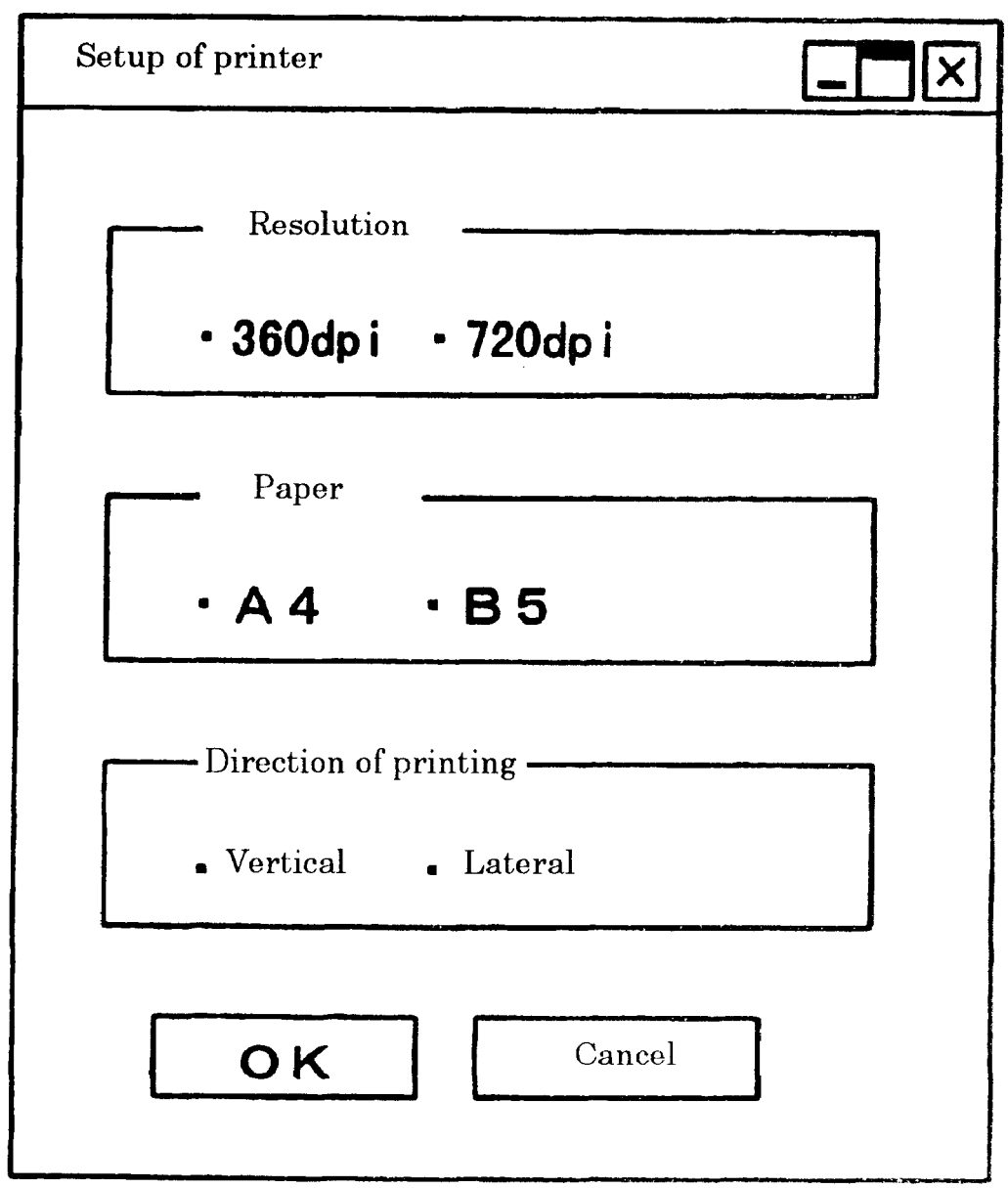
FIG. 12 is a diagram showing an operation window for setup of a printer.

When "setup of printer" is instructed, a window as shown in FIG. 12 is displayed. The window display is prepared to perform various settings according to the function of each printer. In the example, as "(printing) resolution", either "360 dpi" or "720 dpi" can be selected. As "paper", either "A4" or "B5" can be selected. As "direction of printing", either "vertical" or "lateral" can be selected. In the embodiment, the selection of "resolution" has important meaning. When the resolution has already been selected in step ST104, the setup file is referred to and read out. When the operator changes the resolution in association with the printing operation, the resolution after the change is read out as output resolution. In the embodiment, the resolution selected in a software manner on the basis of the window display is detected as definition, but the invention is not limited to the operation of selecting the resolution. The resolution can be properly changed in software and hardware manners. By software, display other than the window can be performed. It is also possible to indirectly select the printing speed, not to directly select the resolution (since the higher the definition is, the speed becomes slower, and the lower the definition is, the speed becomes faster).

In the process of the next step ST106, the process is branched according to the resolution selected. In step ST108 or ST110, a process of setting the switched resolution is performed. Before describing the switched resolution in detail, the flow of the pixel interpolating process will be described. The switched resolution is set to 180 dpi in step ST108 and the switched resolution is set to 240 dpi in step ST110. The interpolation magnification is obtained in step ST112. From the relation between the interpolation magnification and the switched resolution, the interpolation magnification at the first stage is obtained and used as the M cubic magnification in step ST114. Subsequently, the interpolation magnification of the rest is obtained and used as the nearest magnification in step ST116. After that, by using the interpolation magnifications, the interpolating processes are executed in steps ST118 and ST120. The interpolating processes at two stages are performed by different methods. The former one is what is called the interpolation by the computing method with high accuracy. The latter is what is called the interpolation by the computing method with low accuracy.

Methods of the interpolating process executed in the embodiment will be described.

Figure 13:
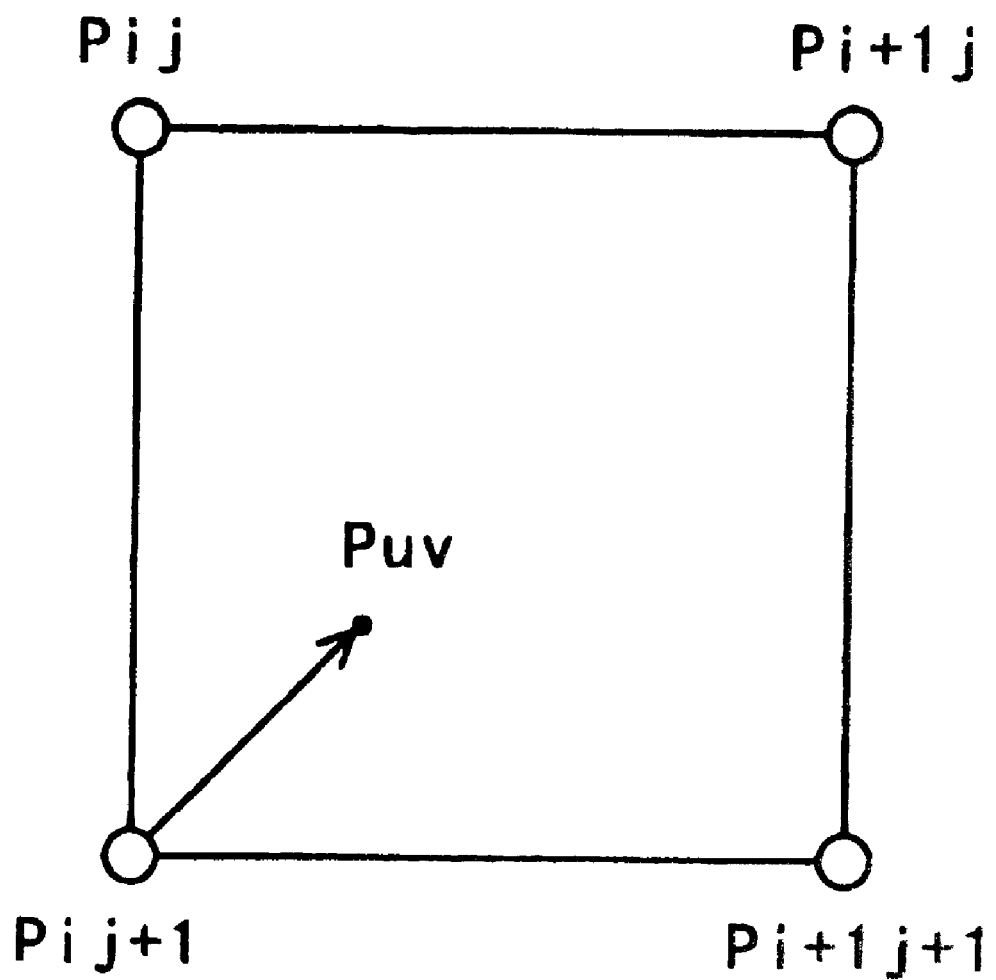
FIG. 13 is a conceptual diagram of the nearest method.

As an interpolating process adapted to an unnatural picture such as computer graphics, the nearest interpolation can be executed in step ST210. According to the nearest method, as shown in FIG. 13, the distance between a point Puv to be interpolated and each of four lattice points Pij, Pi+1j, Pij+1, and Pi+1j+1 is obtained and data at the closest lattice point is moved as it is. This is expressed by the following general expression.

$$Puv = Pij$$

where, i=[u+0.5] and j=[v+0.5]

[ ] is Gauss' notation and denotes that an integer part is taken.

Figure 14:
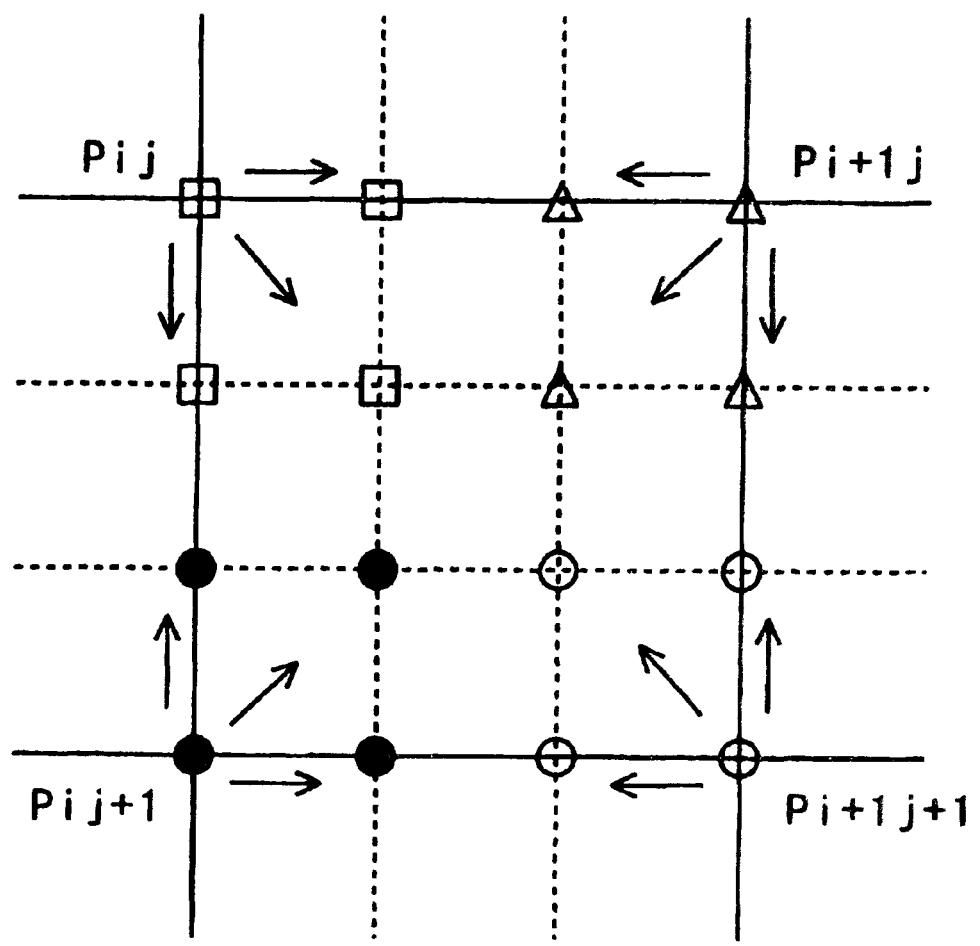
FIG. 14 is a diagram showing a state in which data at lattice points is moved by the nearest method.
Figure 15:
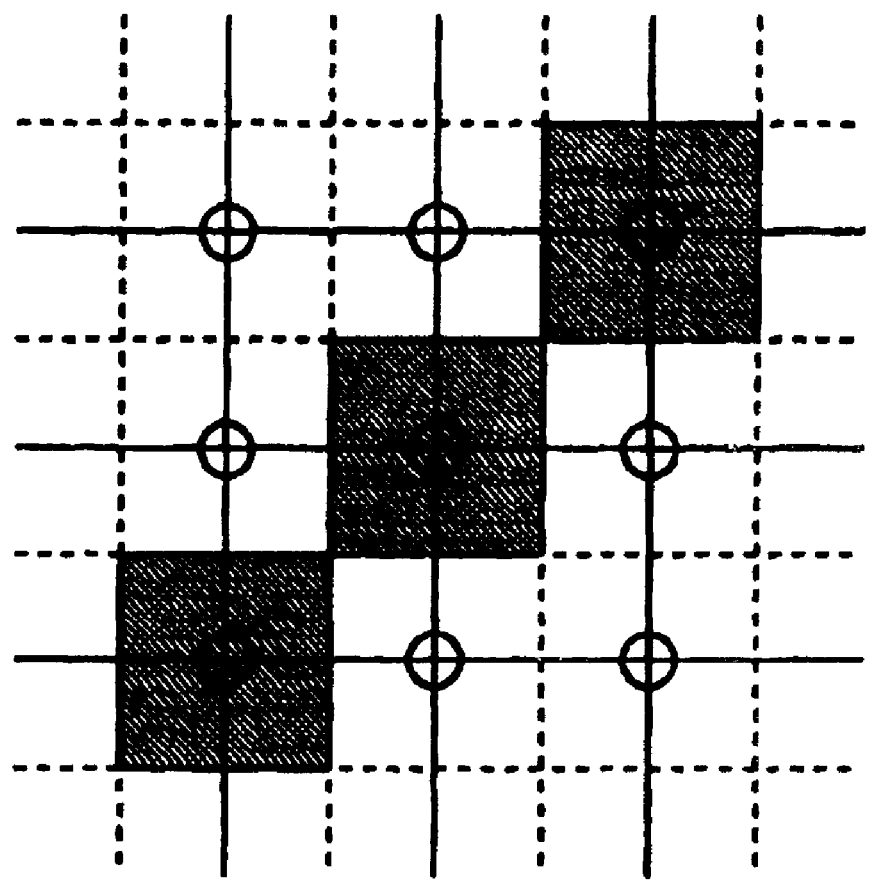
FIG. 15 is a schematic diagram showing a state before the nearest interpolation.
Figure 16:
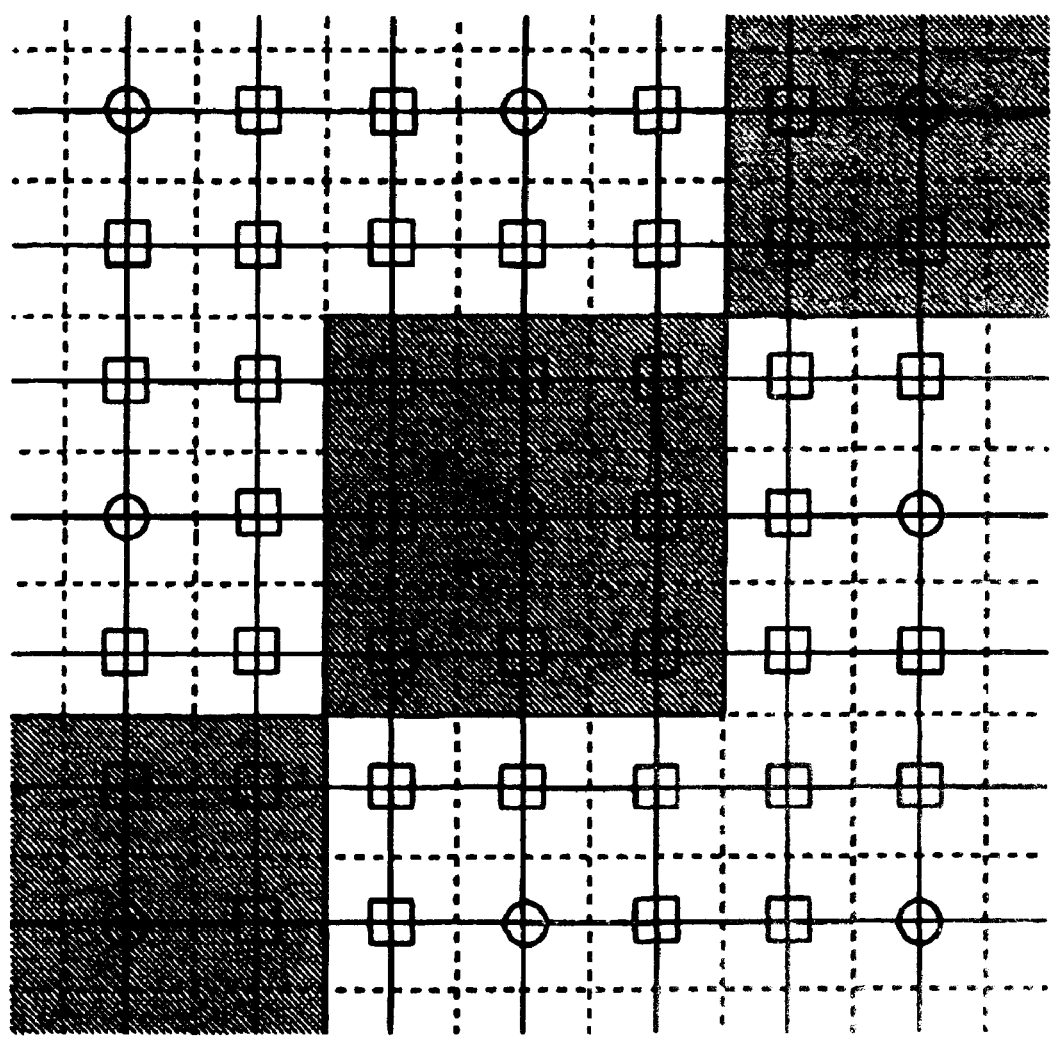
FIG. 16 is a schematic diagram showing a state after the nearest interpolation.

FIG. 14 shows a state of interpolating pixels by three times in vertical and lateral directions by the nearest method. It is assumed that there are pixels (□△○●) at four corners before interpolation. Pixels created by the interpolation are obtained by moving the data of the closest pixel among the pixels as it is. That is, in the example, data is copied to the neighboring pixels of each of the pixels at four corners. By performing the process, an original image in which black pixels are arranged diagonally on white pixels as a background as shown in FIG. 15 is changed to an image in which each of the black pixels is enlarged by three times in the vertical and lateral directions and the black pixels are arranged diagonally as shown in FIG. 16.

The nearest method has a characteristic that the edges of an image are held as they are. When the image is enlarged, although a jaggy is conspicuous, the edge is held as the edge. On the contrary, in the other interpolating processes, the pixel to be interpolated is changed to be smooth by using data of peripheral pixels. Although a jaggy become therefore inconspicuous, the information of the original image is reduced and the edge is rounded. Consequently, the resultant image is not suited as an unnatural image such as computer graphics.

Figure 17:
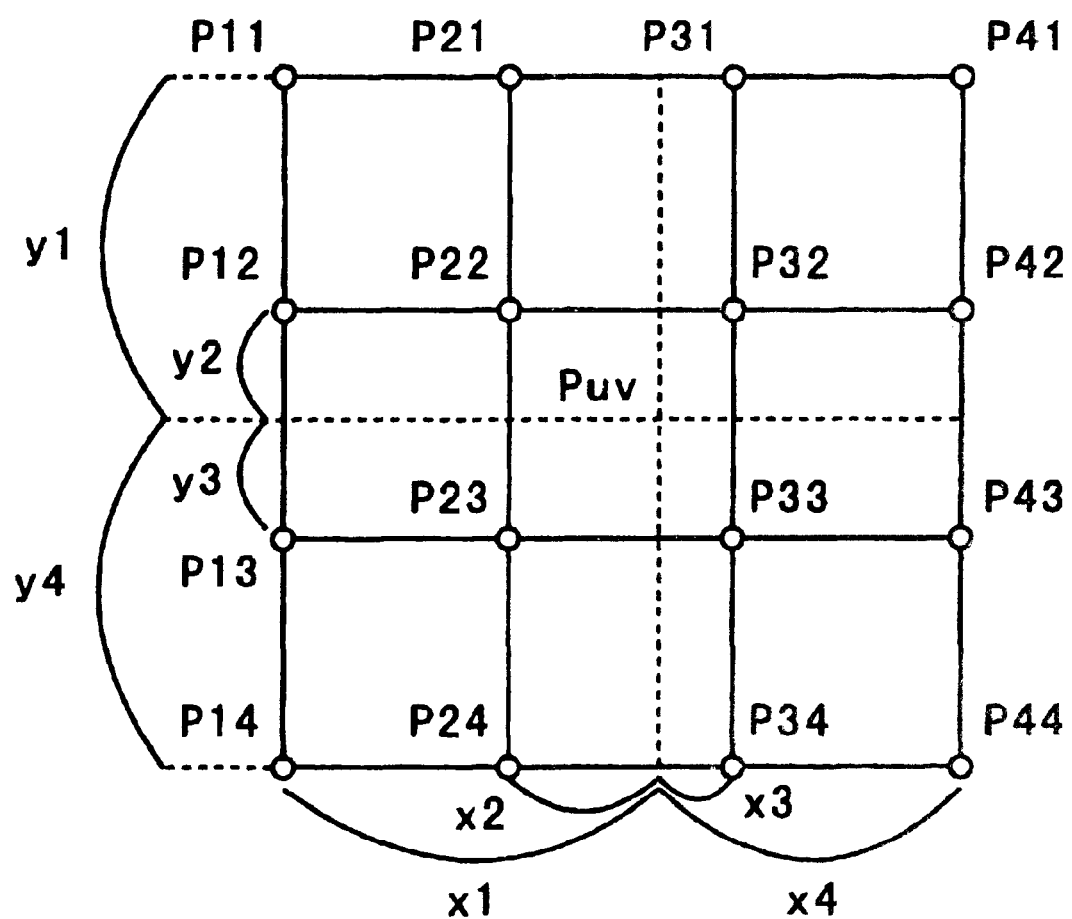
FIG. 17 is a conceptual diagram of the cubic method.

On the other hand, as an interpolating process adapted to a natural picture such as photograph, the cubic interpolation is executed in step ST212. As shown in FIG. 17, the cubic interpolation uses not only data at four corners surrounding the point Puv to be interpolated but also data at total 16 lattice points including lattice points of the outer periphery.

When the total 16 lattice points surrounding the point Puv to be interpolated have respective values, the interpolation point Puv is determined by being influenced by them. For example, in the case of performing the interpolation by a linear expression, it is sufficient to give weight in inverse proportion to the distance from each of two lattice points over the interpolation point. When the X-axis direction is noted, the distance from the interpolation point Puv to each of the 16 lattice points is expressed as follows. In the diagram, the distance from the interpolation point Puv to the lattice point on the left outer side is x1, the distance from the interpolation point Puv to the lattice point on the left inner side is x2, the distance from the interpolation point Puv to the lattice point on the right inner side is x3, and the distance from the interpolation point Puv to the lattice point on the right outer side is x4. The degree of influence corresponding to such a distance is expressed by a function f(x). When the Y-axis direction is noted, the distance from the interpolation point Puv to each of the 16 lattice points is expressed as follows. The distance from the interpolation point Puv to the lattice point on the upper outer side is y1, the distance from the interpolation point Puv to the lattice point on the upper inner side is y2, the distance from the interpolation point Puv to the lattice point on the lower inner side is y3, and the distance from the interpolation point Puv to the lattice point on the lower outer side is y4. Similarly, the degree of influence can be expressed by a function f(y).

Since the 16 lattice points contribute to the interpolation point Puv at the degree of influence according to the distance, a general expression in which the degree of influence in the X-axis and Y-axis directions to data of all of the lattice points is accumulated is as follows.

$$P = [f(y1) f(y2) f(y3) f(y4)] \begin{bmatrix} P11 & P21 & P31 & P41 \\ P12 & P22 & P32 & P42 \\ P13 & P23 & P33 & P43 \\ P14 & P24 & P34 & P44 \end{bmatrix} \begin{bmatrix} f(x1) \\ f(x2) \\ f(x3) \\ f(x4) \end{bmatrix}$$

The degree of influence according to the distance is expressed by a cubic convolution function as follows.

$$f(t) = \{\sin(Bt)\}/Bt$$

The distances x1 to x4 and y1 to y4 are calculated as follows by using the absolute values of the coordinate values (u, v) of the lattice point Puv.

$$x1 = 1 + (u - |u|) \quad y1 = 1 + (v - |v|)$$

$$x2 = (u - |u|) \quad y2 = (v - |v|)$$

$$x3 = 1 - (u - |u|) \quad y3 = 1 - (v - |v|)$$

$$x4 = 2 - (u - |u|) \quad y4 = 2 - (v - |v|)$$

On the above precondition, P is developed as follows.

The degree f(t) of influence according to the distance is approximated by the following cubic expression as called as a cubic convolution function.

$$f(t) = \{\sin(\pi t)\}/\pi t$$
$$\approx \begin{cases} 1 - 2|t|2 + |t|3 & :0 \leq |t| < 1 \\ 4 - 8|t| + 5|t|2 - |t|3 & :1 \leq |t| < 2 \\ 0 & :2 \leq |t| \end{cases}$$

The cubic method has a characteristic such that data is gradually changed as the data approaches from one lattice point to the other lattice point and the degree of change is like what is called a cubic function.

Figure 18:
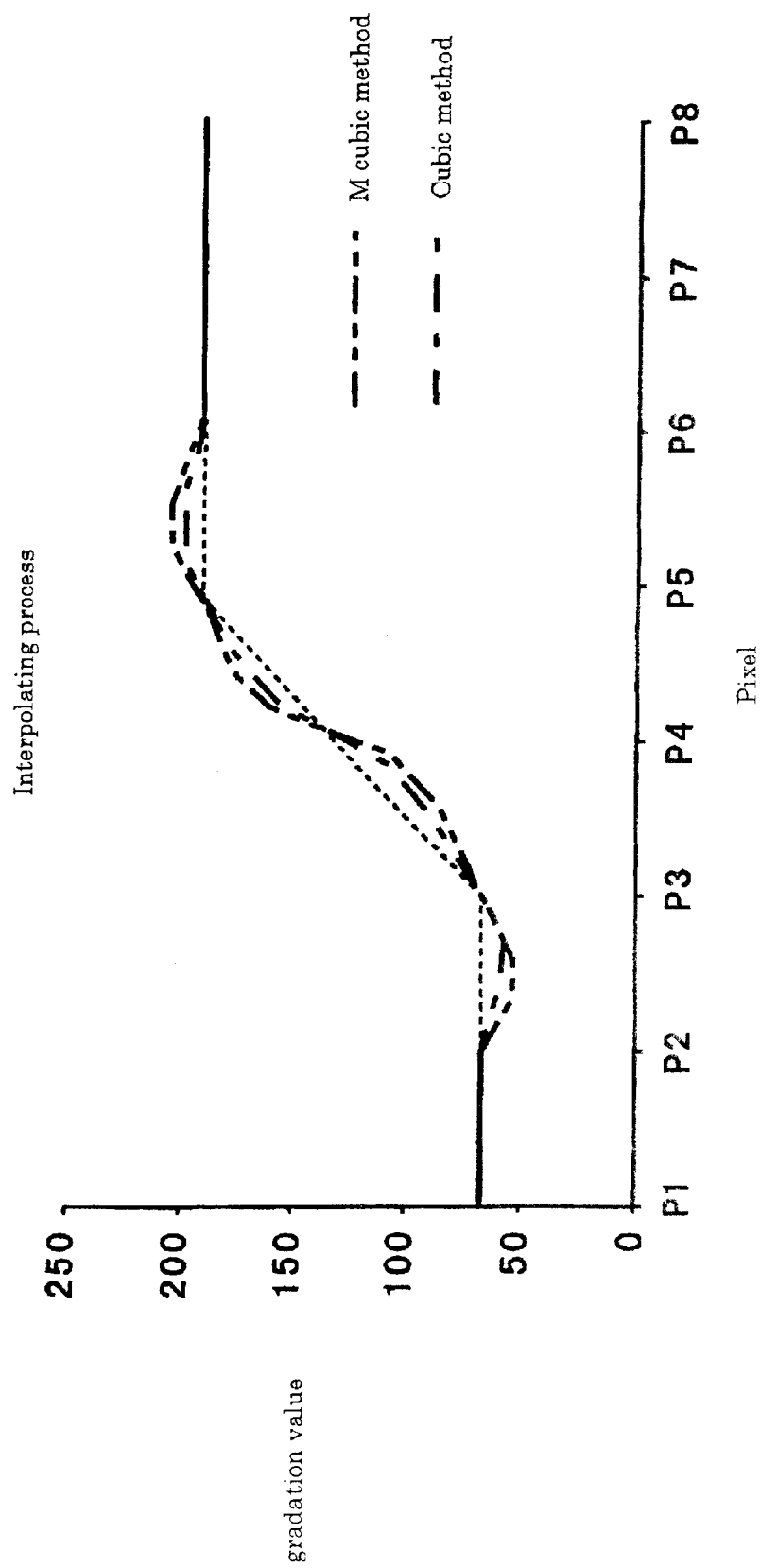
FIG. 18 is a diagram showing a state of change in data in an example of specifically applying the cubic method.

FIGS. 18 and 19 show a specific example of the cubic interpolation. For easy understanding, a model having an edge in the horizontal direction and no change in data in the vertical direction will be described. The number of pixels to be interpolated is three.

First, specific numerical values of FIG. 19 will be explained. The gradation value of the pixel before interpolation is indicated as "Original" on the left line in which four pixels (P0, P1, P2, P3) of the gradation value "64" are arranged. After one pixel (P4) of the gradation value "128", five pixels (P5, P6, P7, P8, P9) of the gradation value "192" are arranged. In this case, the edge corresponds to a part of the pixel of the gradation value "128".

When three pixels (Pn1, Pn2, Pn3) are interpolated between pixels, the distance between neighboring pixels to be interpolated becomes "0.25" and x1 to x4 have numerical values for the interpolation points which are shown in the lines in the middle of the table. In correspondence with x1 to x4, f(x1) to f(x4) are unconditionally calculated. For instance, when x1, x2, x3, and x4 are "1.25", "0.25", "0.75", and "1.75", respectively, the corresponding f(t) are about "−0.14", "0.89", "0.30", and "−0.05". When x1, x2, x3, and x4 are "1.50", "0.50", "0.50", and "1.50", the corresponding f(t) are "−0.125", "0.625", "0.625", and "−0.125". When x1, x2, x3, and x4 are "1.75", "0.75", "0.25", and "1.25", the corresponding f(t) are about "−0.05", "0.30", "0.89", and "−0.14". The result of calculating the gradation values of the interpolation points by using the above result is shown in the right line in the table and expressed in a graph of FIG. 18. The implication of the graph will be described in detail hereinafter.

When it is regarded that there is no change in data in the vertical direction, the arithmetic operation is simplified. Referring to only the data (P1, P2, P3, P4) at four lattice $$\begin{aligned} P &= [f(y1) f(y2) f(y3) f(y4)] \begin{bmatrix} P11 \cdot f(x1) + P21 \cdot f(x2) + P31 \cdot f(x3) + P41 \cdot f(x4) \\ P12 \cdot f(x1) + P22 \cdot f(x2) + P32 \cdot f(x3) + P42 \cdot f(x4) \\ P13 \cdot f(x1) + P23 \cdot f(x2) + P33 \cdot f(x3) + P43 \cdot f(x4) \\ P14 \cdot f(x1) + P24 \cdot f(x2) + P34 \cdot f(x3) + P44 \cdot f(x4) \end{bmatrix} \\ &= f(y1)\{P11 \cdot f(x1) + P21 \cdot f(x2) + P31 \cdot f(x3) + P41 \cdot f(x4)\} + \\ &\quad f(y2)\{P12 \cdot f(x1) + P22 \cdot f(x2) + P32 \cdot f(x3) + P42 \cdot f(x4)\} + \\ &\quad f(y3)\{P13 \cdot f(x1) + P23 \cdot f(x2) + P33 \cdot f(x3) + P43 \cdot f(x4)\} + \\ &\quad f(y4)\{P14 \cdot f(x1) + P24 \cdot f(x2) + P34 \cdot f(x3) + P44 \cdot f(x4)\} \\ &= P11 \cdot f(x1) \cdot f(y1) + P21 \cdot f(x2) \cdot f(y1) + P31 \cdot f(x3) \cdot f(y1) + P41 \cdot f(x4) \cdot f(y1) + \\ &\quad P12 \cdot f(x1) \cdot f(y2) + P22 \cdot f(x2) \cdot f(y2) + P32 \cdot f(x3) \cdot f(y2) + P42 \cdot f(x4) \cdot f(y2) + \\ &\quad P13 \cdot f(x1) \cdot f(y3) + P23 \cdot f(x2) \cdot f(y3) + P33 \cdot f(x3) \cdot f(y3) + P43 \cdot f(x4) \cdot f(y3) + \\ &\quad P14 \cdot f(x1) \cdot f(y4) + P24 \cdot f(x2) \cdot f(y4) + P34 \cdot f(x3) \cdot f(y4) + P44 \cdot f(x4) \cdot f(y4) \end{aligned}$$

points which are arranged in the horizontal direction, it can be calculated as follows by using the degree f(t) of influence according to the distance between the interpolation point to each lattice point.

$$P=P1 \cdot f(x1)+P21f(x2)+P3 \cdot f(x3)+P4 \cdot f(x4)$$

The interpolation point P21 is therefore calculated as follows.

$$\begin{aligned}P21 &= 64*f(1.25)+64*f(0.25)+64*f(0.75)+128*f(1.75)\\ &= 64*(-0.14063)+64*(0.890625)+64*(0.296875)+\\ &\quad 128*(-0.04688)\\ &= 61\end{aligned}$$

According to the cubic method, it can be expressed in a cubic function manner. By adjusting the shape of the curve, the quality of the interpolation result can be changed.

As an example of the adjustment, the following method will be called an M cubic method.

$$0<t<0.5\ f(t)=-(8/7)t^{}3-(4/7)t^{}2+1\ 0.5<t<1\ f(t)=(1-t)(10/7)$$

$$1<t<1.5\ f(t)=(8/7)(t-1)^{}3+(4/7)(t-1)^{}2-(t-1)1.5<t<2\ f(t)=(3/7)(t-2)$$

FIG. 20 shows a specific example of the M cubic interpolation and a result of interpolation with respect to the same model assumed as that of the case of the cubic interpolation. FIG. 18 also shows the result of the M cubic interpolation process. In the example, a cubic functional curve is slightly shape and the entire image is shape.

That is, although the nearest method has an extremely small amount of the computing process, an edge part where a change in an image is large appears as a jaggy, so that it can be said as the operation with low accuracy. Although the M cubic method exerts a preferable influence such that a step is not created while enhancing sharpness in a photograph or the like, the amount of computing process is large since the cubic convolutional function is used, so that it can be said as the operation with high accuracy.

The reason why the two computing processes having different characters are executed as mentioned above is because there are the following advantages.

Since the computing process amount required for one interpolating pixel is large in the M cubic method, when the interpolation magnification becomes large, the interpolating process cannot be employed substantially. On the other hand, when the interpolating process is executed for printing, it often solves the difference between resolutions. In many cases, the resolution of the printing apparatus is increased to improve the picture quality in spite of the low gradation printing. In practice, when the diameter of a dot is reduced to a certain degree, a good picture quality cannot be always obtained by the computing process with high accuracy. That is, a phenomenon such that when the dot diameter is reduced over a certain degree, the picture quality cannot be so improved for the degree of increase in the computing process amount occurs. Consequently, when the M cubic interpolation is performed to a certain degree and, after that, the nearest interpolation is carried out, an effect such that the picture quality does not change largely and the amount of the computing process is reduced relatively largely can be produced.

When the interpolation magnification is obtained in step ST112, the M cubic magnification has to be set in step ST114 and the nearest interpolation magnification has to be set in step ST116 so as to achieve the interpolation magnification by two stages. The switched resolution is necessary to allocate the magnification. That is, in order to maintain the balance in magnification between the computing process amount and the picture quality, not to decide the ratio between the M cubic magnification and the nearest magnification so as to be constant, but the M cubic interpolation is performed so as to obtain the switched resolution or higher and the rest interpolation magnification is attained by the nearest interpolation.

A resolution is not switched so as to coincide with the switched resolution by the M cubic interpolation and the insufficient amount is not interpolated by the nearest method, but the minimum integer times so that the resolution exceeds the switched resolution is used as the M cubic magnification for the following reason. In the case of performing an interpolating process at an arbitrary magnification, all of pixels of the interpolated image data have to be calculated by computing operation so that the computing time takes long. On the contrary, in the case of using the integer times, pixels of a part coincide with lattice points of the existing pixels, so that the substantial computing process amount can be reduced.

Figure 21:
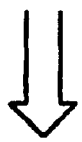
FIG. 21 is a schematic diagram showing an interpolating process of integer times.

FIG. 21 shows a processing example of interpolating data by twice in both horizontal and vertical directions. A variable area of the interpolated image data is preliminarily assured. In the case of the interpolating process of integer times, the image data of the original image becomes image data of pixels corresponding to coordinate values obtained by the interpolation of integer times. In the example shown in the diagram, old coordinate values (0, 0) correspond to new coordinate values (0, 0), old coordinate values (1, 0) correspond to new coordinate values (2, 0), old coordinate values (0, 1) correspond to new coordinate values (0, 2), and old coordinate values (1, 1) correspond to new coordinate values (2, 2).

That is, even if the interpolating process itself can be executed at an arbitrary magnification, only the interpolating process of integer times is accepted, so that the number of pixels to be computed is decreased and the speed of the process can be increased.

Although the interpolation magnification of the M cubic method and the interpolation magnification of the nearest method are adjusted by using the switching resolution, the switching resolution itself is changed in steps ST108 and ST110 in accordance with the output resolution for the following reason.

As a specific example, it is assumed that image data to be inputted is of resolution of 170 dpi and another one is of 185 dpi. A case where the output resolution is set to 360 dpi is compared with a case where the output resolution is set to 720 dpi in a state where the switching resolution is fixed at 180 dpi. In this case, the former image data is interpolated by twice t0 340 dpi by the M cubic method. The latter image data is not interpolated by the M cubic method. When the output resolution is 360 dpi, it cannot be said the definition of printing is high. Consequently, even when the former image data which is subjected to the M cubic interpolation and the latter image data which is not subjected to the M cubic interpolation become 360 dpi finally, the reversal phenomenon of the picture quality does not occur. When the output resolution is 720 dpi, however, the improved amount of the picture quality of the former can be recognized by an amount of definition which becomes higher, so that the reversal phenomenon occurs.

Since the difference is based on such subtle perception, it cannot be said that increase of the switching resolution in proportional to the output resolution is optimum. Further, since the tolerance for the computing process time is also a factor, the switching resolution has to be determined by experiments or the like. In the case of the embodiment, the balance is considered. When the output resolution is 360 dpi, the switching resolution is set to 180 dpi. When the output resolution is 720 dpi, the switching resolution is set to 240 dpi. That is, the output resolution is doubled, and the switching resolution becomes higher by 1.33 . . . times.

When the above-mentioned example is applied to the case, with respect to the M cubic magnification when the output resolution is set to 720 dpi, since 170 dpi and 185 dpi are lower than the switching resolution 240 dpi, twice is set so that both of 170 dpi and 185 dpi become higher than 240 dpi by integer times. The resolutions 170 dpi and 185 dpi are interpolated to 340 dpit and 370 dpi by the M cubic method and the rest of 720/340 times and 720/370 times is interpolated by the nearest method. Since the resolutions are interpolated to 340 dpit and 370 dpi by the M cubic method, the reversal of the picture quality does not occur. Although the nearest magnification is not integer times, since the original computing amount is small, it is not a big problem.

Although it has been described that the resolution is designated for the image data for easy understanding, the application 12$d$ transfers the output size and image data to the operating system 12$a$ in practice. The example of this case will be described.

It is assumed that the application 12$d$ requests printing of an image of the VGA size (640×480 pixels) by designating the 2L printing size (16×12 cm). The 2L printing size is 6.299×4.724 inches and has 101.6 dpi. When the output resolution is set to 720 dpi, the switched resolution is 240 dpi and the interpolation magnification in the M cubic method of the minimum integer times by which 240 dpi or higher is obtained is three times. By the interpolating process of three times, 304.8 (101.6×3) dpi is obtained. Consequently, the interpolating process of (720/304.8) times for the rest by the nearest method is performed.

In other words, when the final resolution is 720 dpi, the 2L printing size has 4536×3401 pixels. The total interpolation magnification is 4536/640=7.0875. When the minimum integer magnification is three and is used as M cubic magnification, the nearest magnification is 7.0875/3= 2.3625.

When the interpolating process is finished in step ST118 or ST120, the color converting process is performed in the following step ST122. As described above, the application 12$d$ transfers only the image data of RGB 256 levels to the operating system 12$a$. By the interpolating process executed above, only the number of pixels is changed but the RGB 256 levels remain. The image data is converted from the RGB color space to the CMYK color space in accordance with the color ink used by the color printer 17$b$. Since the color conversion is not unconditionally determined by using a numerical expression, basically, a lookup table in which the correspondence is preliminarily obtained is used. In this case as well, it is also possible to prepare a huge lookup table of all colors and obtain the correspondence. It is also possible to prepare a relatively small lookup table having a smaller number of colors and compensate the insufficient amount by the interpolating operation.

The gradations of the color data of CMYK referred to by the lookup table do not always have to be 256 levels. Once the correspondence is determined, however, if multilevel gradations are not used, an unexpected result may be obtained. Consequently, separately in step ST124, a halftone process to two levels according the performance of the color printer 17$b$ is performed. According to the halftone process, although the number of gradations is small, a color deviation can be minimized in a macro manner by using a number of dots.

The printing data of CMYK 2 levels obtained finally as mentioned above is outputted to the color printer 17$b$ in step ST126. A specific form of the printing data may change according to the printing apparatus. It is not always necessary that the printing data is directly outputted to the printing apparatus but can be stored in a file format. The output of the printing data therefore denotes the transfer of the data to the next stage.

The above example has been described on the precondition that the printing performance of the color printer 17$b$ is two levels and the printing resolution can be selected. It is similarly applied to an ink jet printer using a bubble jet pump mechanism or the electrophotographic color printer 22. There are, however, printers which can express many levels such as a sublimation type color printer. In this case, the definition of the printing includes the factor of the gradations in addition to the resolution. An embodiment in which the gradations can be changed will be described hereinbelow.

Figure 22:
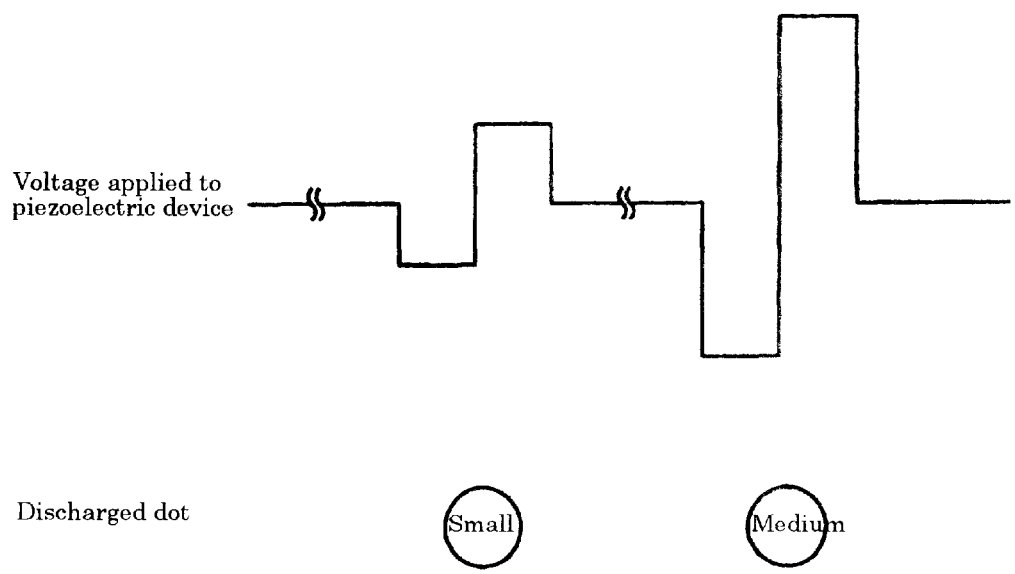
FIG. 22 is a diagram showing the waveform of a voltage signal applied to a piezoelectric device when the diameter of a dot is changed.

FIGS. 22 to 25 show an ink jet color printer having a micropump mechanism using the piezoelectric device illustrated in FIGS. 3 to 5 in which the diameter of a dot can be changed. It is assumed that a voltage applied to the piezoelectric device 21$a$5 is changed in order to change the dot diameter. The waveform of the application voltage is shown in FIG. 22. Since the direction of deformation of the piezoelectric device 21$a$5 varies according to the polarity of the application voltage, as shown in the waveform of the drawing, when a negative voltage is applied first, the ink chamber 21$a$4 is expanded. Subsequently, a positive voltage is applied to discharge the color ink particle. The voltages will be called a pull voltage and a push voltage, respectively. In the case of a small pull and a small push, the small color ink particle is discharged. In the case of a large pull and a large push, the large color ink particle is discharged. The small color ink particle is called a small dot and the large color ink particle is called a medium dot.

Figure 23:
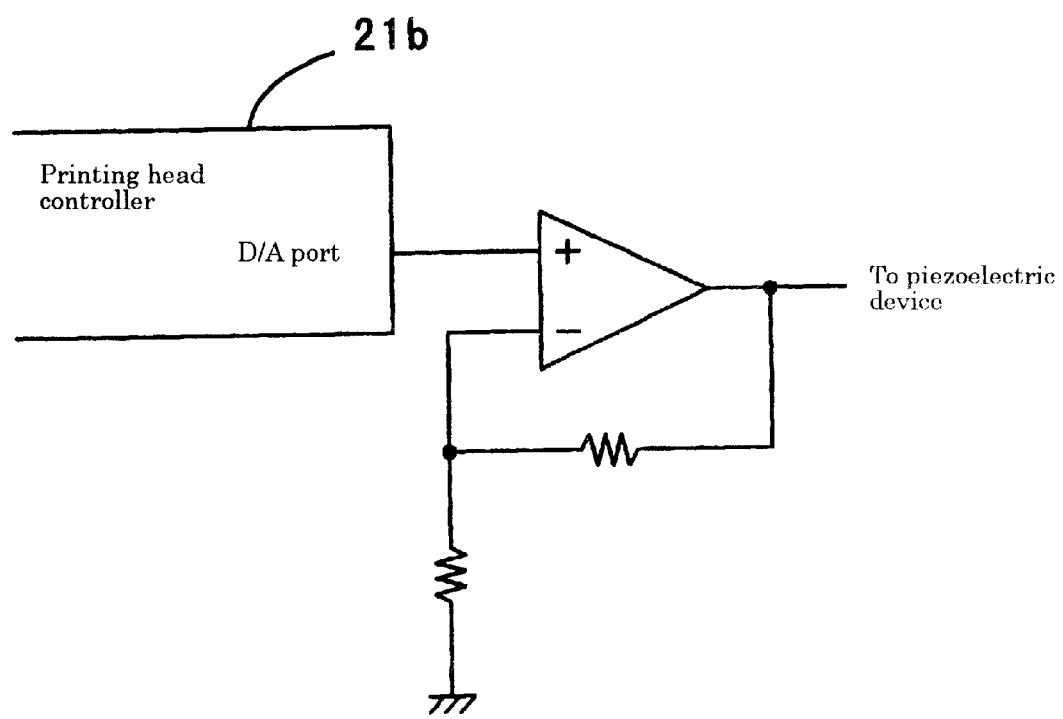
FIG. 23 is a diagram showing the waveform of a voltage signal applied to the piezoelectric device when the diameter of a dot is changed.

With respect to the hardware, as shown in FIG. 22, the printing head controller 21$b$ is provided with a D/A port capable of arbitrarily changing the output voltage. A driving voltage is outputted to the piezoelectric device 21$a$5 via an operational amplifier as shown in FIG. 23.

Figure 24:
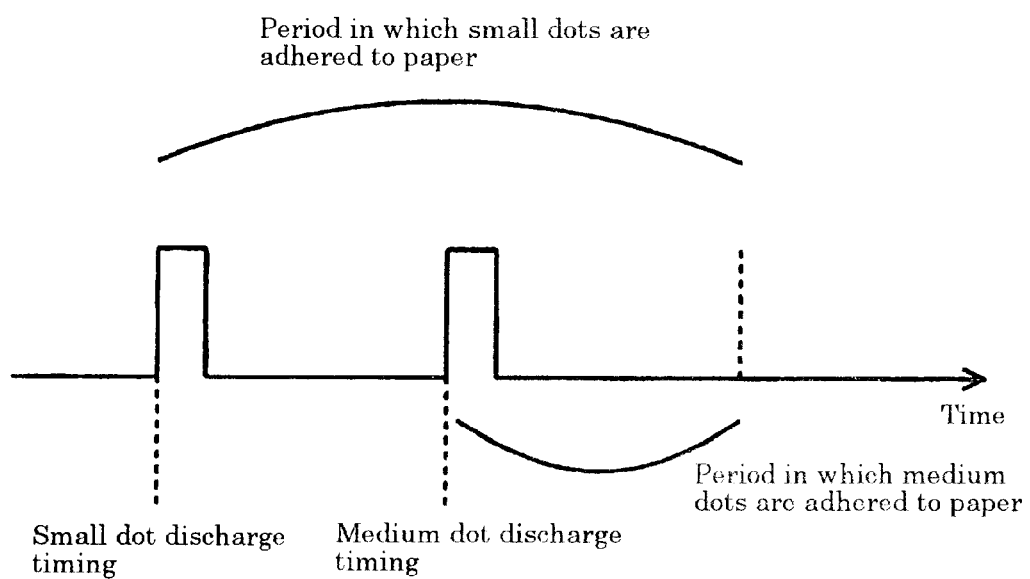
FIG. 24 is a diagram showing a dot discharge timing and a timing at which the dot is applied to paper.

The difference in driving voltage exerts an influence on not only the dot diameter of the color ink particle but also the discharge speed. FIG. 24 shows the discharge timings of the small and medium dots. Since there is a predetermined distance between the printing head 21$a$ and a sheet of paper, time required for the color ink to reach the sheet varies according to the discharge speed. On the other hand, since the printing head 21$a$ itself moves in the shifting direction, when the discharge timing in the case of the high discharge speed and that in the case of the low discharge speed are the same, dot application positions become different. In the example, it is set that the discharge timing of the small dot and that of the medium dot are deviated, and the deviation is adjusted so that the timings at which the color ink particles are applied to the sheet coincide with each other. As a matter of course, the deviation of timings is set for each position in the shifting direction. When the dot to be applied is small, the color ink particle is discharged at the small dot discharge timing. When the dot to be applied is medium, the color ink particle is discharged at the medium dot discharge timing which is slightly delayed. Both of the color ink particles can be also discharged. In this case, by applying driving voltages at both of the small dot discharge timing and the medium dot discharge timing corresponding to one pixel, the color ink particles are continuously discharged. At the timing when the color ink particles are applied to the paper face, both of the small and medium dots are integrated and applied onto the paper.

Figure 25:
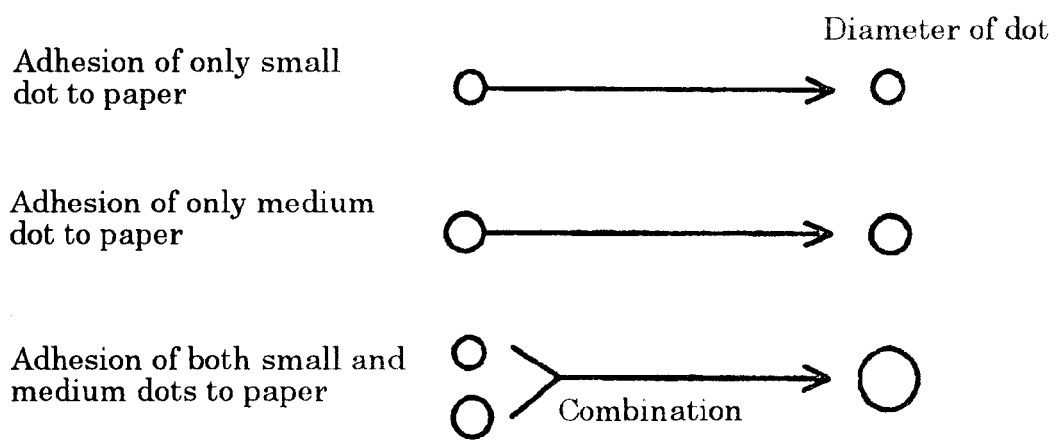
FIG. 25 is a diagram showing a change in dot diameter when a small dot and a medium dot are used.

FIG. 25 shows the sizes of dots formed on the paper face by the discharge of the color ink particles. There are a case where a small dot is applied, a case where a medium dot is applied, and a case where both of the small and medium dots are compositely applied. There are three kinds of sizes of dots applied. When a state where nothing is applied is included, four kinds exists. Since it can be said that the size of the dot is the intensity of appearance of the color, the number of gradations is four.

That is, while enabling application voltages of two kinds to be outputted by the printing head controller 21b, two timings for small and medium dots per pixel are prepared as output timings. The application voltages at the timings are on/off controlled, thereby enabling the printing of four levels to be performed.

Figure 26:
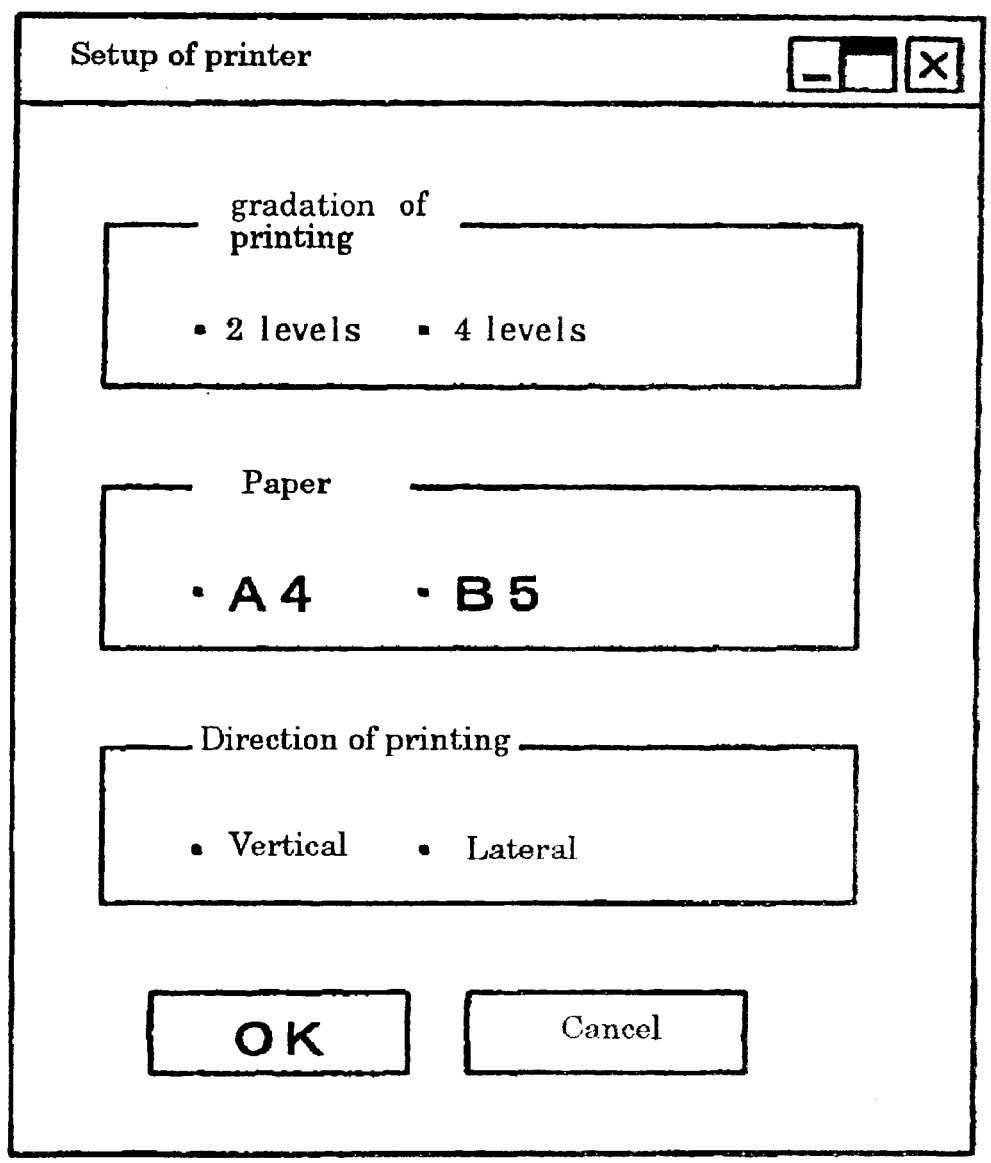
FIG. 26 is a diagram showing an operation window for setup of the printer.

On the other hand, FIG. 26 shows an operation window for setting the printer when the four-shade printing can be performed. In the "resolution" can be selected as definition at the time of printing. In the example, "2 levels" or "4 levels" can be selected as the "printing gradations". The others such as "paper" and "direction of printing" are the same. Although the case where the resolution is fixed to 720 dpi will be described, obviously, the resolution itself can be also selected.

Figure 27:
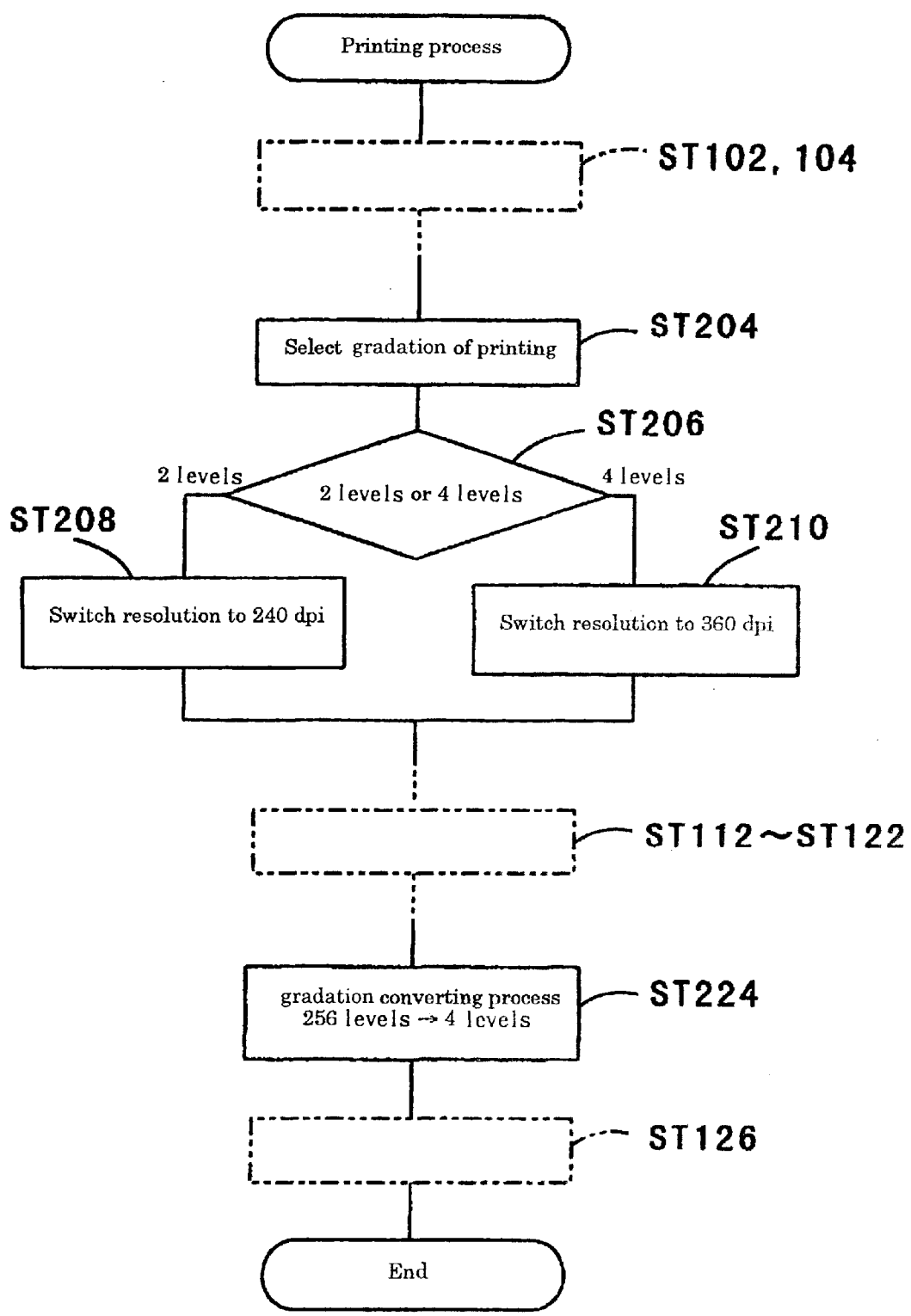
FIG. 27 is a flowchart of a printing process when the level of gradation can be changed.

FIG. 27 is a partial flowchart showing a point different from the printing process of FIG. 10 when the printing is performed by the color printer whose gradations can be changed. The process in the second step from the bottom in the flow shown in FIG. 27 and that in the second step from the bottom in the flow shown in FIG. 10 are different from each other and the other processes are the same.

In step ST204, the process of selecting the printing gradation is performed. In a manner similar to the above-mentioned case, when the gradation has been set already, it is read. When an operation of inputting the printing option is executed, the gradation inputted is obtained. In step ST206 after that, whether the gradation obtained is 2 levels or 4 levels is determined. In the case of 2 levels, the switching resolution is set to 240 dpi in step ST208. In the case of 4 levels, the switching resolution is set to 360 dpi in step ST210.

When the gradation is doubled, the number of dots necessary to output full colors is reduced to the half. When it is considered that theoretical resolution is two dimension in the vertical and lateral directions, the theoretical resolution is 2**(½) times. By reflecting it, a switching resolution approximately as mentioned above is set. In the case of selecting either 64 levels or 256 levels, the number of dots necessary to output full colors is reduced to ¼ and the theoretical resolution is twice.

By using the switching resolution set as mentioned above as a reference, after setting the M cubic magnification and the nearest magnification in steps ST112 to ST122, the respective interpolating processes are executed. In this case as well, the M cubic magnification is the minimum integer times so as to obtain the switching resolution or higher resolution and the remaining magnification is interpolated by the nearest method.

As mentioned above, when the switching resolution remains 240 dpi although the theoretical expression resolution becomes high, the image data of 230 dpi is interpolated by the M cubic method so that the resolution exceeds 240 dpi and the image data of 245 dpi is not interpolated by the M cubic method. In this case, since the switching resolution is sufficiently high, there is hardly a difference in the picture quality between the displays in two levels.

When the theoretical expression resolution increases in association with the change to the four-shade display, the image data of 230 dpi which is subjected to the interpolating process of twice as the minimum integer times so that the resolution exceeds 240 dpi has the better picture quality than the image of 245 dpi which is subjected to the nearest interpolation so that the resolution becomes 720 dpi. In this way, the reverse phenomenon occurs.

On the contrary, by raising the switching resolution to 360 dpi while displaying 4 levels, the image data of 245 dpi is also interpolated by twice according to the M cubic method, so that the reverse phenomenon does not occur. With respect to the image data of 350 dpi and that of 365 dpi, although only the former is subjected to the M cubic interpolation, it can be said that the difference between the images in the case of the four-shade display cannot be visually recognized.

Although the 256 levels are converted to 2 levels in the halftone process in step ST124 in the other case, the gradation is converted from the CMYK 256 levels to the CMYK 4 levels in step ST224.

As mentioned above, in the computer system 10 including the ink jet color printer 17b and the like, the interpolating process is executed when the resolution of the color printer 17b and that of the original data do not coincide with each other. The interpolating process is performed in such a manner that image is first interpolated to have the switching resolution or higher by the computing process with high accuracy and then interpolated to attain the final resolution by the computing process with low accuracy. The switched resolution is varied according to the definition at the time of printing of the color printer 17b. Consequently, as the final definition becomes higher, the magnification allocated to the computing process with high accuracy increases. The reverse phenomenon such that the picture quality deteriorates inspite of high definition can be suppressed.

As described above, the embodiment has the configuration comprising: the image data obtaining unit for obtaining image data expressed in multilevel levels, which is obtained by expressing an image by pixels in a dot matrix state; the pixel interpolating unit for performing interpolation by a computing method with high accuracy and then performing interpolation by a computing method with low accuracy at a predetermined shared ratio when the pixels in the dot matrix of the image expressed in multilevel levels are interpolated so as to realize a predetermined interpolation magnification; definition detecting unit for detecting the definition of printing when the interpolating process is performed by the pixel interpolating unit to the image data as a reference; an interpolation magnification adjusting unit for adjusting the interpolation magnification so as to increase the shared ratio allocated to the computing method with high accuracy as the definition increases when the shared ratio in the pixel interpolating unit is calculated on the basis of the definition detected by the definition detecting unit; and a printing data output unit for converting the image data interpolated at the shared ratio determined by the interpolation magnification adjusting unit to predetermined printing data and outputting the predetermined printing data.

In the case of the configuration, when the image data obtaining unit obtains the image data which is derived by expressing an image at multi-level levels by the pixels in a dot matrix state, the pixel interpolating unit interpolates the image data by the computing method with high accuracy and then by the computing method with low accuracy. When the image data is used as a reference and interpolated by the pixel interpolating unit, the definition at the time of printing is detected by the definition detecting unit. On the basis of the definition detected by the definition detecting unit, the interpolation magnification adjusting unit calculates the shared ratio in the pixel interpolating unit. The interpolation magnification is adjusted so that the higher the definition is, the shared magnification allocated to the computing method with high accuracy increases. The pixel interpolating unit interpolates the data by the computing method with high accuracy in accordance with the interpolation magnification adjusted as mentioned above and then by the computing method with low accuracy. The printing data output unit converts the interpolated image data to predetermined printing data and outputs the predetermined printing data.

As the accuracy of printing increases, the shared interpolation magnification allocated to the computing method with high accuracy increases. Since the picture quality is improved as the magnification allocated to the computing method with high accuracy becomes higher, even when the image data is interpolated at the remaining magnification by the computing method with low accuracy, the reverse of the picture quality is suppressed.

As described above, it is set so that as the accuracy at the time of printing increases, the interpolation magnification allocated to the computing method with high accuracy increases. Since the picture quality is improved as the magnification allocated to the computing method with high accuracy increases, the image data interpolating apparatus for printing capable of suppressing the reverse phenomenon of the picture quality even when the interpolation is performed by the computing method with low accuracy at the remaining magnification can be provided.

That is, as the definition at the time of printing becomes higher, the definition at the time of transfer of the image data from the computing method with high accuracy to the computing method with low accuracy exerts an influence on the picture quality. Consequently, when the definition at the time of printing becomes higher, the ratio allocated to the computing method with high accuracy is increased.

It is sufficient that the definition at the time of printing as a reference of determination has such a standard. As an example, the definition detecting unit can be also constructed to detect the gradations of the image data to be printed as definition.

In the case of the construction, the definition detecting unit detects the gradations of the image data to be printed as definition. In an example of printing, when whether a dot of a certain color is applied or not is determined, the gradation at the time of printing is expressed by two levels. When light magenta and dark magenta are used, the image is expressed by four levels (2×2). With respect to the three primary colors of cyan, magenta, and yellow, in the case of two levels, the image is expressed by eight colors. In the case of four levels, the image is expressed by 64 colors. The gradation can be also said as the number of colors.

In this manner, the reverse phenomenon does not easily occur when the gradation changes at the printing stage.

Although there can be various modes for the gradation, as an example, the gradation can be changed by varying the size of the diameter of a recording agent applied to a pixel.

In such a configuration, since the change in the diameter of the recording agent applied to the pixel is also an example of the gradation expression, it is detected as the gradation on the basis of the size of the diameter.

With the configuration, the reverse phenomenon does not easily occur when the gradation at the printing stage is changed by varying the dot diameter.

The definition is not limited to the gradation. As another example, the definition detecting unit can be constructed so as to detect the resolution of the image data to be printed as definition.

In the case of the configuration, the definition detecting unit detects the resolution of the image data to be printed as definition. For example, when 360 dpi and 720 dpi can be selected as resolution of printing, the definition detecting unit detects which resolution is selected. Obviously, the other resolution such as 300 dpi or 600 dpi can be also used.

In such a manner, when the resolution changes at the printing stage, the reverse phenomenon does not easily occur.

The image data obtaining unit is used to obtain the image data. Any unit for holding target image data when the pixel interpolating unit executes the interpolating process to increase the element pixels can be employed. The obtaining method is therefore not limited but various methods can be adopted. For example, a method of obtaining the image data from an external device through the interface, a method of providing an image pickup unit and obtaining an image by the unit, or a method of inputting the image data from a mouse or keyboard by executing a computer graphic application can be used.

It is sufficient for the pixel interpolating unit to execute the interpolating process by both of the computing method with high accuracy and the computing method with low accuracy. The invention is not, however, limited to the two computing methods. The computing method with high accuracy and the computing method with low accuracy are relative to each other and it is unnecessary to provide a reference value. Each of the computing methods includes various methods. As an example, the pixel interpolating unit can be constructed to execute, as an interpolating process executed by a computing method with high accuracy, an interpolating process for calculating image data of interpolation pixels by an arithmetic process from image data of surrounding pixels so that image data of pixels to be interpolated changes smoothly.

In the case of such a configuration, by performing the computing process by using the image data of the peripheral pixels, the image data of the pixels to be interpolated changes smoothly. By changing the image data smoothly, even if pixels which change largely are interpolated, a step is not conspicuous and, therefore, the picture quality is good.

With the configuration, the image data of the pixels interpolated changes smoothly since the image data of interpolated pixels is calculated from the image data of the peripheral pixels by a computing process. As the computing amount increases, the picture quality is improved.

Various computing methods of changing the image data of the pixels to be interpolated can be used. As an example, the shape of the change in the image data of the pixels having the high degree of change is set as an almost S shape and its inclination is adjusted. A fluctuation can be created by forming an undershoot on the lower side of both ends and forming an overshoot on the higher side and adjusted. In this manner, although the data changes smoothly, the shape of change can be made sharper than the inclination simply linearly connecting the changes and the degree of change in the image can be optimized by adjusting the inclination. The fluctuation becomes large by forming the undershoot on the lower side of the both ends and forming the overshoot on the higher side and the apparent degree of change in the image can be optimized by adjusting the fluctuation. As an example of such a computing process, a cubic convolution interpolation of a multi-order computing process or the like can be used. The computing process which can perform such adjustment is not limited to the above but the other computing methods can be also employed.

Further, the pixel interpolating unit can be constructed to execute an interpolating process using image data of the nearest neighboring pixels before interpolation as image data of pixels of a new construction as an interpolating process executed by the computing method with low accuracy.

In the case of such a configuration, since the image data of the nearest neighboring pixels before the interpolation is used as image data of pixels of a new construction as an interpolating process, the computing amount is substantially zero and it can be said that the method has an extremely small processing amount.

In this manner, since the image data of the existing pixels is used as it is, although the accuracy is not expected to be improved, the computing amount is small.

The shared magnification is not always a ratio between the interpolation magnification used by the computing method with high accuracy and the interpolation magnification used by the computing method with low accuracy. It is possible that the interpolation magnification itself of the computing method with high accuracy decreases gradually. The situation such that the shared magnification increases while the interpolation magnification gradually decreases denotes that the ratio between the interpolation magnification when the shared magnification is not changed and the interpolation magnification when, the shared magnification is changed may become higher.

As an example, the pixel interpolating unit has a predetermined switched resolution, performs an interpolating process so that the resolution exceeds the switched resolution by a computing method with high accuracy and interpolates the rest by a computing method with low accuracy. The interpolation magnification adjusting unit can be constructed so as to adjust the interpolation magnification by changing the switched resolution.

In the case of such a construction, data is interpolated by the computing method with high accuracy so that the resolution of the data exceeds the switched resolution as predetermined resolution and then interpolated by the computing method with low accuracy so that the resolution of the data reaches the target resolution. When the definition at the time of printing is high, the switched resolution is set to be high. Assuming now that the definition of printing is low, the switched resolution set in this case is low and the interpolation at the interpolation magnification is performed so that the resolution of the data exceeds the switched resolution by the computing method with high accuracy. When the definition at the time of printing is high, however, the switched resolution becomes also high. In this case, the data is interpolated so that the resolution of the data exceeds the switched resolution by the computing method with high accuracy. Consequently, the interpolation magnification increases. It can be said that the shared magnification increases in this sense.

As for a threshold value when definition at the time of printing is low, the interpolating process is not performed because the resolution of the original image data is higher. When the definition at the time of printing is high, however, the threshold value is large. Consequently, there is a case that the threshold value exceeds the resolution of the original image data. The interpolating process is then performed by the computing method with high accuracy. In this case as well, it can be said that the magnification allocated to the computing method with high accuracy increases. Obviously, the conventional reverse phenomenon does not occur.

Also in the case where the threshold value is large, the same occurs that image data whose resolution is lower than the threshold value is interpolated by the computing method with high accuracy and image data whose resolution is higher than the threshold value is not interpolated by the computing method with high accuracy. The threshold value in this case is, however, sufficiently large, the effect on improvement in the picture quality by the computing method with high accuracy is reduced and there is no difference in picture quality of outputs.

In such a manner, only by changing the switched resolution, the shared magnification substantially changes and the adjustment becomes easy.

The printing data output unit converts the data to predetermined printing data on the basis of interpolated image data and outputs the printing data. The conversion can be properly changed according to a printing apparatus to which the printing data is supplied. For example, since the necessary printing data varies according to the printing principle corresponding to a recording agent of the printing apparatus, the number of primary colors of the recording agent, the gradation, and the like, the image data is accordingly converted to the corresponding printing data. Obviously, conversion of color coordinates, conversion of the gradation, or the like is included as a factor.

The method of adjusting the interpolating magnification so that the higher the definition at the time of printing is, the more the magnification allocated to the computing method with high accuracy is increased is not always limited to a substantial apparatus. It can be easily understood that the method itself can function.

Such a printing controller may exist by itself or may be used in a state where it is assembled in equipment. The idea of the invention is not limited to the above but includes various modes. It can be properly changed to software, hardware, or the like.

When the printing controller takes the form of software of the image data interpolating apparatus for printing as an embodiment of the idea of the invention, it should be noted that it naturally exists also on a recording medium on which the software is recorded and is used.

The recording medium can be, of course, a magnetic recording medium or a magneto-optic recording medium. Any recording media which will be developed in future can be similarly considered. The stages of duplication such as primary duplicate or secondary duplicate are regarded as the same without any doubt. The invention is also applied to the case where a communication line is used as a supplying method.

Further, the case where a part is realized by software and a part is realized by hardware is also included in the idea of the invention. A form in which a part is recorded on a recording medium and properly read as necessary may be also used.

In the above embodiment, the resolution is switched by using the output resolution exerting an influence on the printing quality as a reference so as to realize an optimum printing process. The switching of the printing control by using the printing quality as a reference is not limited to such an example. In the following, an example of executing an optimum printing control corresponding to desired performance in which the printing quality is considered will be described.

Figure 28:
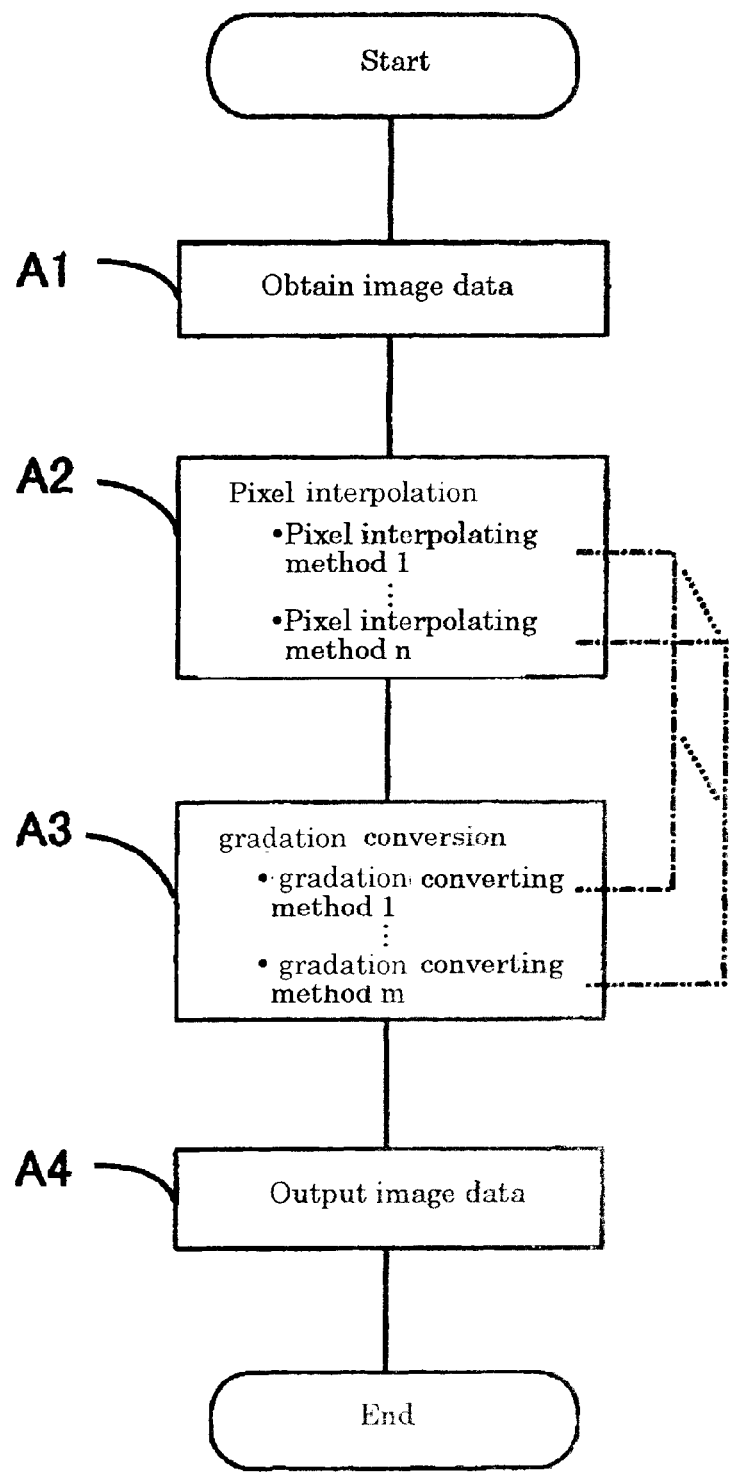
FIG. 28 is a schematic flowchart of a printing system according to an embodiment of the invention.

In the embodiment, a hardware system as mentioned above is used as a precondition and printing is executed on the basis of image data obtained by an image input device of the computer system 10. At that time, since the resolution and gradation of the original image data differ from the resolution and gradation of the color printer 17b, the pixel interpolating process and the gradation converting process are executed by the printer driver 12c. The schematic construction is as shown in FIG. 28.

Figure 29:
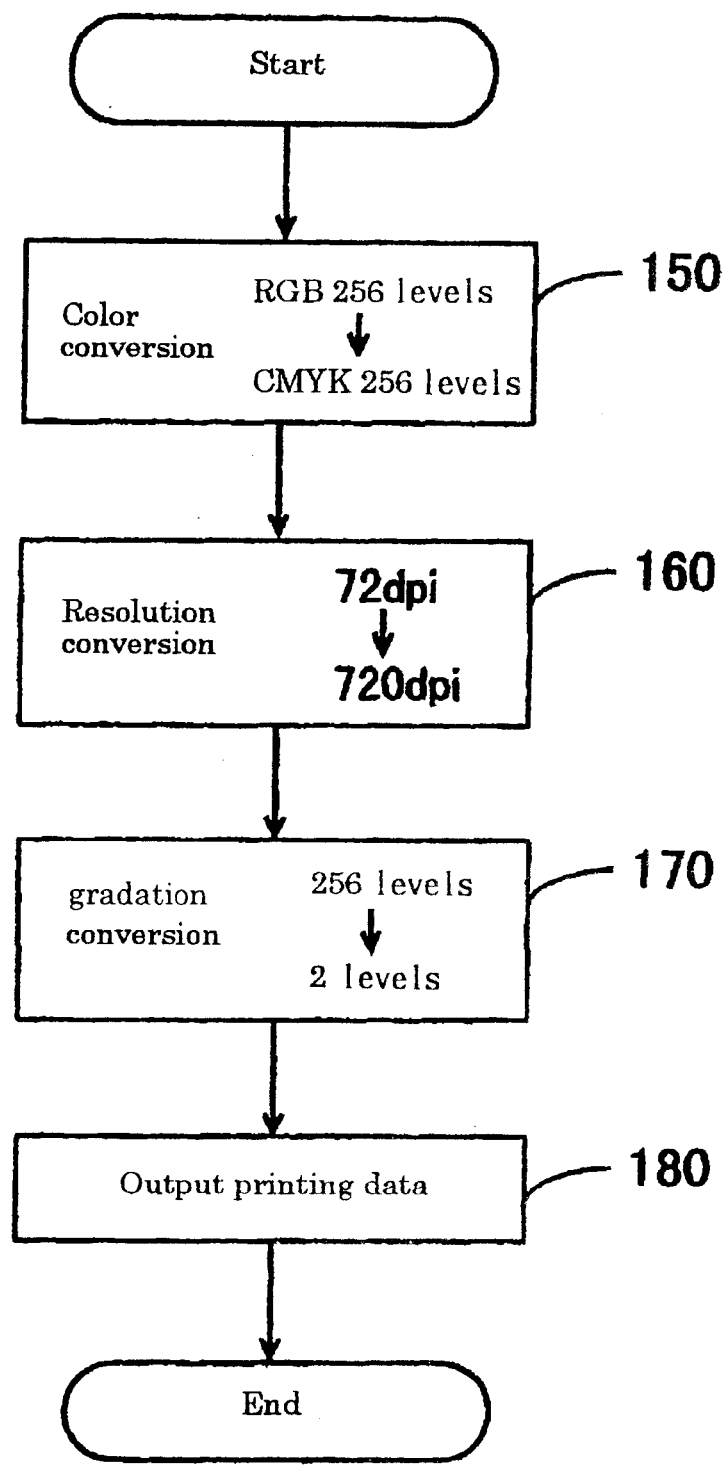
FIG. 29 is a schematic flowchart of a printer driver for executing a printing process.

The change in the resolution and gradation at the time of outputting printing data to the color printer 17b when the application 12d executes the printing process will now be described. FIG. 29 shows the flowchart of the printer driver 12c which performs such a process.

When it is assumed that the resolution of the original image data expressed by pixels in a dot matrix state is 72 dpi and 256 levels are displayed, and a color converting process is executed so as to be adapted to color ink of the color printer 17b in the first step 150, thereby converting RGB 256 levels to CMYK 256 levels. In the following step 160, a pixel interpolating process is executed so that the resolution coincides with 720 dpi as the resolution of the color printer 17a. Then the interpolated image data has 720 dpi and CMYK 256 levels. After that, when a gradation converting process of step 170 is performed, the data becomes CMYK image data of 2 levels as expression gradation of the color printer 17b. Finally, in step 180, the printing data including control data is outputted to the color printer 17b. In the embodiment, the color converting process is executed first and then the resolutions are allowed to coincide with each other. It is also possible to first make the resolutions coincide with each other and then execute the color converting process. In this case, when the color converting process is executed in a state where the resolution is low, there is an advantage such that the number of pixels as targets of the color converting process is small.

The application 12d obtains original image data to be color converted in step 150 by the scanner 11a or the like. The image data can be obtained not always directly but can also from another software or the like as mentioned above. In the example, therefore, the step of obtaining the image data by the color converting process in step 150 corresponds to the image data obtaining step A1. Since the resolution is converted from 72 dpi to 720 dpi in step 160, the step corresponds to the pixel interpolating process A2. Since the halftone process from 256 levels to 2 levels is performed in step 170, the step corresponds to the gradation converting step A3. Since the image data of 720 dpi and 2 levels is outputted to the color printer 17b in step 180, the step corresponds to the image data output step A4.

As mentioned above, a series of image data processes are executed by the printer driver 12c. The printer driver 12c is stored on the hard disk 13b and read and operated by the computer body 12 upon activation. At the time of introduction, the printer driver 12c is recorded on a medium such as a CD-ROM or a floppy disk and is installed. Each of the media corresponds to the medium on which the image data interpolation gradation converting program is recorded.

In the above-mentioned embodiment, it is assumed that a predetermined application generates printing data in the computer system 10 including the image input device and the image output device in order to obtain the printing data. However, the computer system is not always necessary.

Figure 30:
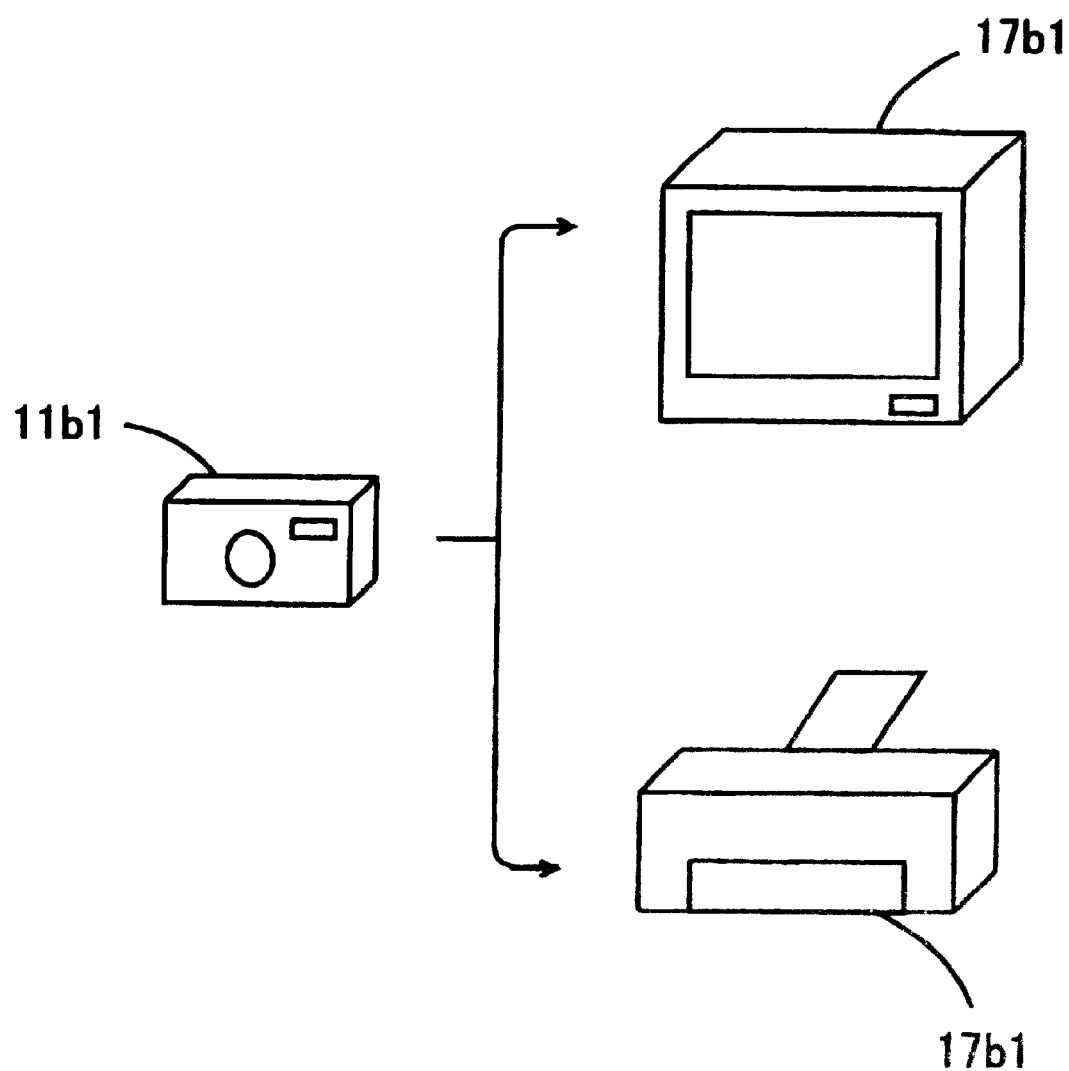
FIG. 30 is a schematic block diagram showing another application example of an image data interpolation gradation converting apparatus of the invention.
Figure 31:
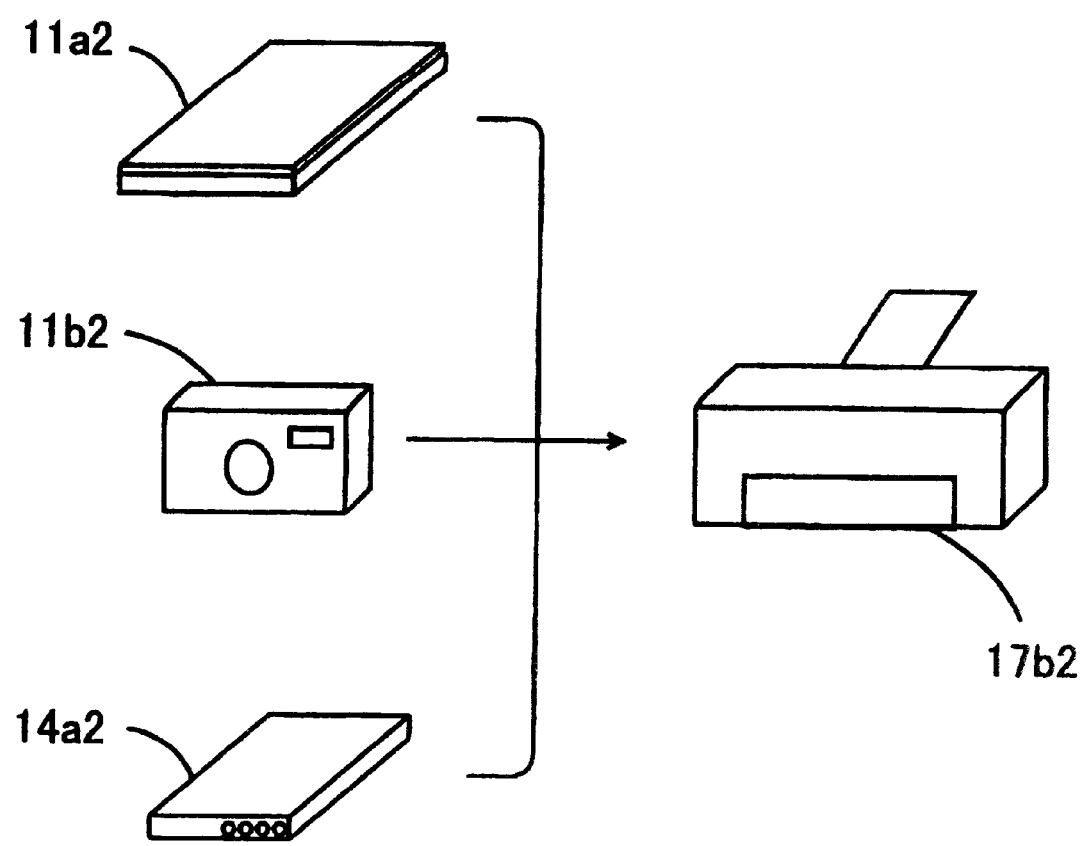
FIG. 31 is a schematic block diagram showing another application example of the image data interpolation gradation converting apparatus of the invention.
Figure 32:
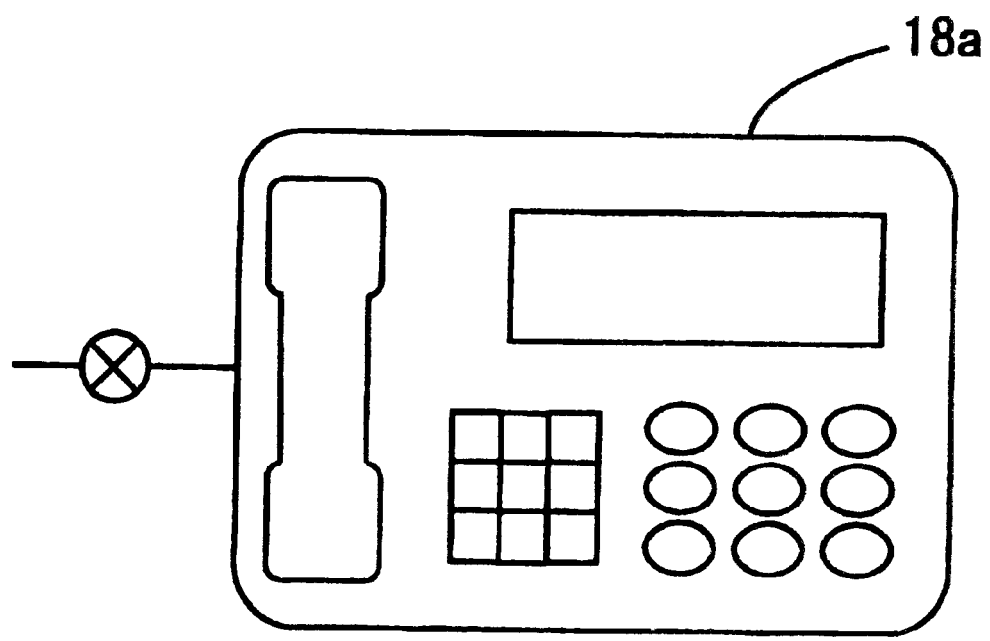
FIG. 32 is a schematic block diagram showing another application example of the image data interpolation gradation converting apparatus of the invention.
Figure 33:
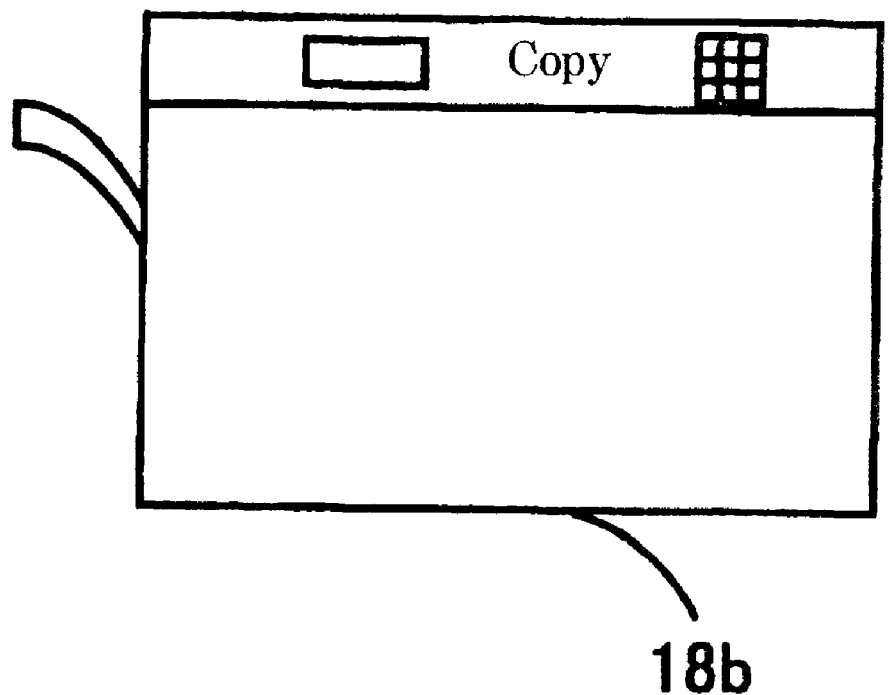
FIG. 33 is a schematic block diagram showing another application example of the image data interpolation gradation converting apparatus of the invention.

For example, as shown in FIG. 30, a system in which the application is assembled in a digital still camera 11b1 and a display 17a1 is allowed to perform display or a color printer 17b1 is allowed to perform printing by using image data whose resolution and gradation have been converted may be also used. As shown in FIG. 31, a color printer 17b2 for inputting and printing image data without using the computer system can be also constructed to perform a printing process by automatically converting the resolution and gradation of image data inputted via a scanner 11b2, a digital still camera 11b2, a modem 14a2, or the like. In addition, the invention can be naturally applied to various apparatuses dealing with image data such as a color facsimile apparatus 18a as shown in FIG. 32 and a color copying apparatus 18b as shown in FIG. 33.

Figure 34:
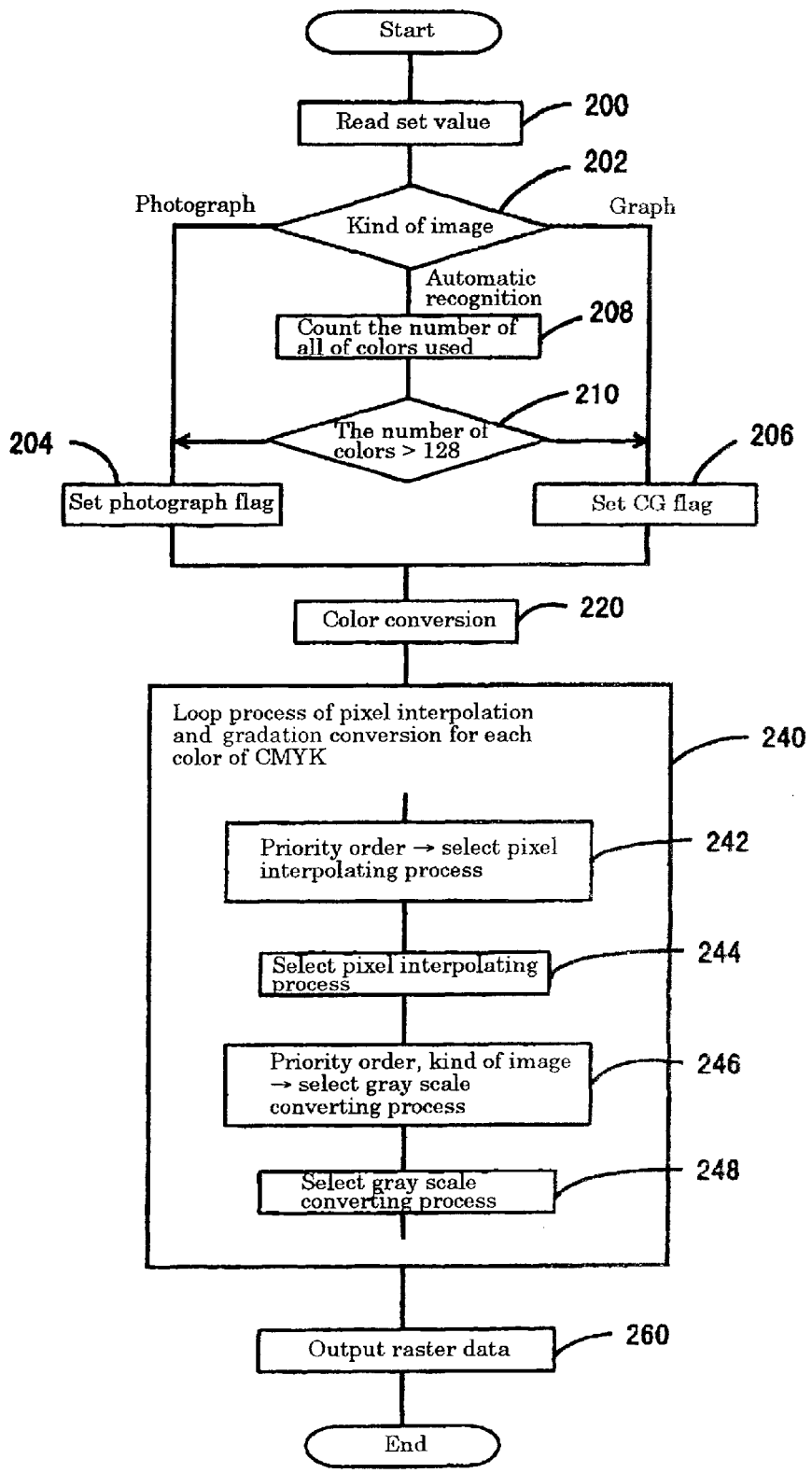
FIG. 34 is a more detailed flowchart of the printer driver.

The flowchart of the printer driver 12c shown in FIG. 29 is a procedure of a rough concept. In an actual program, it is not necessary to be clearly separated in such a manner. FIG. 34 shows a software flow related to the resolution conversion and the gradation conversion executed by the printer driver 12c.

Figure 35:
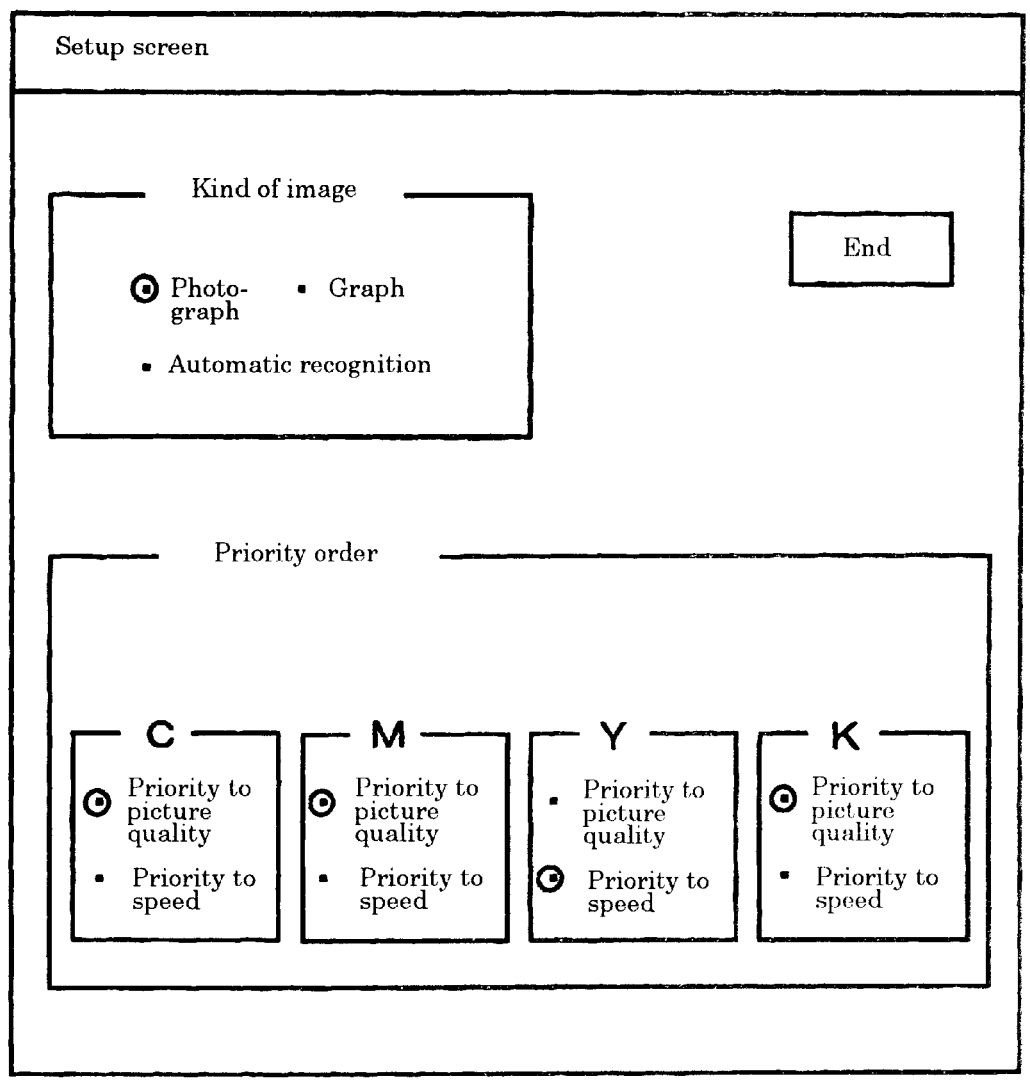
FIG. 35 is a diagram showing a setup screen using GUI.

When the application 12d executes the printing process, image data of RGB 256 levels is outputted to the printer driver 12c via the operating system 12a. The printing process is executed according to the flow shown in FIG. 34. In the first step 200, a setting value as a guide of the process is acquired through GUI. FIG. 35 shows a setup screen of the setting value. The GUI screen is displayed on the display 17a and each radio button is clicked by the mouse 15b for setting. In the printer driver 12c, since the process is changed whether the image data is a natural picture or an unnatural picture, either "photograph" as a natural picture or a "graph" as an unnatural picture can be selected. There is also a room for automatic recognition and continuous processes or the like can be also realized.

In addition to the selection of the image data, on the GUI screen, whether priority is placed to the picture quality or the speed can be set for each of primary colors of CMYK as color ink at the time of printing. On the diagram, the priority to the picture quality is selected for the C component, M component, and K component. The priority to speed is selected with respect to the Y component for the following reason. Since Y (yellow) is so light that a dot cannot be found even though the user consciously tries to find it, it dose not exert much influence on the picture quality. When similar things are designated for RGB, it is also possible that the priority is applied to the speed only for the B component. It is because the visual sensitivity of a human is low only to the blue component. For example, the brightness Y is simply expressed by the following calculating expression.

$$Y = 3.0R + 0.59G + 0.11B$$

The B component is extremely low as ⅓ of about "0.33" which is even and is about 10% of the whole. Even if the priority is assigned to the picture quality, it is not so effective. When the priority is assigned to the speed, however, there is no problem.

Figure 37:
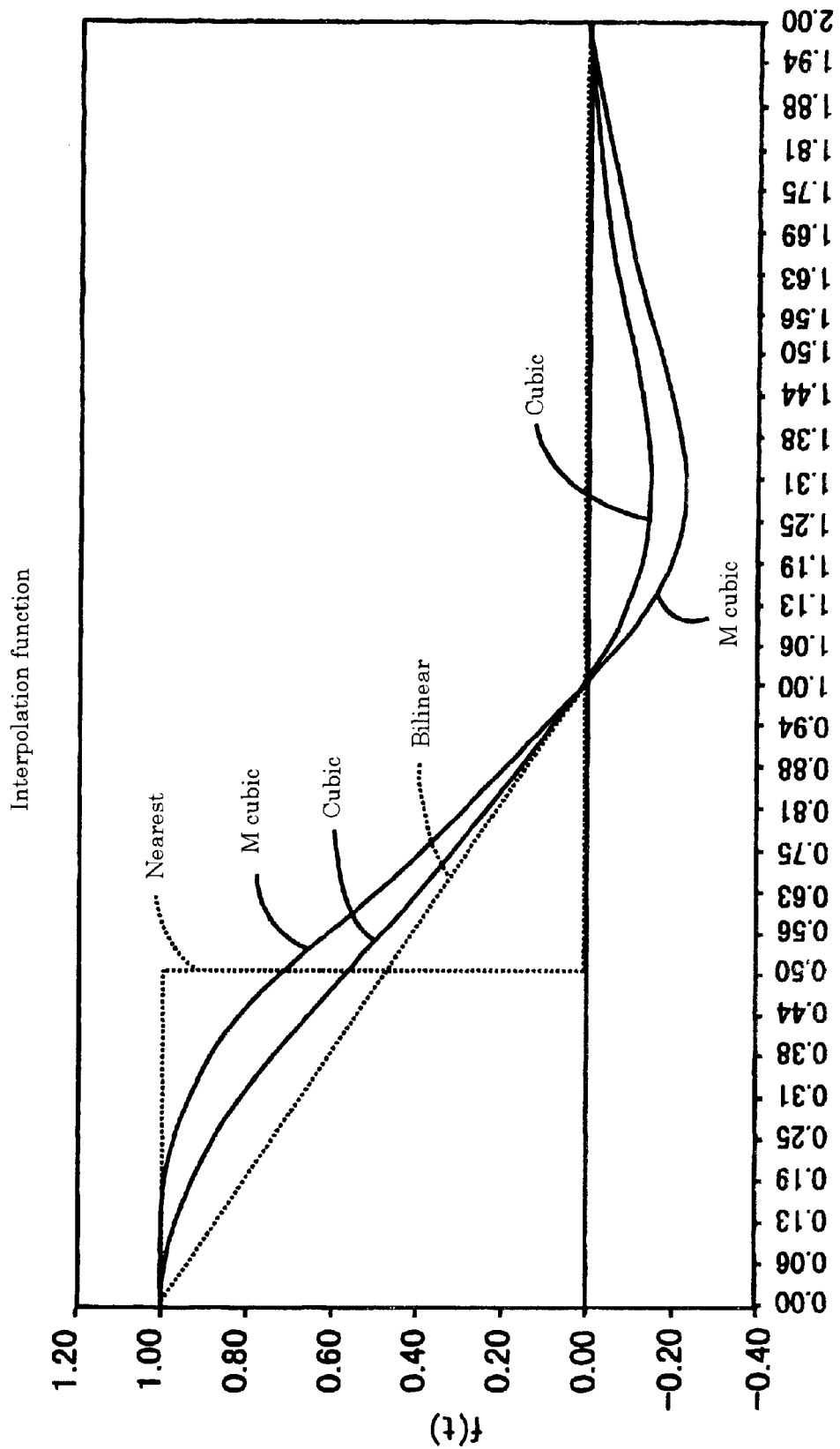
FIG. 37 is a diagram showing changes of interpolation functions used for pixel interpolation.

The meaning of the priority to the picture quality and the priority to the speed will now be described. FIG. 37 is a diagram showing the specific data, in which stepwise combinations of a plurality of pixel interpolating processes and gradation converting processes are realized. Executable pixel interpolating processes are the "nearest method", "bilinear method", and "M cubic method" which will be described hereinafter and the gradation converting processes are "dithering A" and "dithering B" as dithering methods and an error diffusion method. In the combination for the highest speed, the "nearest method" is executed as the pixel interpolating process and the "dithering A" or "dithering B" is executed as the gradation converting process. In the combination for high picture quality, the "M cubic method" is executed as the pixel interpolating process and the "error diffusion method" is executed as the gradation converting process. When an intermediate combination is necessary, the "bilinear method" is executed as the pixel interpolating process and the "dithering A", "dithering B", and "error diffusion method" are properly combined and executed as the gradation converting process.

The combinations are selected because each of the pixel interpolating processes and the gradation converting processes has an advantage and a disadvantage. This will be described in detail hereinbelow. The above-mentioned processes are employed as the interpolating processes. The bilinear interpolating method which has not been referred to will now be described.

FIG. 37 shows an interpolation function f(t) in each interpolating process. In the diagram, the lateral axis denotes position and the vertical axis indicates the interpolation function. Lattice points exist in positions of t=0, t=1, and t=2 and interpolation points are positions of t=0 to 1. When the cubic method and the M cubic method are compared with each other, a cubic functional curve of the M cubic method is slightly sharper so that the whole image becomes sharper.

The bilinear interpolation will now be described. As shown in FIG. 37, it is common to the cubic method with respect to a point that data changes gradually from one lattice point to the other lattice point. The change is linear functional such that it depends on only data of lattice points on both sides. That is, as shown in above-mentioned FIG. 17, an area partitioned by the four lattice points Pij, Pi+1j, Pij+1, Pi+1j+1 surrounding the point Puv to be interpolated is divided into four sections by using the interpolation point Puv. Data in the diagonal positions is weighted on the basis of the area ratio. It is expressed by the following expression.

$$P=\{(i+1)-u\}\{(j+1)-v\}Pij+\{(i+1)-u\}\{v-j\}Pij+1+\{u-i\}\{(j+1)-v\}Pi+1j+\{u-i\}\{v-j\}Pi+1j+1$$

where i=[u] and j=[v]

Since the cubic method and the bilinear method are different from each other with respect to the point that the change is cubic functional or linear functional. Images obtained by the methods are very different. In the case of the bilinear method, since data just linearly changes between neighboring two points (t=0 to 1), the border is smoothed and the screen gives a blur impression. That is, different from smoothing of a corner part, when the border is smoothed, the inherent outline disappears in the computer graphics and the focus is not sharp in a photograph. It is natural that the sharper image is preferable for a photograph. In order to avoid increase in the computing amount and decrease in speed, either the nearest method which causes jaggies or the bilinear method which makes the focus not sharp has to be selected. In such a case, the picture quality is better by the bilinear method.

Figure 41:
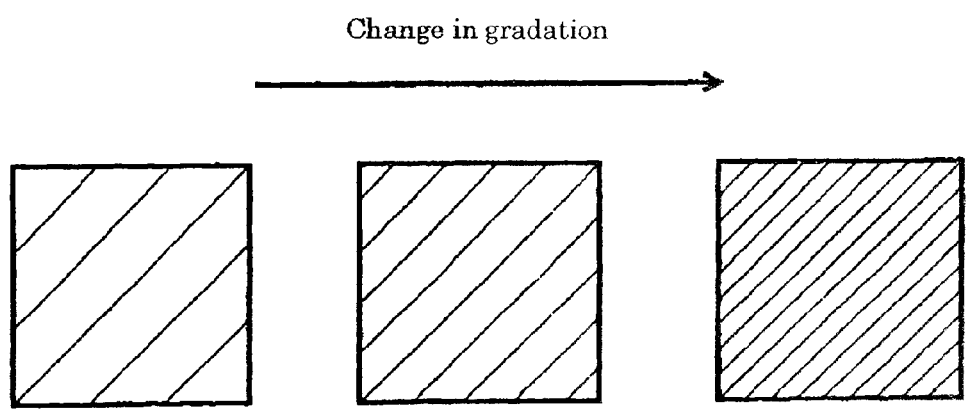
FIG. 41 is a diagram showing states where dots are formed when the disperse type dithering is applied to a solid screen.

On the other hand, the executable gradation converting processes are broadly classified into the dithering method and the error diffusion method. The latter has the better picture quality but the computing amount is larger. According to the dithering method, a matrix of a predetermined size in which stepwise gradation values corresponding to the range of the gradation values are applied is prepared. Actual image data is applied to the same area and the gradation values are compared. A dot is given to a box where the image data is larger than the gradation value. A dot is not given to a box where the image data is smaller than the gradation value. The size of the matrix is set to 5×5 and the range of the gradation values is set as 1 to 25. FIGS. 38 and 39 show matrixes to which the values are inputted. The former shows the matrix pattern of dithering A called a center-concentrated type and the latter shows the matrix pattern of dithering B called a disperse type. Since the gradation values are sequentially inputted from the center toward the outside in the dithering A, when the solid part is large, the dots tend to be given from the center to the outside as shown in FIG. 40. On the contrary, since the gradation values are allocated at random in the dithering B, even the solid part is dispersed as a whole as shown in FIG. 41. When CG such as a graph is assumed, it has a characteristic that the center-concentrated type like dot printing is preferred to the dispersion at random. The dither method itself determines only whether the image data is large or small, so that the processing amount is extremely small.

Figure 42:
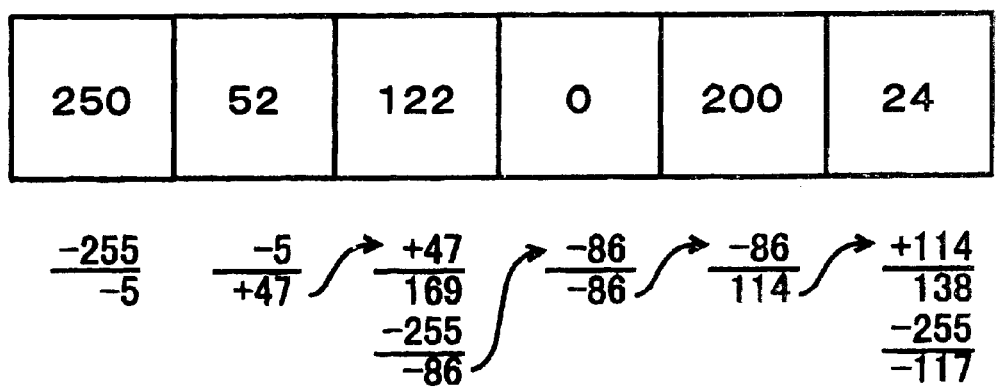
FIG. 42 is a diagram simply showing an error diffusion method.

On the other hand, the error diffusion method is a method of distributing an error which is caused by the gradation value of the image data and the presence or absence of a dot to neighboring pixels. The picture quality is good since no error occurs. On the contrary, an operating process of calculating and allocating an error is necessary. A specific method is simply shown in FIG. 42. On the upper stage, actual image data is arranged. On the lower stage, the conversion result indicating whether the dot is given or not is shown. In the example, the range of the gradation value is set to 0 to 255.

The gradation value of the first pixel is "250" which is larger than "128" as a threshold value, so that a dot is given. When the dot is given, it is equivalent that the gradation value of "255" is given, so that an error of "−5" occurs. The error is allocated to the right neighboring pixel. Since the inherent gradation value is "52", the gradation value of "52−5=47" is derived. Since "47" is smaller than the threshold value of "128", no dot is given. Since no dot is equivalent to the gradation value of "0", an error of "47" occurs here and is carried to the next pixel.

Specifically, an error Dg carried to and actual image data Dn are accumulated. When the result value is larger than "128", "255−Dn+Dg" is carried to the next pixel. In this case, the error may be diffused not only one-dimensionally but also two-dimensionally. The error may be diffused to not only neighboring pixels but also peripheral pixels. According to the error diffusion as described above, since an error is accurately grasped and allocated, a total error is small and the picture quality is generally good.

Figure 43:
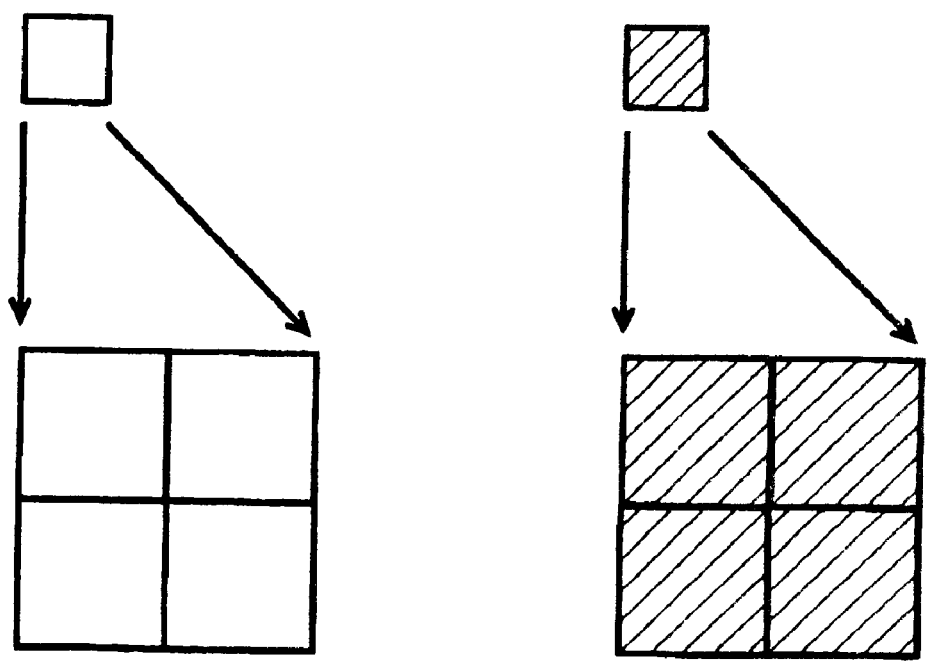
FIG. 43 is a diagram showing a state where an image is enlarged by the nearest method.

On the other hand, for the combination of the gradation converting process and the pixel compensating process, an affinity is also a factor. FIG. 43 shows allocation of image data when an enlarging process is performed by the nearest method. When the nearest method is used, naturally, the original image data is copied as it is. Consequently, the area ratio of a pixel having a certain gradation value is maintained as it is. When another interpolating process is executed, however, for example, a smooth change with neighboring pixels occurs so that the maintenance of the area ratio cannot be expected. On the other hand, as for the dither method, the density of an area is determined every area corresponding to the size of a matrix. It can be therefore said an interpolating process which maintains the area ratio such as the nearest method has an affinity. That is, a combination in which the nearest method is made correspond to the dither method has not only a common point such that although the picture quality is low, the computing speed is fast but also a characteristic that the combination has an affinity.

Considering advantages and disadvantages of the pixel interpolating process and those of the gradation converting process, even when a process is selected on the basis of the advantage and disadvantage of only the pixel interpolating e process, if the gradation converting process is fixed, the highest performance cannot be obtained. That is, even when the pixel interpolating process for high picture quality is selected, if the gradation converting process is not for the high picture quality, the highest picture quality is not obtained. Even when the pixel interpolating process for high speed is selected, if the gradation converting process is for the high picture quality, there is a burden on the computing process, so that the highest speed is not realized. From another point of view, it is significant to place importance on the advantages and disadvantages of the gradation converting processes and accordingly select the pixel interpolating process.

On the precondition of the advantages and disadvantages of the processes, the flowchart of FIG. 34 will be described again. After obtaining a set value in step 200, a process is branched on the basis of the obtained set value in step 202. When "photograph" is selected, a "photograph flag" is set in step 204. When "graph" is selected, a "CG flag" is set in step 206. In the case of selecting "automatic recognition", the total number of colors used in the image data is counted in step 208. When the number of colors is equal to or larger than "128 colors" in step 210, "photograph" is determined and the "photograph flag" is set in step 204. When the number of colors is less than "128 colors", "graph" is determined and the "CG flag" is set in step 206. In the case of a natural picture, even if it is of one color, light and dark levels of one color are counted, so that a very large number of colors is used. In the case of CG or the like, since the colors are basically determined by operation of a human, the number of colors used is not so large. By counting the number of total colors, therefore, whether a photograph or graph, that is, whether a natural picture or an unnatural picture can be determined.

These flags will be used later. In the following step 220, color conversion from the RGB color system to the CMY color system is performed. Since the CMY color system corresponds to the color ink used by the color printer 17b, when the color printer 17b uses the color ink of four colors of CMYK, conversion from RGB to CMYK is performed. The conversion is performed by preparing a three-dimensional look-up table which is referred to by the gradation value of the three primary colors of RGB and the combination of the gradation values and the gradation values of CMYK are made correspond to each other. In such a manner, only by referring to the table, the conversion can be made promptly. When the 256 levels are allowed to each of the three primary colors of RGB, however, the number of colors becomes about 16,700,000 and the table becomes too big. Consequently, the data of all of the 256 levels is not prepared but data is prepared only on discrete lattice points and desired coordinate values are obtained by an interpolating operation from data at lattice points surrounding desired coordinate values. While forcedly moving data to the lattice coordinates, the error may be allocated to neighboring pixels. The latter method can be realized only adding and subtracting processes in a manner similar to the error diffusion method, so that a burden on the interpolating operation is reduced.

After finishing the color conversion, the pixel interpolation and the gradation conversion are executed in step 240. While executing an enlarging process from 72 dpi to 720 dpi, the halftone conversion from 256 levels to 2 levels is performed. The processes are related to each other as mentioned above and a loop process is performed in order to proceed each color ink.

More specifically, the pixel interpolating process is selected from the set value obtained in step 200 for the target color ink in the loop at the time point in step 242. That is, since the priority is placed to the picture quality with respect to the CMK components, it is determined from the diagram shown in FIG. 37 that the M cubic pixel interpolating process is selected and the M cubic pixel interpolating process is performed in step 244. In step 246, similarly, the gradation converting process is selected from the set value obtained in step 200. In this case, not only the priority order but also the kind of an image are considered with reference to the flag set in step 204 or 206. When the priority is placed to the picture quality, the error diffusion method is selected irrespective of the kind of an image and an image is converted to a halftone image by the error diffusion method in step 248.

On the other hand, since the priority is placed to the speed for the Y component, the nearest method is selected in step 242 and the pixel interpolating process is executed by the nearest method in step 244. In the case of selecting the gradation converting process in step 246, not only the set value indicative of the priority to speed, the kind of an image is determined from the photograph flag or the CG flag. When the original image is a photograph, the dithering B is selected. When the original image is a CG such as graph, the dithering A is selected. In step 248, a multilevel gradation converting process is selected and performed. Not only the nearest method is selected by paying attention to the speed, but also the high-speed dither method which is affined to the nearest method is selected with respect to the gradation converting process and, further, as a dither method, either the dithering A or dithering B is properly selected according to the kind of an image.

In order to improve the picture quality, ink of dark color and ink of light color are properly used with respect to each of cyan color ink and magenta color ink, thereby using color ink of total six colors. A variable dot method of using voltages of two stages applied to the piezoelectric device 21a5, discharging the ink particle having a large dot diameter by a high voltage and discharging the ink particle having a small dot diameter by a low voltage can be also employed. In this case, it can be said that dots (CL, ML) of a large diameter correspond to color ink of dark color and dots (CS, MS) of a small diameter correspond to color ink of light color.

Figure 44:
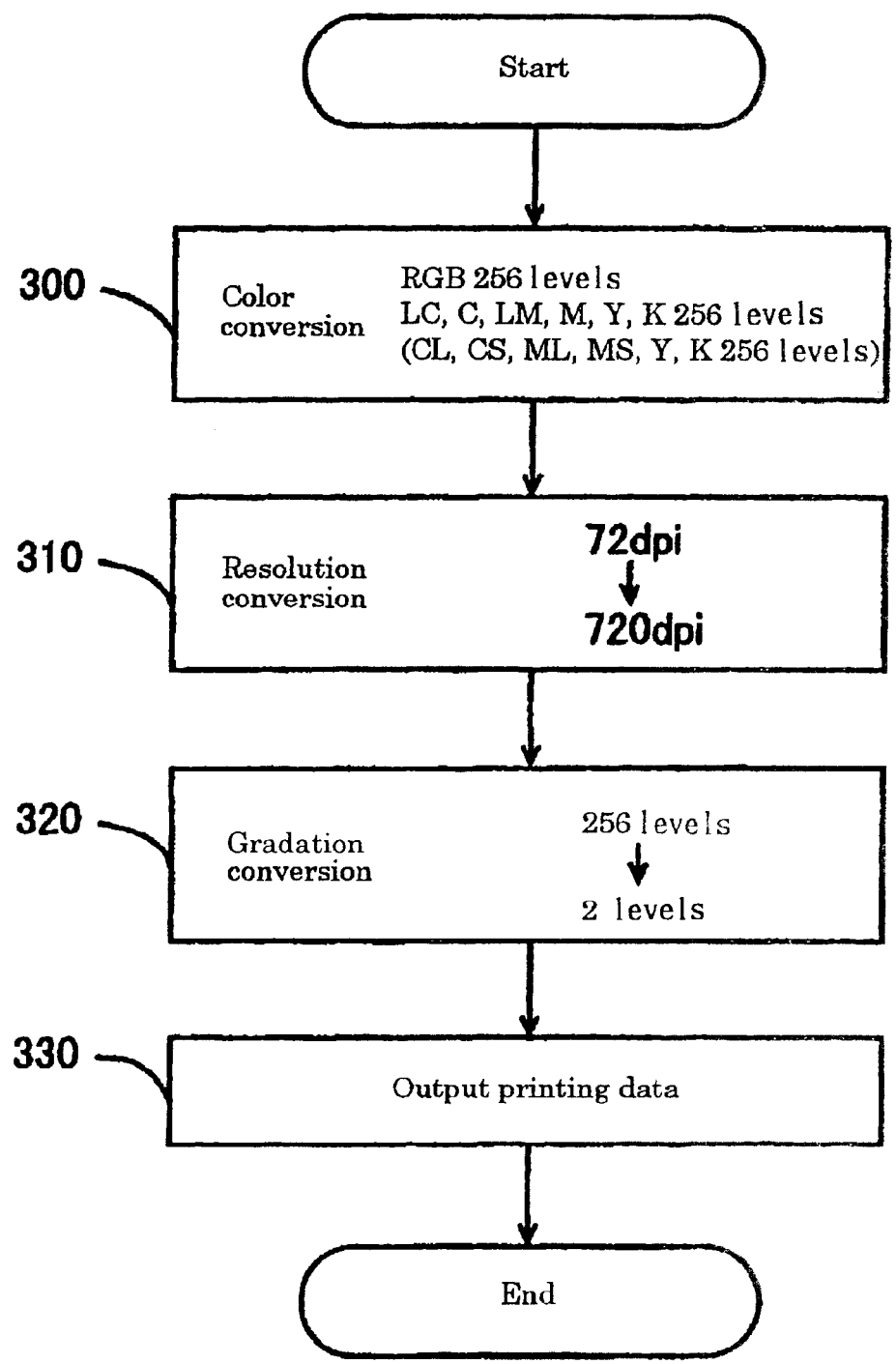
FIG. 44 is a schematic flowchart of a printer driver corresponding to the variety of color ink particles.

In these cases, it is naturally effective to make the pixel interpolating process and the gradation converting process correspond to each other properly. As shown in FIG. 44, in step 300, colors are converted from RGB to six colors of LC, C, LM, M, Y, and K or to CL, CS, ML, MS, Y, and K corresponding to the dot diameters with two colors each having different dot diameters and two colors with the same dot diameter. After that, the resolution is converted in step 310 and the gradation is converted in step 320.

The correspondence between the resolution conversion and the gradation conversion at this time is shown in FIG. 45. The correspondence in the diagram is to realize harmony between the picture quality and speed also in the case of combination for high picture quality. In the case of light color or a dot of a small diameter, the error diffusion method which deteriorates the picture quality is used as a precondition and the M cubic pixel interpolating process is executed. In the other cases, the dither method is used as a precondition and the nearest pixel interpolating process is selected.

Different from yellow of the light Y component, light cyan and light magenta exert a large influence on the picture quality for the following reason. A single dot of yellow is hardly seen but light cyan and light magenta are sufficiently visually recognized and an impression is changed according to the degree of diffusion. On the contrary, in the case of applying dots of dark cyan and dark magenta, since neighboring pixels already have predetermined darkness, a single dot is not conspicuous and a jaggy is not conspicuous even at the edge part. A process for the high picture quality is therefore selected and executed only with respect to the dots of light color and the small diameter which exert a large influence on the picture quality. FIG. 46 shows combination of correspondence when color ink of six colors is used and the dot diameters are different. In this case as well, combination for high picture quality is used only for the dot of the small diameter and light color which exerts a largest influence on the picture quality.

On the other hand, on the setup screen shown in FIG. 35, by selecting the priority to picture quality or the priority to speed, the pixel interpolating process and the gradation converting process are combined and selected. It is also possible to select the gradation converting process in accordance with the picture quality, thereby enabling only the corresponding pixel interpolating process to be chosen.

Figure 47:
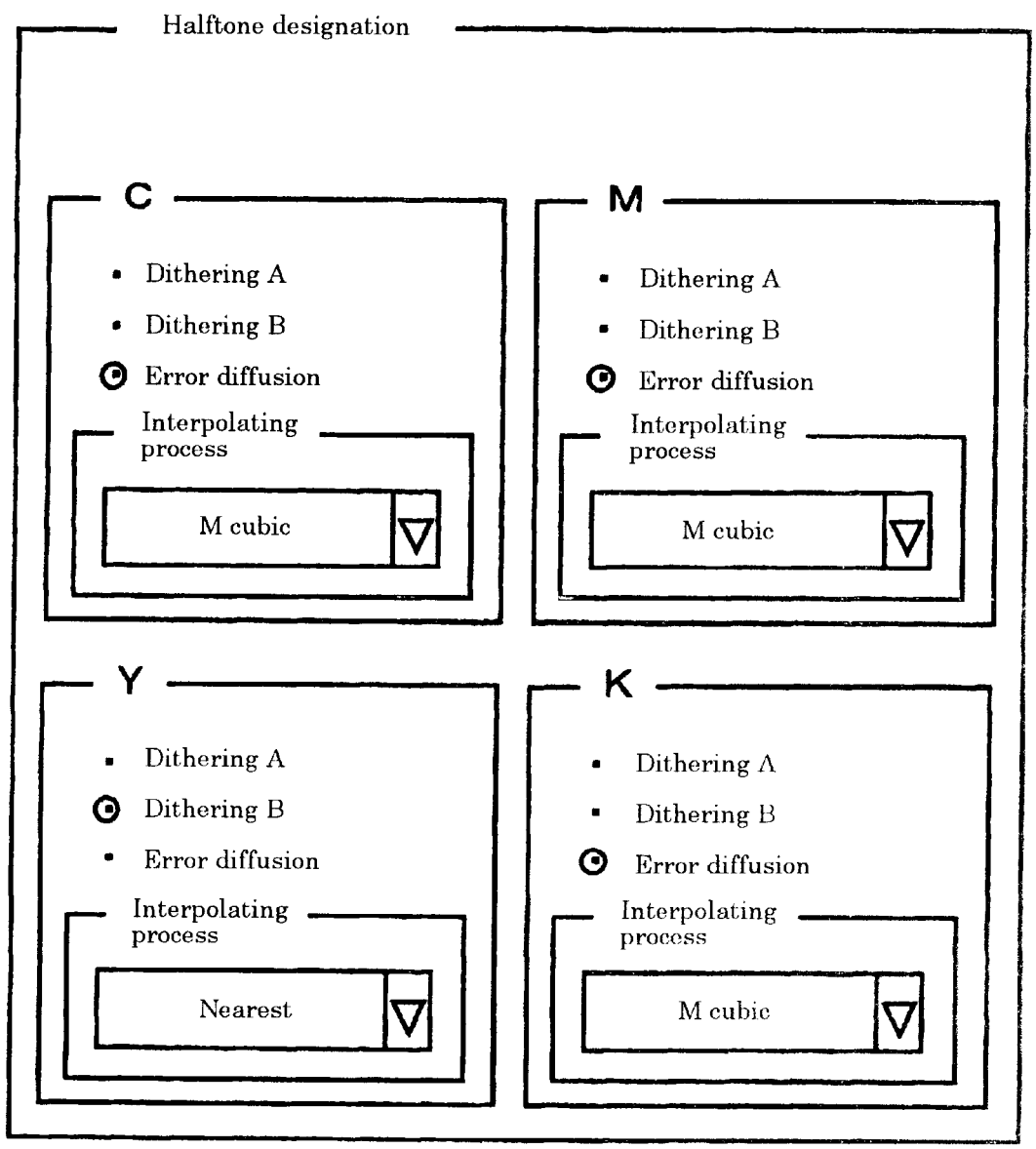
FIG. 47 is a diagram showing a setup screen when halftone is designated by using GUI.

FIG. 47 shows an example of such a setup screen. FIG. 48 shows the permissible corresponding relation. A halftone method can be selected individually for each color ink. The nearest method as a high speed pixel interpolating process and the rather high-speed bilinear method can be selected for the dithering A of the center-concentrated type and the dithering B of the disperse type. As the error diffusion, the bilinear method which realizes rather good picture quality and the M cubic method which realizes good picture quality but whose computing amount is huge can be selected.

Although only the case of enlarging the image by the pixel interpolation has been described in the above example, in the case of executing a process of reducing the image, by selecting the pixel interpolating process according to the advantage and disadvantage of the gradation conversion, As mentioned above, the pixel interpolating process and the gradation converting process are not processed quite independently. By preparing the combinations corresponding to the object of the process on the basis of the allocation of the corresponding relation as shown in FIG. 37 or by limiting the selectable pixel interpolating processes by designating the gradation converting process as shown in FIG. 48, the resolution conversion executed in step 160 and the gradation conversion executed in step 170 are coupled organically. Consequently, optimum performance which cannot be obtained only by selecting the pixel interpolating process can be realized. Further, the pixel interpolating process corresponds to a specific gradation converting process from the affinity between each gradation converting process and each pixel interpolating process, thereby enabling the performance to be improved.

As described above, the embodiment comprises: an image data obtaining unit for obtaining image data derived by expressing an image in gradations by pixels in a dot matrix state; a pixel interpolating unit for preliminarily setting combinations between a plurality of pixel interpolating methods and a plurality of gradation converting methods, by which predetermined performances can be obtained when the pixel interpolating process and the gradation converting process are sequentially executed on the image data and executing one of the pixel interpolating processes correspondence to any of the performances; a gradation converting unit for executing a gradation converting process by the gradation converting method corresponding to the pixel interpolating method; and an image data output unit for outputting image data converted to have predetermined gradations by the gradation converting unit.

In the case of the configuration, when the gradation converting process of the gradation converting unit is executed subsequent to the pixel interpolating process of the pixel interpolating unit, the correspondence between the pixel interpolating process executed by the pixel interpolating unit and the gradation converting process executed by the gradation converting unit is preliminarily made. The processes are not executed individually but only the processes having the optimum corresponding relation are performed.

In this manner, since the pixel interpolating process and the gradation converting process which are sequentially executed have the optimum corresponding relation and are executed, the image data interpolating and gradation converting apparatus which can obtain performance as desired even when the user does not have a skill can be provided.

The correspondence is determined in consideration of the characteristics of the pixel interpolating process and the gradation converting process. As an example, the degree of influence exerted on the picture quality by the pixel interpolating process which can be executed by the pixel interpolating unit is different from the degree of influence exerted on the picture quality by the pixel interpolating process which can be executed by the gradation converting unit. The processes which can realize similar picture qualities can be made correspond to each other.

In the case of such a configuration, the gradation converting process realizing good picture quality is executed for the pixel interpolating process realizing good picture quality, thereby preventing the picture quality from deteriorating. When the pixel interpolating process which does not realize good picture quality is executed, the gradation converting process which does not realize good picture quality is similarly executed, thereby improving the merit of the high speed or the like.

In this manner, when there are a plurality of pixel interpolating processes and gradation converting processes having different degrees of influence on the picture quality, by making the processes which exert similar influence on the picture quality correspond to each other, the combinations are determined according to the picture qualities, so that the selection becomes easy.

The pixel interpolating process is not especially limited. For example, there are the nearest neighboring method of copying existing pixels nearest to the pixel to be interpolated, the bilinear method of weighting in inverse proportion to the distances from the existing pixels surrounding the pixel to be interpolated, the cubic convolution method (hereinbelow, called a cubic method) of calculating the pixel to be interpolated from existing pixels surrounding the pixel doubly (or multiply) by a cubic (high-order) convolution function, and the like. With respect to the methods, in accordance with the order from the latter method, the picture quality is better but the processing speed is slower.

As the gradation converting processes, organized dither methods such as the center-concentrated type dither method or the disperse type dither method can be used. In this case, a multivalue dither method is also effective. The error diffusion method which can perform the gradation conversion more accurately than the dither is also effective. Generally, the picture quality of the error diffusion method is better than that of the dither method.

It is therefore preferable that the error diffusion method and the cubic method of good picture quality are made correspond to each other, and the dither method and the nearest neighboring method of less good picture quality are made correspond to each other.

In this case, the correspondence between the dither method and the nearest neighboring method has another sense. When the interpolating method of using existing pixels as they are as pixels to be interpolated by the pixel interpolating unit is executed, the gradation can be converted by the dither method by the gradation converting unit.

In the case of the configuration, the interpolating process using existing pixels as they are as pixels to be interpolated corresponds to the nearest neighboring method. The dither method is also called an area interpolation since pixels of a predetermined concentration are enlarged at the interpolation magnification. On the other hand, according to the dither method, while using a predetermined dither pattern, dots are applied in a probability manner with respect to the pixels of a predetermined concentration. The area interpolation has consequently more affinity to determine whether dots are applied or not in a probability manner. It is therefore effective to make the dither method correspond to the nearest neighboring method not only from the viewpoint of the degree of the picture quality but also the point of the technical affinity.

In this manner, the dither method is selected when the pixel interpolating process is the area interpolation and the processes which are affined with each other can be executed.

The correspondence between the pixel interpolating process and the gradation converting process does not have to be unconditionally fixed with respect to the elements of the image data. It is also possible to change the correspondence for each element. As a precondition, the image data has multilevel gradation data with respect to each of the element colors which have been color separated. The combination of the pixel interpolating unit and the gradation converting unit can be set for each element color.

In the case of the configuration, each of the elements of the image data has the concentration value of each of the color separated elements as multilevel gradation data. Consequently, the difference between the characteristics of the element colors is clear. In the other senses, the relation with the other element color can be equally dealt. The pixel interpolating unit and the gradation converting unit can change the combination for each element color so as to obtain the optimum performance for each element color. For example, in the case of RGB (red, green, and blue) as three primary colors of light, since the visual recognition sensitivity of a human to the B component is low, it is effective to replace the B component with the other element color for the combination.

In such a manner, the invention is applied to the case where the image data has the element of the color separated element color, the correspondence can be easily changed for each element color.

It is sufficient that the gradation converting process and the pixel interpolating process are made correspond to each other. The corresponded pixel interpolating process may be executed by designating any of the gradation converting processes. The corresponded gradation converting process may be executed by designating any of the pixel interpolating processes.

As a preferable example using the image data in which the gradation conversion and the interpolating process are made correspond to each other, the image data subjected to the gradation conversion can be also used as control data indicating whether a recording material of the element color is applied or not by a printing apparatus.

In the printing apparatus, not the multilevel gradation but the halftone process performed by determining whether the recording material of the element color is applied or not is easy and often used. In the case of the configuration, the image data is used as control data for such a printing apparatus, thereby enabling the picture quality to be optimized.

In such a manner, when the printing by the printing apparatus is a precondition, the pixel interpolating process and the gradation converting process are necessary. A printing matter can be obtained with optimum performance according to desired quality.

Some printing apparatuses are considered especially to improve the picture quality. In such a case, when the first priority is given to only the picture quality, processing time becomes longer and the apparatus is not easily used. Consequently, the printing apparatus uses the recording materials of a dark color system and a light color system. The pixel interpolating unit and the gradation converting unit execute the pixel interpolating process and the gradation converting process which realize good picture quality for the recording material of the light color system.

In the case of the configuration, the printing apparatus tries to improve the picture quality by properly using the recording materials of the dark color system and the light color system. In this case, the pixel interpolating unit and the gradation converting unit execute the pixel interpolating process and the gradation converting process which realize good picture quality to the recording material of the light color system.

The light color exerts an influence on the picture quality more than the dark color. With respect to the light color, in the case of reproducing very light color, dots are applied discretely to the base and each dot is conspicuous. On the contrary, in the case of applying dark color, it is the case where the color already exceeds the density of the light color. Consequently, dots have often already been applied in the periphery and each dot is not conspicuous. When the picture quality is improved especially with respect to the light color, even if the picture quality of the dark color is less considered, no effect is exerted on the picture quality.

In this manner, in the case of the printing apparatus which properly uses the dark and light colors, the picture quality is prevented from deteriorating as much as possible.

The printing apparatus using the recording materials for the large and small diameters has an almost similar relation with the process for the dark and light colors. As an example, the printing apparatus uses the recording materials for the large and small diameters. The pixel interpolating unit and the gradation converting unit execute the pixel interpolating process and the gradation converting process which realize good picture quality to the recording material for the small diameter.

In this case, the dot of the large diameter corresponds to the dot of dark color and the dot of the small diameter corresponds to the dot of the light color. By improving the picture quality especially with respect to the dot of the small diameter which is not conspicuous, therefore, even if the dot of the large diameter is less considered, little influence is exerted on the picture quality.

In such a manner, in the case of the printing apparatus properly using different dot diameters, deterioration in the picture quality can be suppressed as much as possible.

When the interpolating process and the gradation converting process to be executed by the pixel interpolating unit and the gradation converting unit are made correspond to each other, one of the combinations can be individually by the operator It can be also automatically selected. As an example, the pixel interpolating unit and the gradation converting unit can select the optimum pixel interpolating process and the gradation converting process on the basis of the kind of the image data.

In case of the configuration, the kind of image data is combined with the correspondence between the pixel interpolating process and the gradation converting process and the optimum selection can be made on the basis of the kind of the image data.

In such a manner, the selection can be performed according to the kind of image data as a reference to obtain desired performance.

As an example of the kind of such image data, the pixel interpolating unit and the gradation converting unit determine whether the image data is a natural picture or an unnatural picture and accordingly change the combination of the pixel interpolating process and the gradation converting process.

Since the natural picture such as photograph is an image of a natural matter, inherent detailed information is included. Consequently, being real is requested and the pixel interpolating process and the gradation converting process are required to realize high picture quality. On the contrary, in the case of the unnatural picture, since information is added by the operation of a human, it cannot be said that inherent information is detailed except for a part. When painting is performed in a predetermined pattern, the pixel interpolating process which is simple does not cause harshness or the like.

In the case of the above configuration on the precondition that the natural picture and the unnatural picture are different as mentioned above, whether the image data is the natural picture or unnatural picture is determined and the combination of the pixel interpolating process and the gradation converting process is changed on the basis of the result. In this case, the kind of the image data can be determined by itself or by obtaining only a determination result from the outside.

The method of making specific correspondence between the interpolating process and the gradation converting process in accordance with the kind is not always limited to a substantial apparatus. It can be easily understand that the method itself can function.

As mentioned above, by discriminating the image between the natural picture and the unnatural picture, the picture quality of each picture can be made preferable.

There are cases that such an image data interpolating and gradation converting apparatus exists by itself or used in a state where it is assembled in equipment. The idea of the invention is not limited to the above but includes various modes. It can be properly changed to software, hardware, and the like.

As an embodiment of the idea of the invention, when the image data interpolating and gradation converting apparatus is realized by software, it naturally exists on a recording medium on which the software is recorded and used.

The recording medium may be a magnetic recording medium or magneto-optic recording medium. Any recording medium which will be developed in future can be also considered quite similarly. The stages of duplication such as primary duplicate or secondary duplicate are regarded equal without any doubt. The invention is also applied to the case where a communication line is used as a supplying method.

Further, the case where a part is realized by software and a part is realized by hardware is also included in the idea of the invention. A form in which a part is recorded on a recording medium and properly read as necessary may be also used.

As an example of changing the corresponding interpolating process in accordance with the desired printing quality, further, various examples can be used.

Figure 49:
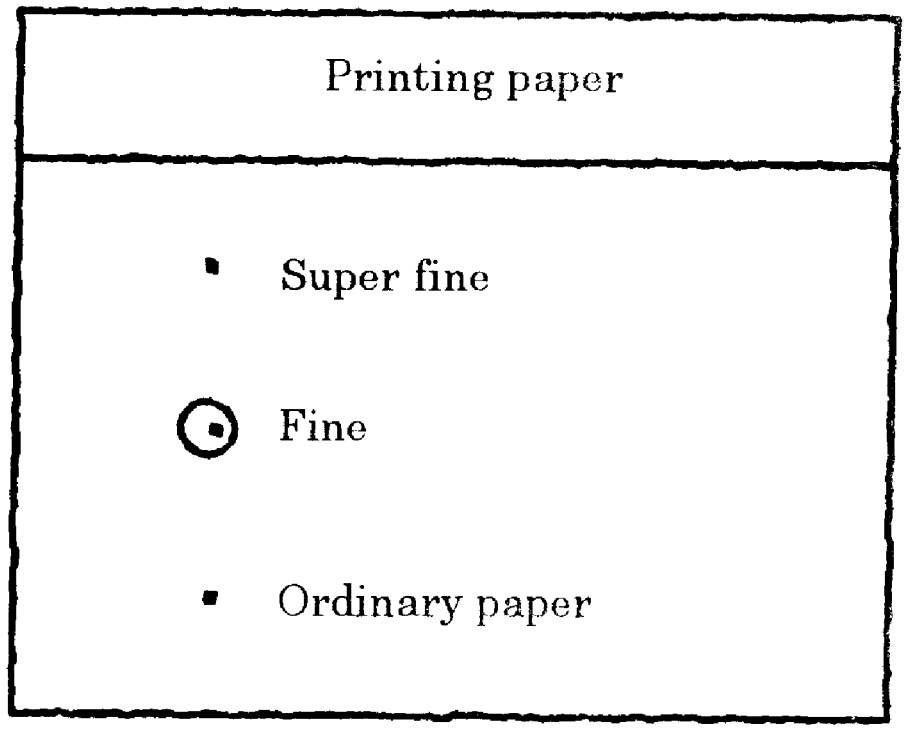
FIG. 49 is a diagram showing a setup screen for selecting printing paper.
Figure 50:
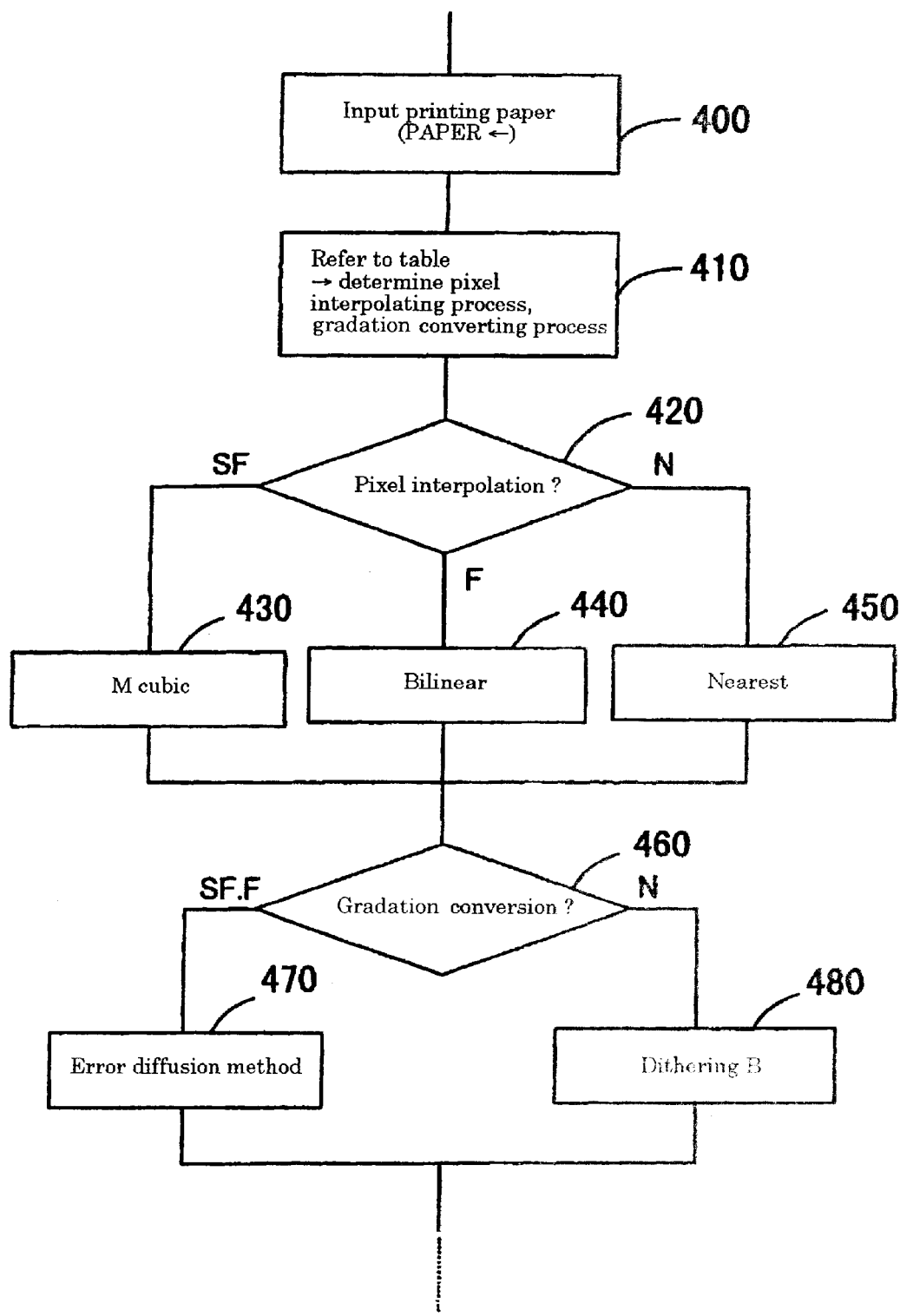
FIG. 50 is a flowchart for executing an optimum printing process on the basis of the printing paper.

FIGS. 49 to 51 show an example of indirectly determining the printing quality by selecting printing paper and executing a printing control with optimum performance.

In the example, as shown in FIG. 49, the kinds of printing paper are displayed and the user selects one of them. An amount of spread ink and glossiness vary according to printing paper and the printing paper is replaced according to the requested printing quality. "Super fine" is used when there is glossiness, spread hardly occurs, and high printing quality is desired. In the following, "fine" or "ordinary paper" is used when the printing quality may be low. Consequently, when the printing paper is set, the printing quality is known.

As shown in the flowchart of FIG. 50, the set outside face of GUI shown in FIG. 49 is displayed in step 400 so that the operator is allowed to select the printing paper. The inputted printing paper is used to refer to a table shown in FIG. 51 in step 410. That is, when the paper is "super fine", it denotes that high printing quality is desired. The "M cubic" is therefore selected as the pixel interpolating process and the "error diffusion method" is selected as the gradation converting process. Both of these processes can expect high picture quality. On the other hand, in the case of "ordinary paper", the printing quality which is very high is not desired. It is understood that even when printing quality is low, a high speed process is desired. Consequently, "nearest" is selected as the pixel interpolating process and "dithering B" is selected as the gradation converting process. In the case of "fine", it is required to compromise the printing quality and the processing speed, so that "bilinear" is selected as the pixel interpolating process and "error diffusion method" is selected as the gradation converting process.

The result of referring to the table is used when the pixel interpolating process is selected in step 420 and when the gradation converting process is selected in step 460. The pixel interpolating process is performed by "M cubic" in step 430, "bilinear" in step 440, or "nearest" in step "450". The gradation converting process is performed by "error diffusion method" in step 470 or "dithering B" in step 480.

As mentioned above, by selecting the printing paper, the printing quality is determined, so that the optimum performance with respect to the picture quality and the processing speed adapted to the printing quality can be obtained.

FIGS. 52 to 55 show an example of a process by which optimum performance can be obtained when the printing quality can be changed by driving the printing head overlapping.

The overlapping will be briefly described first. Generally, one nozzle provided for the printing head takes charge of printing a row of dots lined in the width direction of the printing paper. On the contrary, in the overlapping, one row of dots are printed by using a plurality of nozzles. When the printing density becomes high, a slight deviation of the flying direction of ink particles discharged from the nozzle causes a white line. For example, when two upper and lower rows of dots are contrasted with each other, assuming that the flying direction from the nozzle for printing the upper row is deviated upward and the flying direction from the nozzle for printing the lower row is deviated downward, a white line tends to be created between them. Since it is difficult to adjust the flying direction from the nozzle, one row of dots is printed by using the plurality of nozzles as described above.

Figure 52:
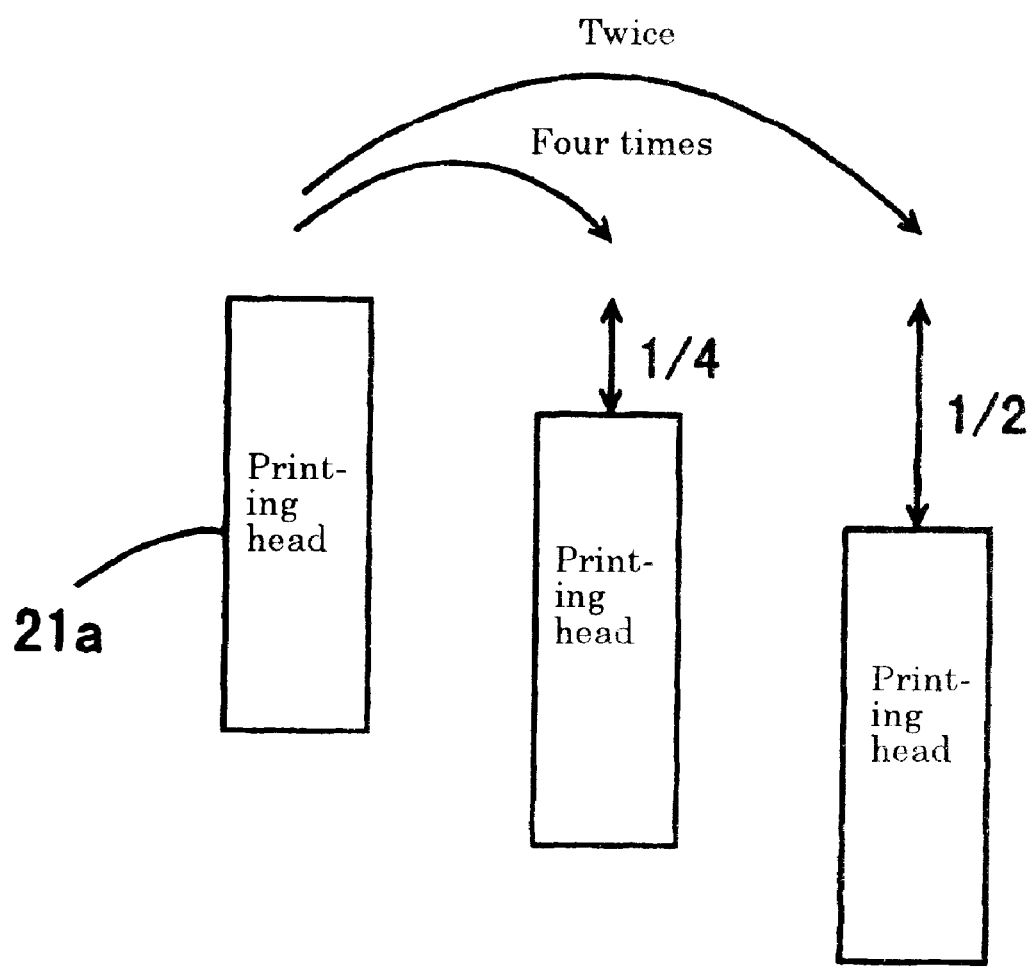
FIG. 52 is a schematic diagram showing an operating state when the printing head is in an overlapping mode.
Figure 55:
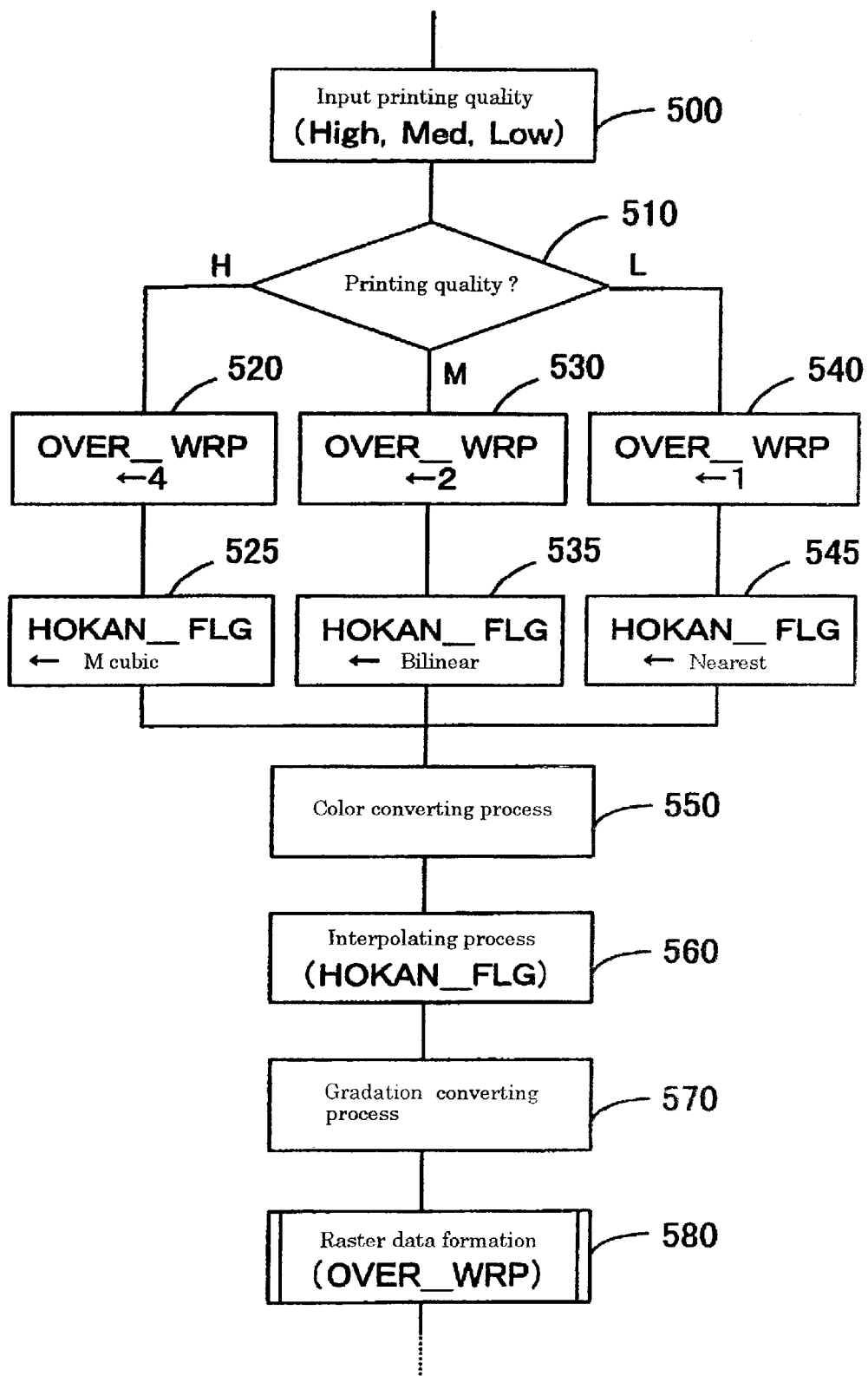
FIG. 55 is a flowchart for executing an optimum printing process on the basis of the printing paper.

FIG. 52 shows a basic principle with reference to an example where the overlapping is performed twice and an example where the overlapping is performed four times. When it is assumed that there are nozzle rows of the printing head from 1 to 16, 16 rows of dots can be printed by one shift in the case where no overlapping is performed. When the overlapping is performed twice, the first row of dots is printed by using the first and ninth nozzle rows. Obviously, every other row of dots is printed first by using only the first nozzle row and every other row of dots is printed by using only the ninth nozzle row. Then the printing paper is fed by a paper feed amount which is the half, the first nozzle row faces the dot row printed by the ninth nozzle row and the ninth nozzle row faces the dot row printed by the first nozzle row. Since it is rare that the flying direction of the first nozzle row and that of the ninth nozzle row coincide with each other, the dot row printed is not deviated largely from the reference position.

FIG. 53(a) shows the case where the overlapping is performed four times, in which it is understood which the dot rows are formed from which nozzles. FIG. 53(b) shows an example when the overlapping is performed twice. Numbers allocated to the dots are nozzle numbers.

In the case of printing for finishing by a color printer owned by the operator, when a white line appears, overlapping is designated. For inputting the printing quality in step 500 shown in FIG. 55, the GUI screen of "printing quality (related to overlapping)" illustrated in FIG. 54 is displayed to allow any of "higher definition", "high definition" and "ordinary" to be selected. In step 510, a branching process is executed on the basis of the inputted printing quality. In processes of steps 520, 530, and 540, "4", "2", and "1" are substituted for a variable OVER_WRP indicative of the number of overlapping times.

Simultaneously, in correspondence with the selected quality, in processes of steps 525, 535, and 545, the kind of the interpolating process to be executed is set for a flag (HOKAN_FLG). In a manner similar to that shown in FIG. 51, in the case of the highest quality, the M cubic is selected. In the case of higher quality, the bilinear method is selected. In the case of the ordinary quality, the nearest method is selected.

After that, a color converting process is executed in step 550. In step 560, an interpolating process instructed is performed with reference to the flag (HOKAN_FLG). When the interpolating process is finished, a gradation converting process is executed in step 570.

In the event of forming raster data in step 580, raster data is created with reference to the variable OVER_WRP. In an actual printing process, paper feed is performed at intervals narrower than physical nozzle intervals, thereby printing data with accuracy higher than the definition of the nozzle intervals. In addition to the printing process, as mentioned above, the control of printing a row of dots with the plurality of nozzles is performed.

Although the printing quality is directly selected in the above example, the number of overlapping times is substantially selected, so that the interpolating process corresponding to the printing quality can be realized.

Figure 56:
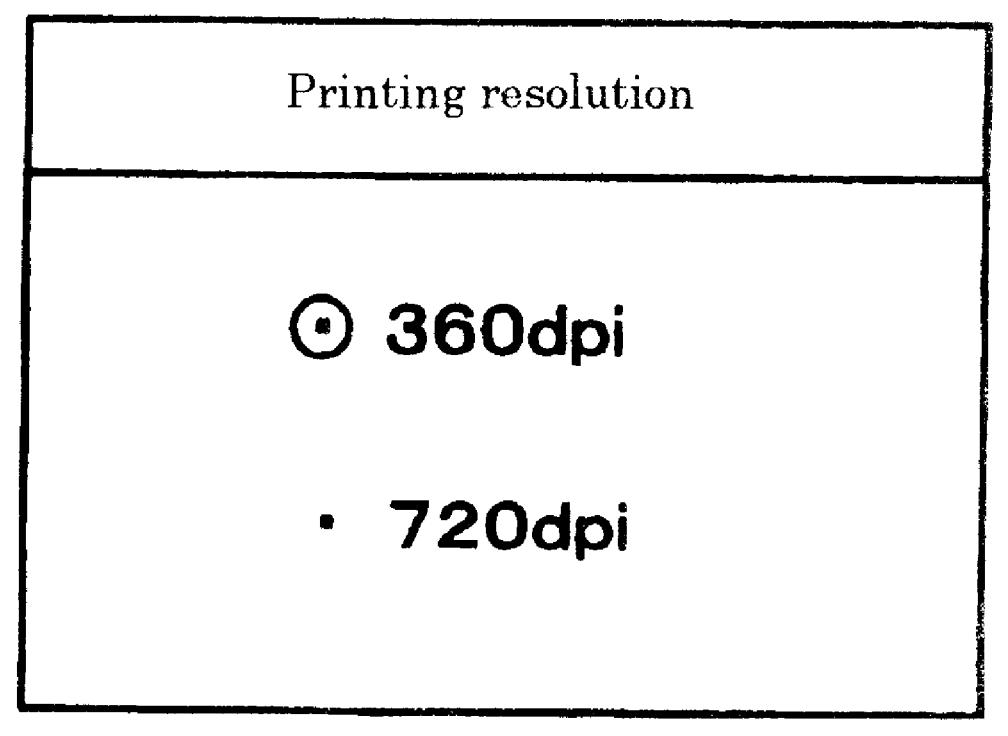
Figure 57:
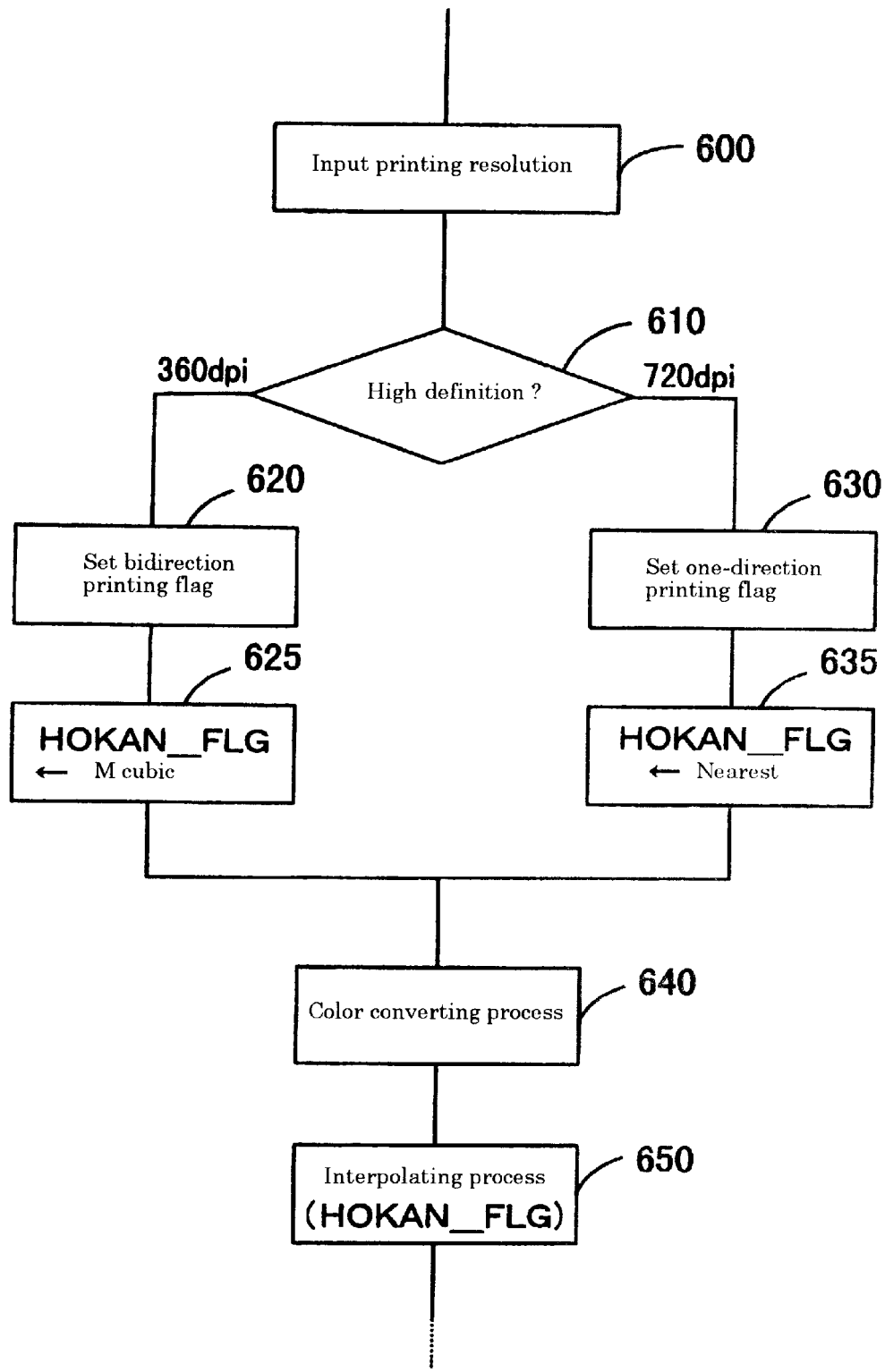
FIG. 57 is a flowchart for executing an optimum printing process on the basis of the printing resolution.

FIGS. 56 and 57 show an example of controlling the shifting direction of the printing head in accordance with the printing resolution.

In the case of printing data by using the printing head, printing can be performed to the whole printing paper by reciprocating the printing head in the width direction of paper while feeding the paper. In the beginning, the printing is performed when the printing head is moved in one direction and the printing is not performed when the printing head is moved in the opposite direction. The order of printing data is reversed and the printing is performed also when the printing head returns, thereby enabling two rows of dots to be printed by one round trip.

Nowadays the printing resolution has been extremely improved, however, a deviation occurs in operations of the round trip due to a mechanical habit or the like. Consequently, when the instruction of reciprocating the printing head is given and the printing of high resolution is designated, a preferable result is not often obtained.

On the contrary, in step 600 of the flowchart shown in FIG. 57, a setup screen of the printing resolution as shown in FIG. 56 is displayed and the printing resolution is inputted. According to whether the printing resolution is high or not in step 610, a flag indicative of the printing direction is set in step 620 or 630. That is, when high printing resolution is requested, it denotes that the high printing quality is requested. The flag to perform the printing only in one direction is therefore set in step 630. When low printing resolution is requested, low printing quality is sufficient, so that a flag to perform the printing only in both directions is set in step 620.

In association with the branch of step 610, the kind of the interpolating process to be executed is set in the flag (HOKAN_FLG) in the process of step 625 or 635. There are two options here. In the case of the highest quality, the M cubic is selected. In the case of the ordinary quality, the nearest method is selected. After that, the color converting process is executed in step 640 and an interpolating process instructed is executed with reference to the flag (HOKAN_FLG) in step 565.

In accordance with the desired printing quality as mentioned above, the printing direction which exerts an influence on the printing quality is designated and the interpolating process is designated. Consequently, a phenomenon such that although the image processing is performed at high level, the printing is performed mechanically in both directions, and the picture quality deteriorates does not occur.

In the color conversion shown in FIG. 44, RGB is converted to six colors of LC, C, LM, M, Y, and K. When a unique coordinate system is provided in different color spaces, the color conversion is not obtained only by calculation but the color conversion table in which the color spaces are preliminarily made correspond to each other has to be used. The color conversion table is created by measuring a sampling patch in each of color spaces and combining the measured color data for the same sampling patch. When there are 256 levels per each color of RGB, the combination colors become 16,700,000. The color conversion table of all of the combinations has a huge capacity.

Consequently, a table in which the gradation on the input side is lowered is generally prepared and an insufficient amount is compensated by interpolation. For example, assuming now that each color has 8 levels, the color conversion table has a capacity of 8×8×8 and the size is reduced. Obviously, the color conversion table of 8×8×8 does not coincide with the actual data, so that the nearest neighboring 8 lattice points surrounding image data to be obtained in the actual color space are searched and the interpolation is performed from the correspondence relation with the eight lattice points. A simple example of the interpolation is 8-point interpolation.

According to the 8-point interpolation, however, simply, eight weighting operations are performed and the results are accumulated. Consequently, eight multiplying operations and seven adding operations are necessary. When the computing operation is performed for each pixel, the processing amount is large.

Figure 58:
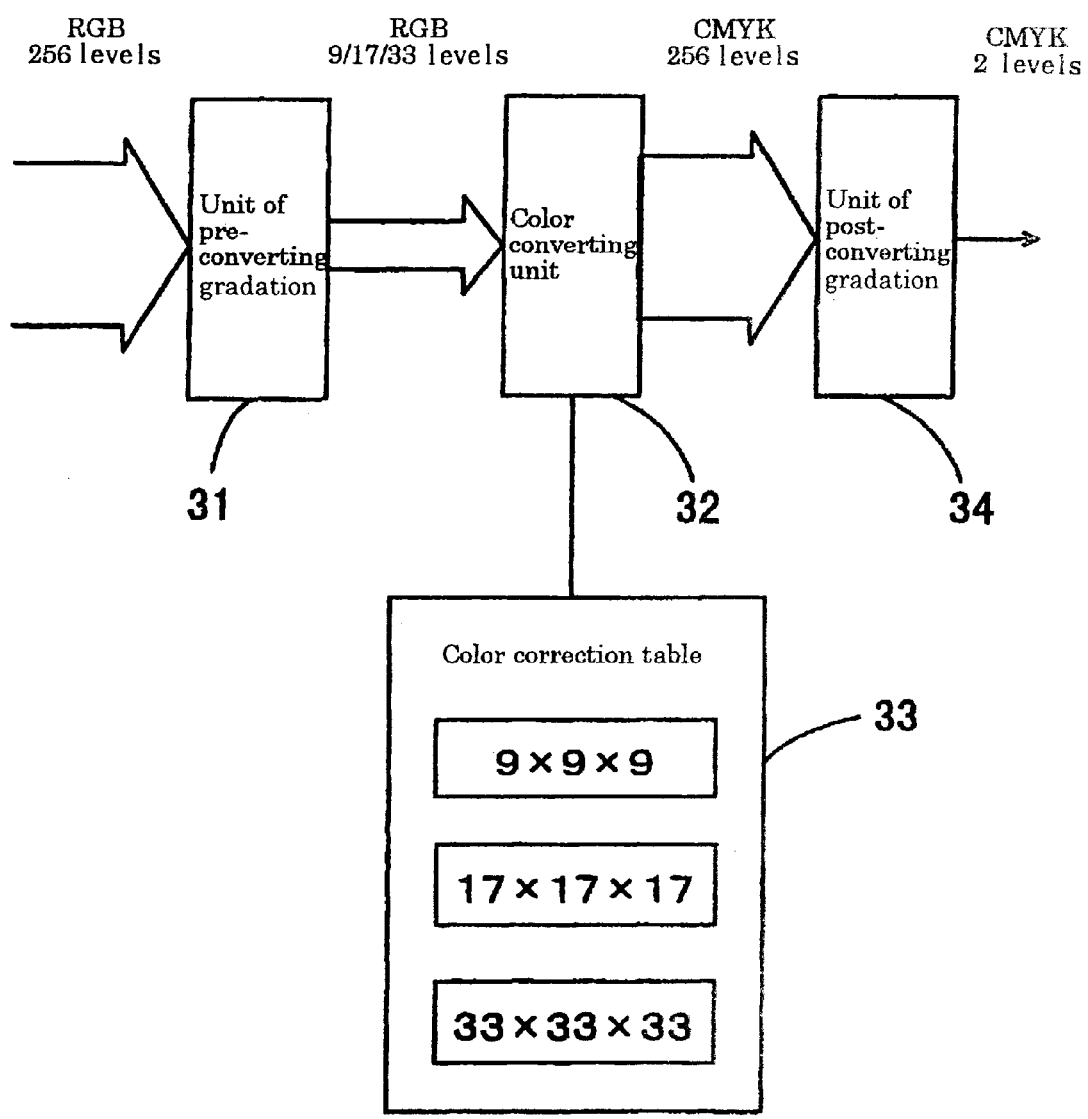
FIG. 58 is a schematic explanatory diagram of pre-conversion and post-conversion.
Figure 59:
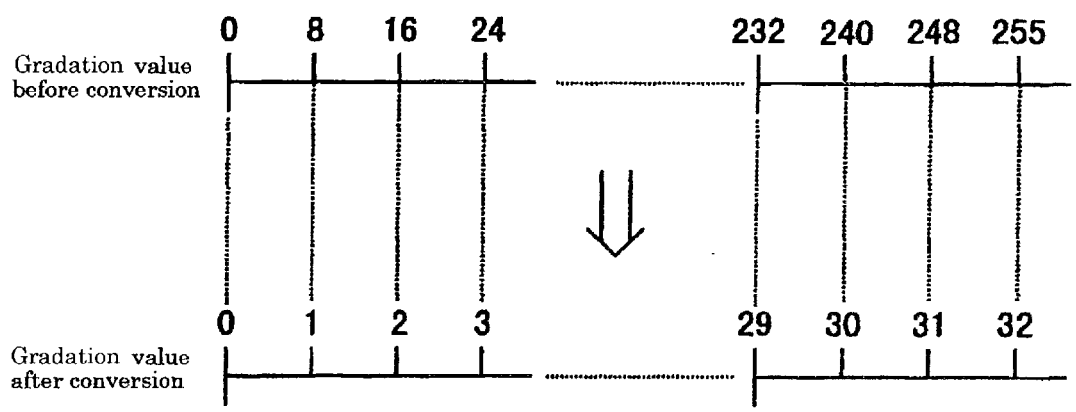
FIG. 59 is a diagram showing a corresponding relation in the case of converting 256 levels to 33 levels by a pre-conversion of gradation.

In order to reduce the computing amount, the applicant of the invention has realized the "pre- and post-conversion". FIGS. 58 and 59 are schematic diagrams for easily understanding the pre- and post-conversion. As illustrated in FIG.

58, the gradation of input image data of RGB each having 256 levels is converted into the gradation of 9, 17, or 33 levels by a unit 31 of pre-converting gradation. After converting the gradation, the color conversion is performed by a color converting unit 32 with reference to a color correction table 33. In the unit 31 of pre-converting gradation, the gradation is converted by the error diffusion method. According to the error diffusion method, arithmetic operation such as addition or subtraction is basically sufficient. Consequently, the computing amount is largely reduced as compared with the 8-point interpolation.

In the gradation conversion performed by the unit 31 of pre-converting gradation, a quantization error occurs. Although a macro error does not occur by the error diffusion, an influence is exerted on the picture quality in reality. Obviously, the quantization error is influenced by the size of the color conversion table 33. The larger the size of the color conversion table 33 is, the more the quantization error is reduced.

Figure 60:
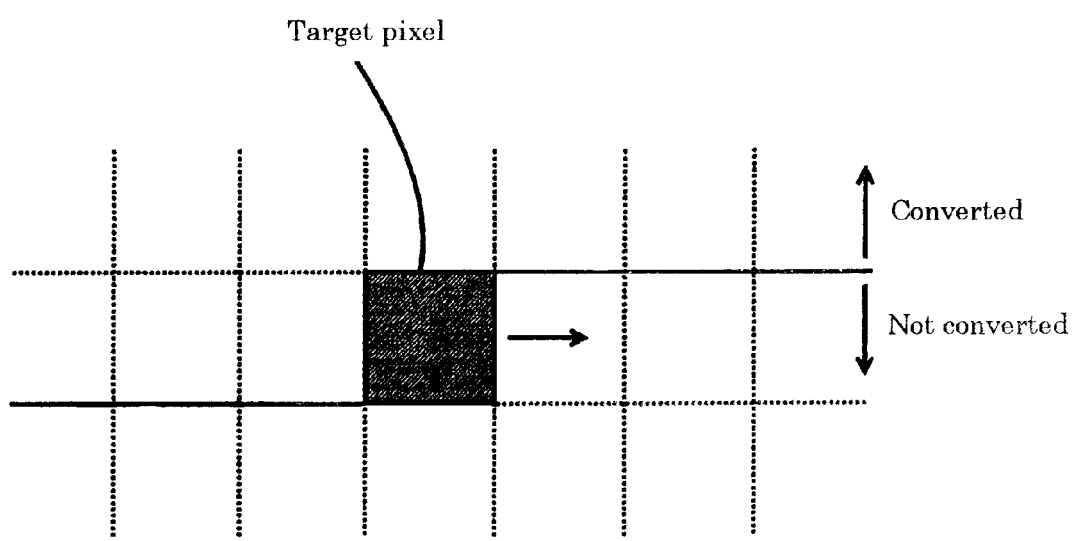
FIG. 60 is a diagram showing a process of performing color conversion while moving a target pixel.
Figure 62:
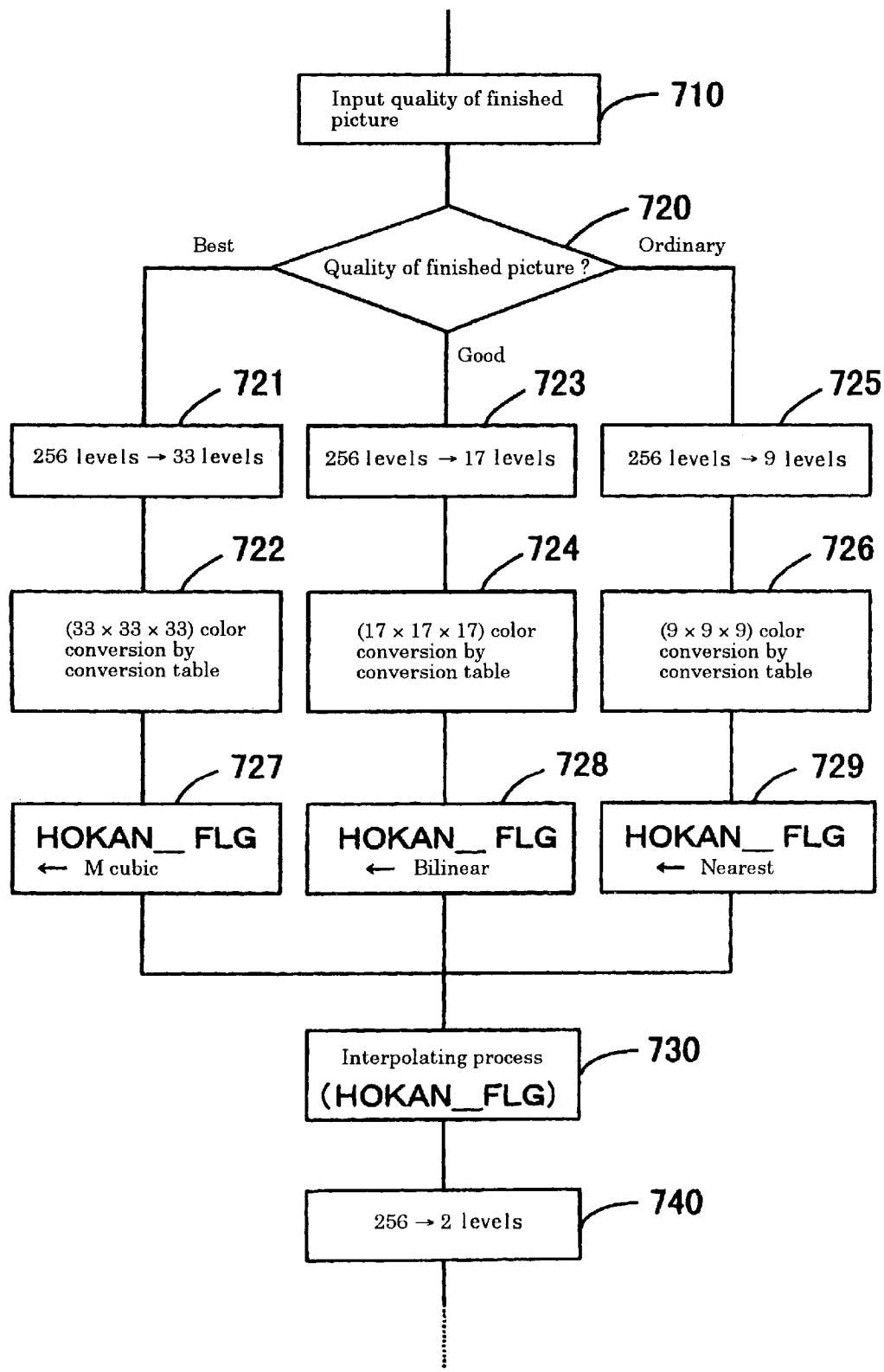
FIG. 62 is a flowchart for executing an optimum printing process on the basis of the quality of a finished picture.

In the embodiment, the size of the color correction table is switched according to the method of the color conversion which exerts an influence on the printing quality. The color conversion is performed to all of the pixels by, as shown in FIG. 60, specifying the target pixels in the pixels in the dot matrix state and sequentially moving the target pixels so as to scan in the X and Y directions.

In step 710, the GUI setup screen as shown in FIG. 61 is displayed and the operator is allowed to input picture quality of a finished image corresponding to the printing quality. Step 720 is branched to steps 721, 723, and 725 on the basis of the picture quality of a finished image in order to refer to a color conversion table of a desired size. The picture quality of the finished image corresponds to the method of the color conversion. The best picture quality of the finished image is realized by using the biggest color conversion table. The good picture quality of the finished image is realized by using an intermediate color conversion table. The ordinary picture quality of the finished image is realized by using the smallest color conversion table.

When the best picture quality of the finished image is desired, in order to use the color conversion table of 33×33×33 levels, the gradation is converted by the error diffusion from RGB 256 levels to 33 levels in step 721 and the color conversion table is referred to in step 722. Similarly, when the good picture quality of the finished image is desired, RGB 256 levels are converted to 17 levels in step 723, and the color conversion table of 17×17×17 levels is referred to in step 724. When the ordinary picture quality of the finished image is desired, the RGB 256 levels are converted into 9 levels in step 725, and the color conversion table of 9×9×9 levels is referred to in step 726.

In association with the branch of step 720, in each of the processes of steps 727, 728 and 729, the kind of the interpolating process to be executed is set in the flag (HOKAN_FLG). There are three options here. In a manner similar to FIG. 51, in the case of the highest quality, the M cubic is selected. In the case of the high quality, the bilinear method is selected. In the case of the ordinary quality, the nearest method is selected. After that, the instructed interpolating process is executed with reference to the flag (HOKAN_FLG) in step 730.

When the data is converted to image data in the CMYK color space, in order to be adapted to the gradation of the printer 17b, the gradation is converted to two levels in step 740. The color conversion from 256 levels to 2 levels at the final stage corresponds to the unit 33 of post-converting gradation.

As described above, by inputting the picture quality of the finished image, the printing quality is determined and the optimum printing control process according to the printing quality is realized. Thus, the printing process can be executed while obtaining the best picture quality without waste.

As mentioned above, in the printing system using the computer system 10, by allowing the factor which exerts an influence on the printing quality such as printing paper to be selected (step 400), the printing quality is estimated on the basis of the selection of the printing paper, a proper printing control which has preliminarily been made correspond is selected (step 410), and the process is branched so as to execute the selected printing control (steps 420 to 450, steps 460 to 480). Thus, the optimum printing control can be performed.

Industrial Applicability

Conventionally, an interpolating process has to be selected in a state where the relation between the process and the printing quality is not sufficiently grasped and there is a case that an optimum interpolating process cannot be selected. Since the interpolating process to be corresponded is determined based on the requested printing quality without asking the user, even a person who is not skilled can execute an optimum process.

What is claimed is:

1. A medium on which a printing control program for inputting image data obtained by expressing an image by pixels in a dot matrix state and allowing a computer to execute an interpolating process and a printing control process so that the image data is printed by a printing apparatus is recorded, wherein printing quality at the time of allowing the printing apparatus to print the image data is obtained, an interpolating process corresponding to the obtained printing quality is determined, and the computer is allowed to execute the printing control process by the determined interpolating process, and wherein in the printing control process, for executing a gradation converting process for reducing image data of multilevel gradations to that of low gradation which can be expressed by the printing apparatus, combinations of the interpolating processes and the gradation converting processes are preliminarily set in accordance with the printing quality in the gradation converting process and the gradation converting process and the interpolating process are executed in the combination corresponding to the required printing quality.

2. A medium on which a printing control program for inputting image data obtained by expressing an image by pixels in a dot matrix state and allowing a computer to execute an interpolating process and a printing control process so that the image data is printed by a printing apparatus is recorded, wherein printing quality at the time of allowing the printing apparatus to print the image data is obtained, an interpolating process corresponding to the obtained printing quality is determined, and the computer is allowed to execute the printing control process by the determined interpolating process, and wherein the interpolating process is performed by a computing method with high accuracy and then by a computing method with low accuracy at a predetermined shared ratio, and an interpolation magnification is adjusted so that the shared magnification allocated to the computing method with high accuracy increases as the printing quality becomes higher when the shared ratio is determined.

3. A medium on which a printing control program for inputting image data obtained by expressing an image by pixels in a dot matrix state and allowing a computer to execute an interpolating process and a printing control process so that the image data is printed by a printing apparatus is recorded, wherein printing quality at the time of allowing the printing apparatus to print the image data is obtained, an interpolating process corresponding to the obtained printing quality is determined, and the computer is allowed to execute the printing control process by the determined interpolating process, and wherein printing gradation can be selected in the printing apparatus and the selected printing gradation is obtained as printing quality and an interpolating process corresponding to the printing quality is selected in the printing control process.

4. A medium on which a printing control program for inputting image data obtained by expressing an image by pixels in a dot matrix state and allowing a computer to execute an interpolating process and a printing control process so that the image data is printed by a printing apparatus is recorded, wherein printing quality at the time of allowing the printing apparatus to print the image data is obtained, an interpolating process corresponding to the obtained printing quality is determined, and the computer is allowed to execute the printing control process by the determined interpolating process, and wherein selected resolution at the time of printing is obtained as printing quality and an interpolating process corresponding to the printing quality is selected in the printing control process.

5. A medium on which a printing control program for inputting image data obtained by expressing an image by pixels in a dot matrix state and allowing a computer to execute an interpolating process and a printing control process so that the image data is printed by a printing apparatus is recorded, wherein printing quality at the time of allowing the printing apparatus to print the image data is obtained, an interpolating process corresponding to the obtained printing quality is determined, and the computer is allowed to execute the printing control process by the determined interpolating process, and wherein a selected color converting method at the time of printing is obtained as printing quality and an interpolating process corresponding to the printing quality is selected in the printing control process.

6. A printing control apparatus for receiving image data obtained by expressing an image by pixels in a dot matrix state and printing the image data by a printing apparatus, comprising:

a printing quality obtaining unit for obtaining printing quality when the printing apparatus is allowed to perform printing by using the image data;

an interpolating process determining unit for determining an interpolating process which is to correspond to the obtained printing quality; and a printing control unit for executing the determined interpolating process and executing a printing control on the printing apparatus, wherein, in the printing control unit, when a gradation converting process for reducing image data of multi-level gradation to image data of low gradation which can be expressed by the printing apparatus is executed, combinations of the interpolating processes and the gradation converting processes are preset according to the printing quality in the gradation converting process and the gradation converting process and the interpolating process are executed by the combination corresponding to the required printing quality.

7. A printing control apparatus for receiving image data obtained by expressing an image by pixels in a dot matrix state and printing the image data by a printing apparatus, comprising:

a printing quality obtaining unit for obtaining printing quality when the printing apparatus is allowed to perform printing by using the image data;

an interpolating process determining unit for determining an interpolating process which is to correspond to the obtained printing quality; and a printing control unit for executing the determined interpolating process and executing a printing control on the printing apparatus, wherein, in the interpolating process, interpolation is performed by a computing method with high accuracy and then a computing method with low accuracy at a predetermined shared ratio, and when the shared ratio is determined, an interpolation magnification is adjusted so that the shared magnification allocated to the computing method with high accuracy increases as the printing quality becomes higher when the shared ratio is determined.

8. A printing control apparatus for receiving image data obtained by expressing an image by pixels in a dot matrix state and printing the image data by a printing apparatus, comprising:

a printing quality obtaining unit for obtaining printing quality when the printing apparatus is allowed to perform printing by using the image data;

an interpolating process determining unit for determining an interpolating process which is to correspond to the obtained printing quality; and a printing control unit for executing the determined interpolating process and executing a printing control on the printing apparatus, wherein printing gradation can be selected in the printing apparatus and the selected printing gradation is obtained as printing quality and an interpolating process corresponding to the printing quality is selected in the printing control process.

9. A printing control apparatus for receiving image data obtained by expressing an image by pixels in a dot matrix state and printing the image data by a printing apparatus, comprising:

a printing quality obtaining unit for obtaining printing quality when the printing apparatus is allowed to perform printing by using the image data;

an interpolating process determining unit for determining an interpolating process which is to correspond to the obtained printing, quality; and a printing control unit for executing the determined interpolating process and executing a printing control on the printing apparatus, wherein selected resolution at the time of printing is obtained as printing quality and an interpolating process corresponding to the printing quality is selected in the printing control process.

10. A printing control apparatus for receiving image data obtained by expressing an image by pixels in a dot matrix state and printing the image data by a printing apparatus, comprising:

a printing quality obtaining unit for obtaining printing quality when the printing apparatus is allowed to perform printing by using the image data;

an interpolating process determining unit for determining an interpolating process which is to correspond to the obtained printing quality; and a printing control unit for executing the determined interpolating process and executing a printing control on the printing apparatus, wherein a selected color converting method at the time of printing is obtained as printing quality and an interpolating process corresponding to the printing quality is selected in the printing control process.

11. A printing control method of receiving image data obtained by expressing an image by pixels in a dot matrix state and printing the image data by a printing apparatus, comprising:

a step of obtaining printing quality when the printing apparatus is allowed to perform printing by using the image data;

a step of determining an interpolating process which is to correspond to the obtained printing quality; and a step of executing the determined interpolating process and executing a printing control on the printing apparatus, wherein, in the step of executing the printing control, when a gradation converting process for reducing image data of multilevel gradation to image data of low gradation which can be expressed by the printing apparatus is executed, combinations of the interpolating processes and the gradation converting processes are preset according to the printing quality and the gradation converting process and the interpolating process are executed by the combination corresponding to the required printing quality in the gradation converting process.

12. A printing control method of receiving image data obtained by expressing an image by pixels in a dot matrix state and printing the image data by a printing apparatus, comprising:

a step of obtaining printing quality when the printing apparatus is allowed to perform printing by using the image data;

a step of determining an interpolating process which is to correspond to the obtained printing quality; and a step of executing the determined interpolating process and executing a printing control on the printing apparatus, wherein, in the interpolating process, interpolation is performed by a computing method with high accuracy and then by a computing method with low accuracy at a predetermined shared ratio, and when the shared ratio is determined, an interpolation magnification is adjusted so that the shared magnification allocated to the computing method with high accuracy increases as the printing quality becomes higher when the shared ratio is determined.

13. A printing control method of receiving image data obtained by expressing an image by pixels in a dot matrix state and printing the image data by a printing apparatus, comprising:

a step of obtaining printing quality when the printing apparatus is allowed to perform printing by using the image data;

a step of determining an interpolating process which is to correspond to the obtained printing quality; and a step of executing the determined interpolating process and executing a printing control on the printing apparatus, wherein printing gradation can be selected in the printing apparatus and the selected printing gradation is obtained as printing quality and an interpolating process corresponding to the printing quality is selected in the step of executing the printing control.

14. A printing control method of receiving image data obtained by expressing an image by pixels in a dot matrix state and printing the image data by a printing apparatus, comprising:

a step of obtaining printing quality when the printing apparatus is allowed to perform printing by using the image data;

a step of determining an interpolating process which is to correspond to the obtained printing quality; and a step of executing the determined interpolating process and executing a printing control on the printing apparatus, wherein selected resolution at the time of printing is obtained as printing quality and an interpolating process corresponding to the printing quality is selected in the step of executing the printing control.

15. A printing control method of receiving image data obtained by expressing an image by pixels in a dot matrix state and printing the image data by a printing apparatus, comprising:

a step of obtaining printing quality when the printing apparatus is allowed to perform printing by using the image data;

a step of determining an interpolating process which is to correspond to the obtained printing quality; and a step of executing the determined interpolating process and executing a printing control on the printing apparatus, wherein a selected color converting method at the time of printing is obtained as printing quality and an interpolating process corresponding to the printing quality is selected in the printing control process.

* * * * *